(12) United States Patent
Rajasingham et al.

(10) Patent No.: US 9,868,416 B2
(45) Date of Patent: Jan. 16, 2018

(54) VEHICLE OCCUPANT SUPPORT

(71) Applicants: Arjuna Indraeswaran Rajasingham, Bethesda, MD (US); Arunan Rajasingham, Bethesda, MD (US); Amrita Rajasingham, Bethesda, MD (US)

(72) Inventors: Arjuna Indraeswaran Rajasingham, Bethesda, MD (US); Arunan Rajasingham, Bethesda, MD (US); Amrita Rajasingham, Bethesda, MD (US)

( * ) Notice: Subject to any disclaimer, the term of this patent is extended or adjusted under 35 U.S.C. 154(b) by 205 days.

(21) Appl. No.: 14/375,673

(22) PCT Filed: Jan. 31, 2013

(86) PCT No.: PCT/US2013/000024
§ 371 (c)(1),
(2) Date: Jul. 30, 2014

(87) PCT Pub. No.: WO2013/115931
PCT Pub. Date: Aug. 8, 2013

(65) Prior Publication Data
US 2015/0042136 A1 Feb. 12, 2015

(51) Int. Cl.
*B64D 11/06* (2006.01)
*B64D 25/04* (2006.01)
(Continued)

(52) U.S. Cl.
CPC .............. *B60R 22/28* (2013.01); *B60N 2/01* (2013.01); *B60N 2/2812* (2013.01);
(Continued)

(58) Field of Classification Search
CPC .... B64D 25/04; B64D 11/06; B64D 11/0601; B64D 11/0602; B64D 11/0604; B64D 11/0605; B64D 11/0619; B64D 11/0636; B64D 11/0648; B64D 11/0696; B64D 2011/0046; B64D 2011/0069; B64D 2011/0076; B64D 2011/0084; B64D 2011/0092
See application file for complete search history.

(56) References Cited

U.S. PATENT DOCUMENTS 2,401,748 A * 6/1946 Dillon ................ B64D 11/0619
244/122 B
4,771,969 A * 9/1988 Dowd ................ B64D 11/0696
244/118.6

(Continued)

*Primary Examiner* — Richard R Green

(57) ABSTRACT

The invention relates to device for providing a safety for passengers and to devices, providing the passenger comfort. There are disclosed variants of load limiter accomplishment for a restraint a passenger in a vehicle, which have a possibility to hold the preliminarily given force. The invention concerns a multi-passenger modular array oftiered passenger supports, having a several levels, means for attaching the modules, locking devices, attaching the modules to the vehicle floor, a drive mechanism for seats in the module, a mechanism for protecting the head of passenger, which is positioned on the seat. The means for providing the passenger comfort head are characterized by the position of steps in the modules, providing a sufficient space for free positioning the legs of the passenger in the upper and lower modules and in the zone of passage between rows. There are also disclosed the presence and position of the bins for storing packages, a construction of armrest and means for lighting, air conditioning, for information drop on the screen and for supplying an oxygen, in necessary.

20 Claims, 68 Drawing Sheets

(51) Int. Cl.
*B60R 22/28* (2006.01)
*B60N 2/01* (2006.01)
*B60N 2/28* (2006.01)
*B60N 2/34* (2006.01)

(52) U.S. Cl.
CPC ......... *B60N 2/2851* (2013.01); *B60N 2/2884* (2013.01); *B60N 2/2887* (2013.01); *B60N 2/34* (2013.01); *B64D 11/0602* (2014.12); *B64D 11/0619* (2014.12); *B64D 11/0636* (2014.12); *B64D 11/0696* (2013.01); *B64D 25/04* (2013.01); *B60R 2022/286* (2013.01); *B64D 11/0601* (2014.12)

(56) References Cited

U.S. PATENT DOCUMENTS

| | | | | |
|---|---|---|---|---|
| 5,784,836 | A * | 7/1998 | Ehrick | B64D 11/00 244/118.5 |
| 5,924,377 | A * | 7/1999 | Rausch | B63B 17/0081 114/71 |
| 6,152,400 | A * | 11/2000 | Sankrithi | B64D 11/00 244/118.6 |
| 7,988,393 | B2 * | 8/2011 | Poupon | B64D 11/0696 410/102 |
| 8,205,833 | B2 * | 6/2012 | Kismarton | B64D 11/0649 244/122 R |
| 8,519,824 | B1 * | 8/2013 | Rankin | B64D 11/00 244/118.5 |
| 2010/0282902 | A1 * | 11/2010 | Rajasingham | B64D 11/0601 244/118.6 |

\* cited by examiner

SCALE 0.200

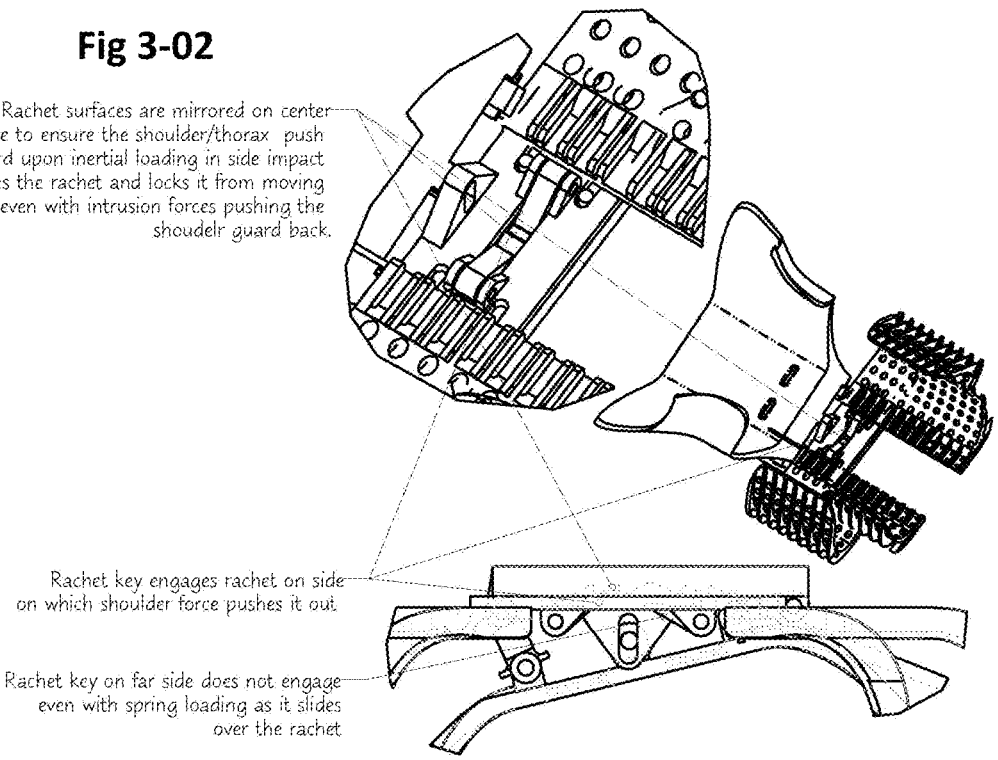
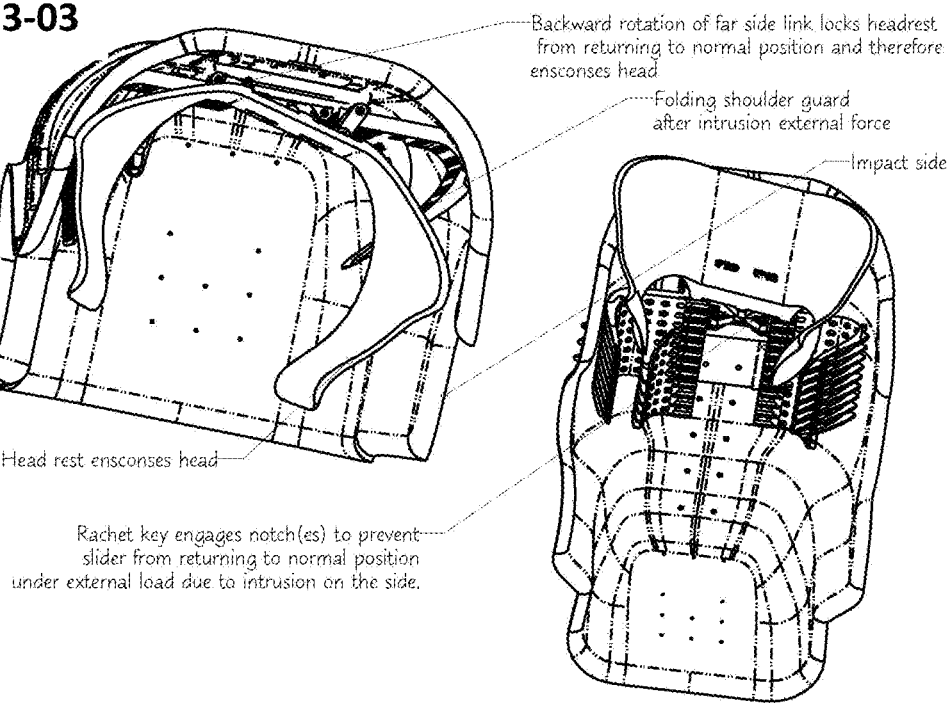

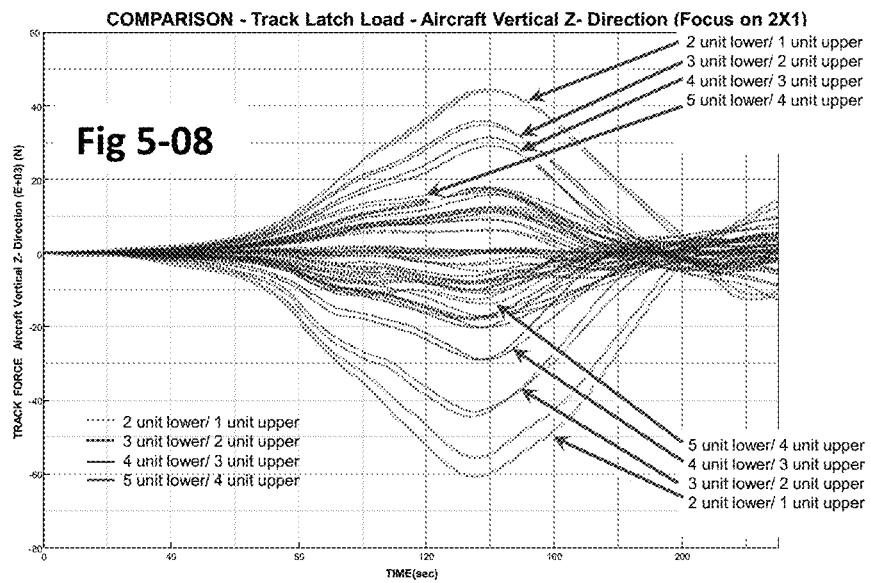
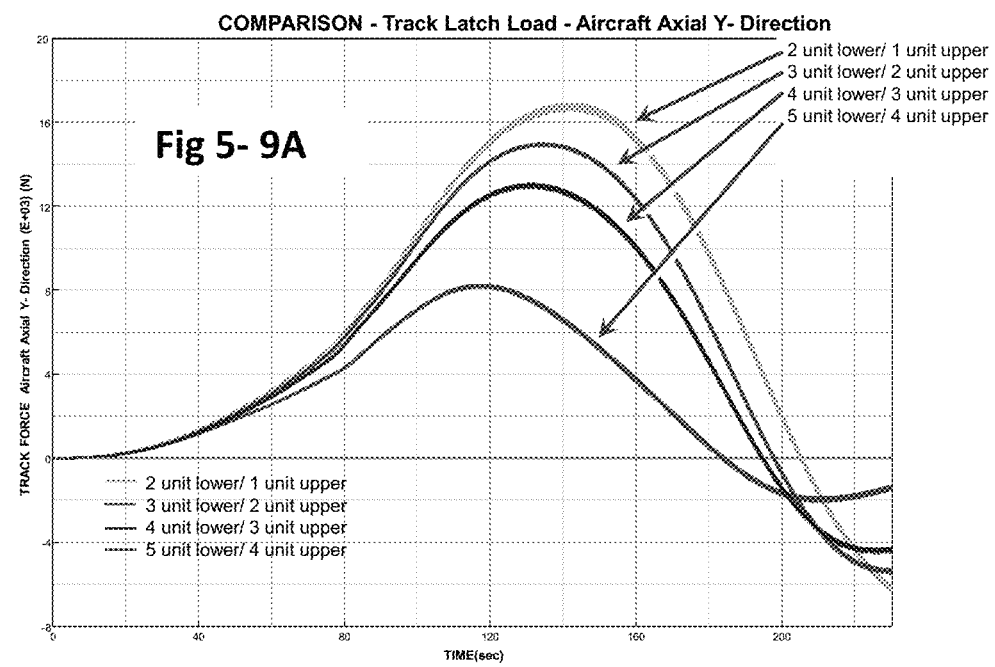

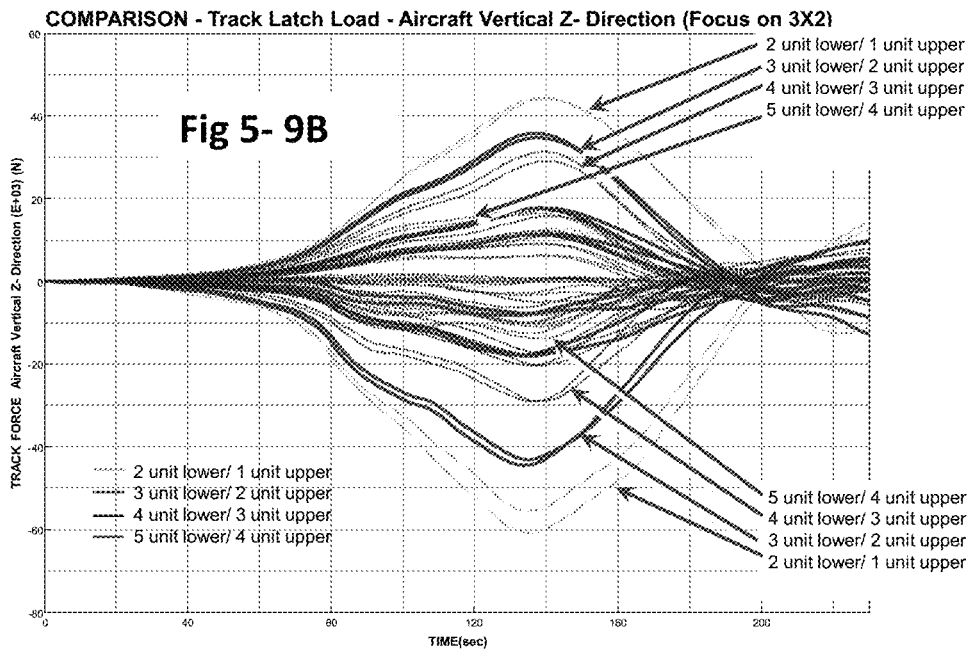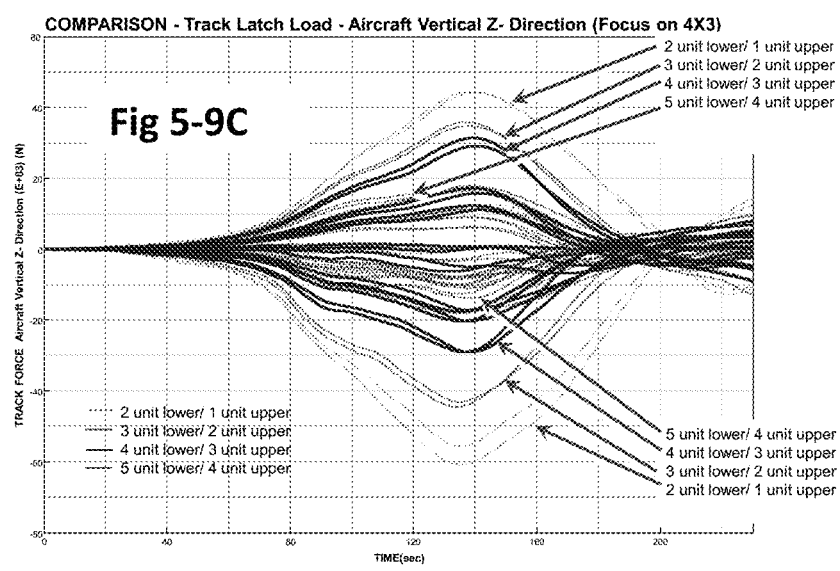

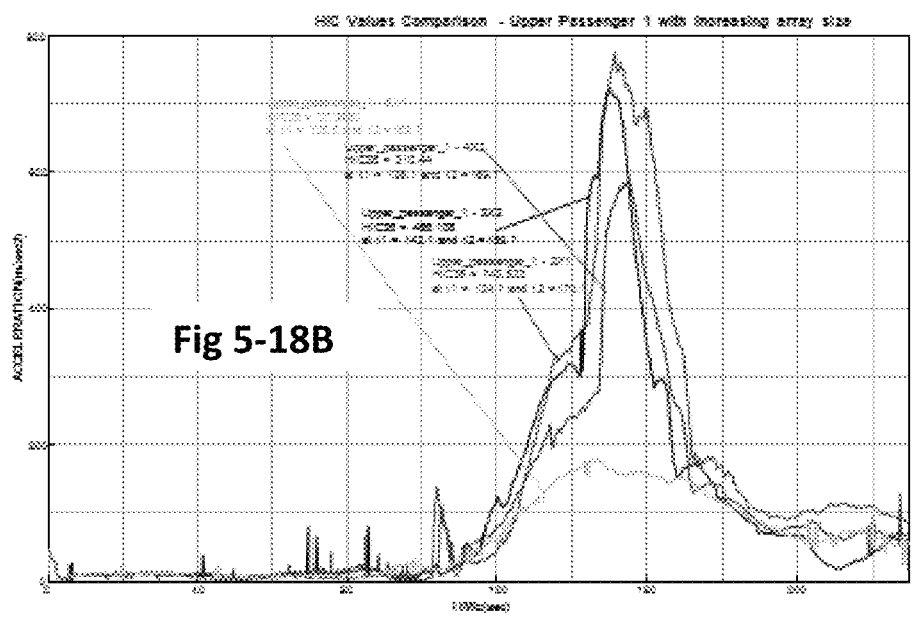
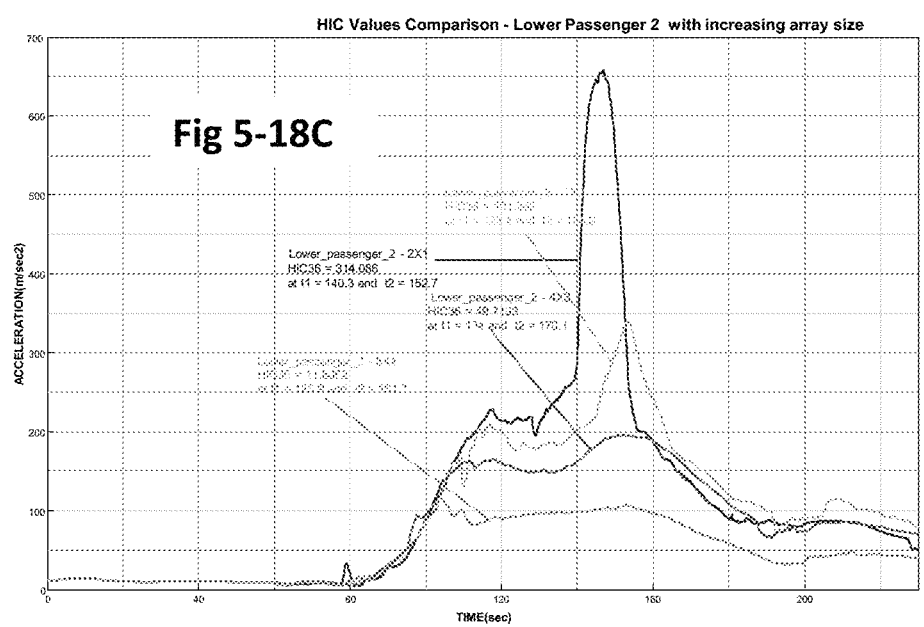

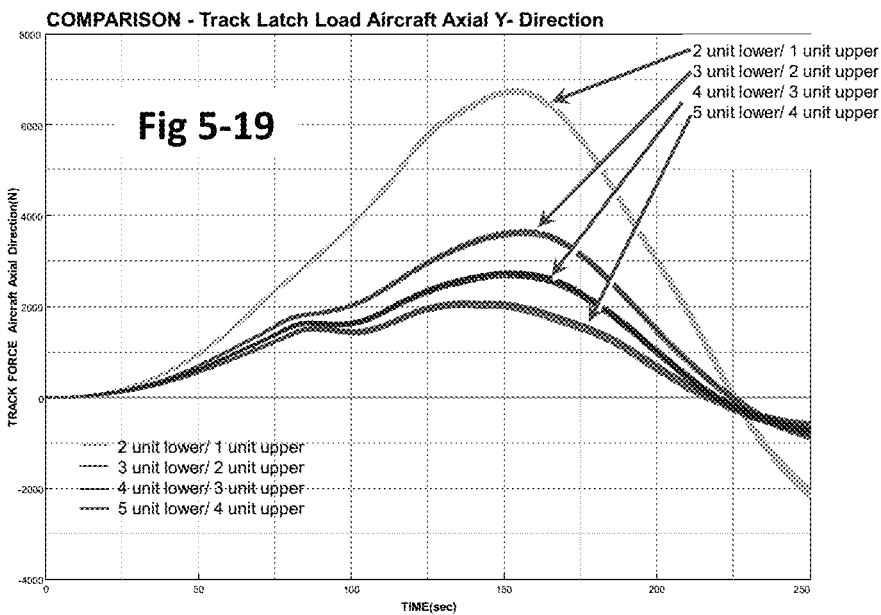
Inclined Mode
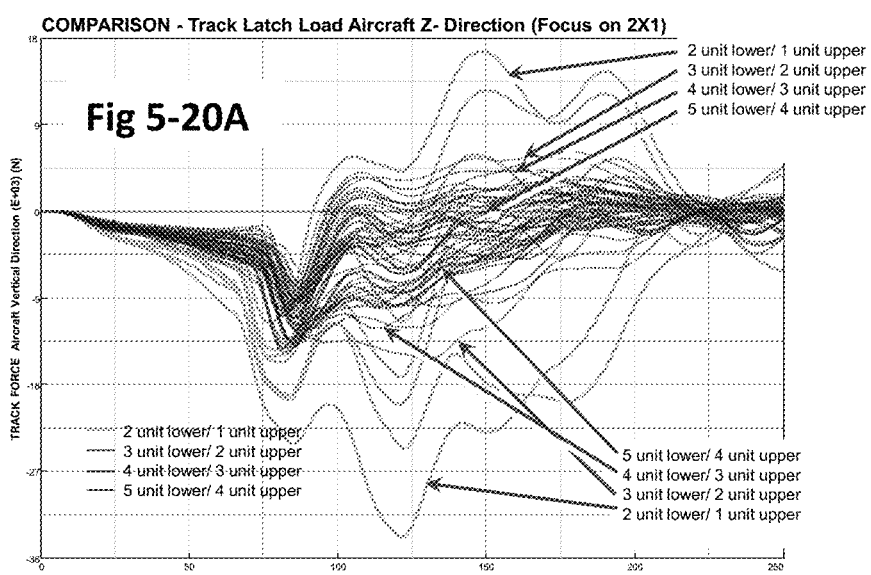
Inclined Mode

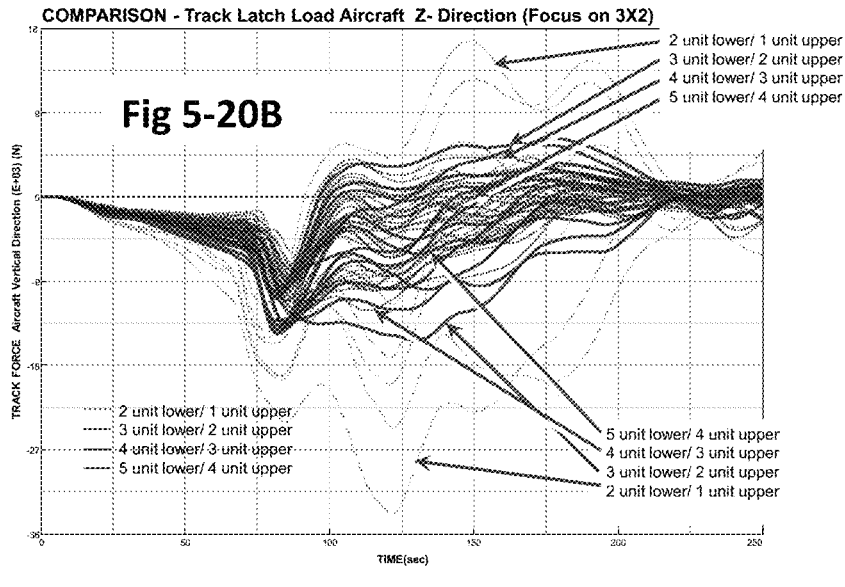
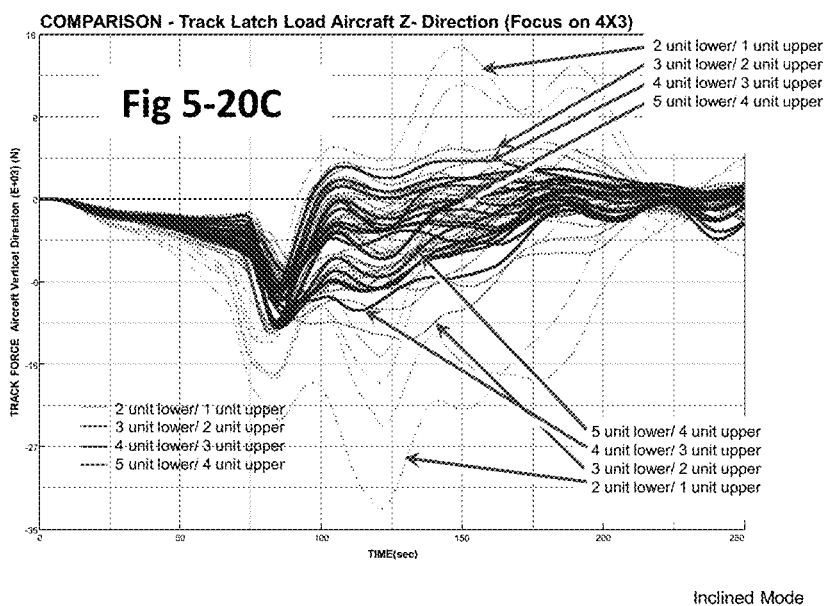

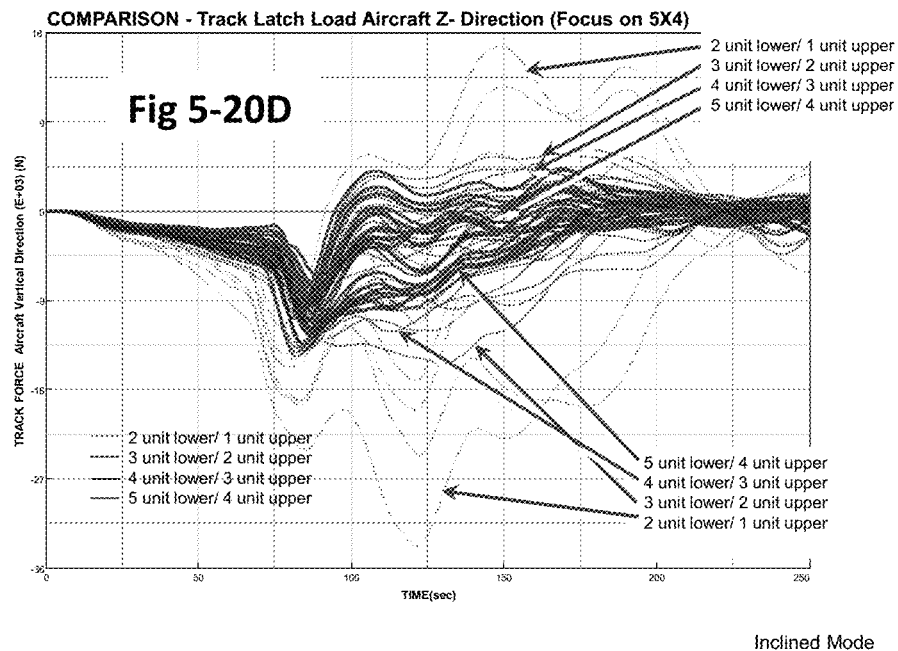
Inclined Mode
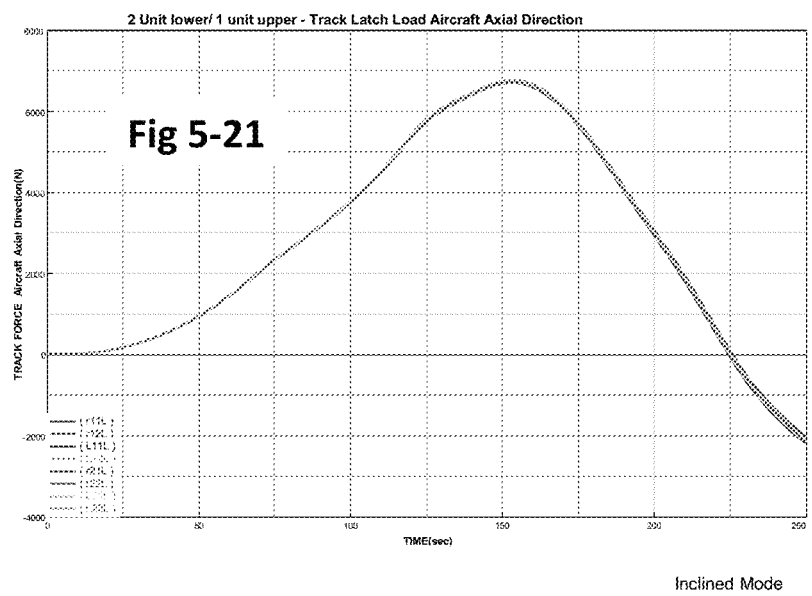
Inclined Mode

Inclined Mode

Inclined Mode

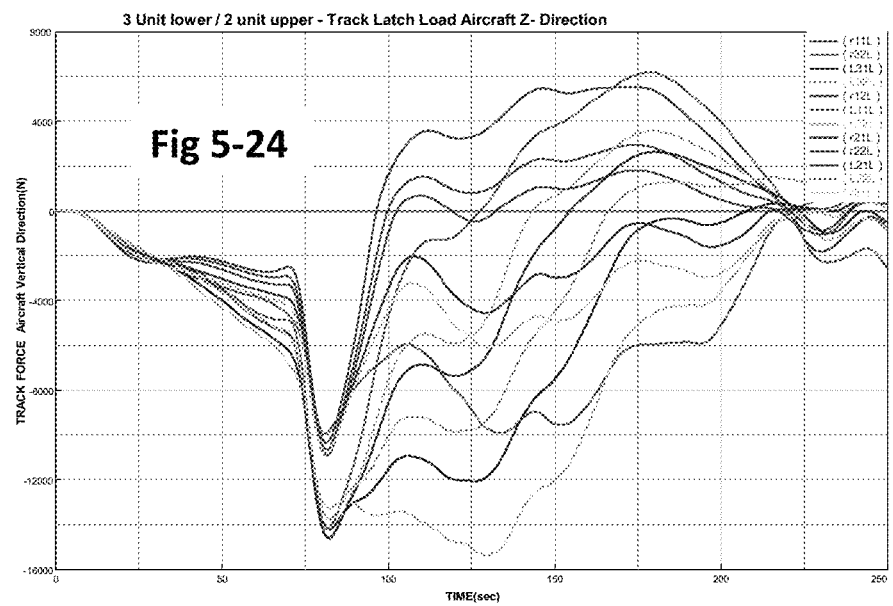
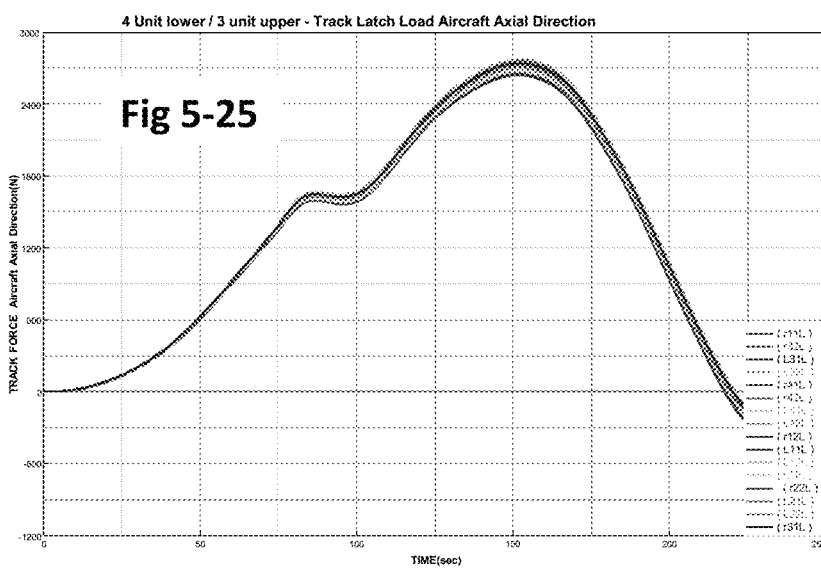

Inclined Mode

Inclined Mode

Inclined Mode

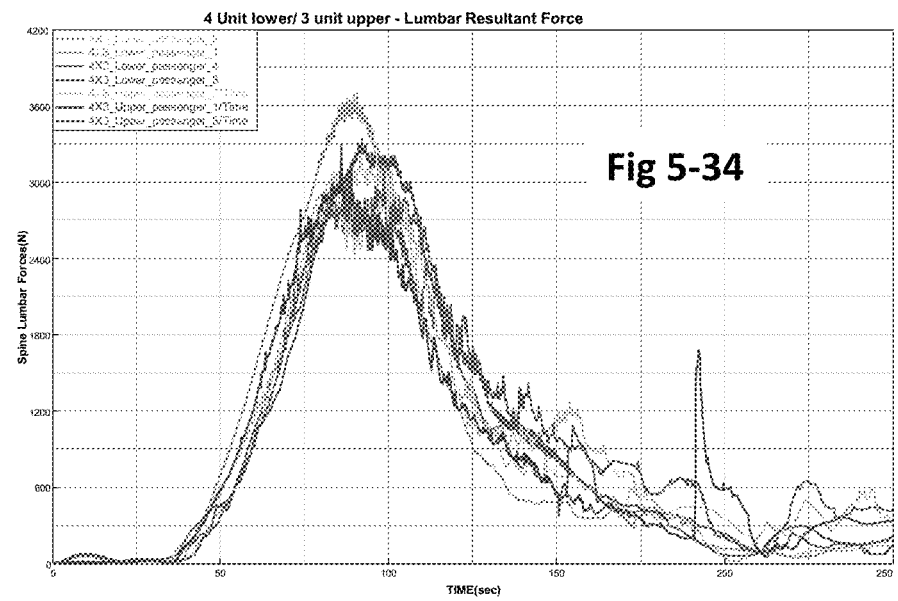
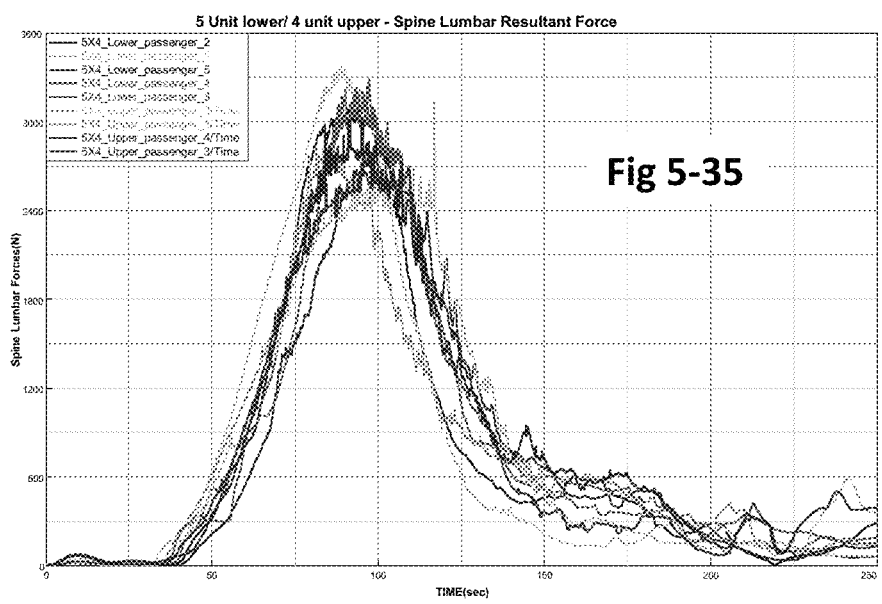

HEAD ACCELERATION – HIC VALUES – FLAT RUNS

LUMBAR LOADS – INCLINED RUNS (N)

Inclined Mode displaced position towards right of child

VEHICLE OCCUPANT SUPPORT

SUMMARY

The present invention provides a new structure and passenger transport paradigm for accommodating passengers in a vehicle with particular attention paid to safety, utility and provides new features for utility.

FIELD OF INVENTION

The present inventions provide a new structure and passenger transport paradigm for accommodating passengers in a vehicle with particular attention paid to safety, utility and comfort.

SUMMARY

The Drawings illustrate embodiments of the inventions. These features and more are described below. The invention relates to the referenced filed applications.

BRIEF DESCRIPTION OF DRAWINGS 5-1001—Latch tension lever
5-1002—Pivoted latch carrier assembly/housing (front facing and rear facing positions possible)
5-1009—Aperture for rotating latch (to face up from rear facing to front facing and vise versa)
5-1019—Cam Pin
5-1020—Cam Thumb Nut
5-1021—Cam assembly pulley
5-1022—Cam Tension Bar Threaded for Cam Thumb Nut
5-1023—Access hole for cable
5-1024—Access slot for Pulley (alternate attachment of Latch cam assembly on this end of Tube
5-1025—Pin
7-1007—Frame assembly
7-1014—Brace: Latch assembly to central pivot rod (part of latch tensioning assembly)
7-1015—Recess for Latch tension assembly on frame body
7-1017—hole on frame body for latch housing in front facing mode.
7-1018—holes on foot rest/front brace for attaching latch housing for rear facing seat mode.
7-1022—Aperture on latch carrier for securing in front/rear facing position (rod for securing not shown)
7-2000—Main roller (support pin not shown)
7-2001—secondary roller(s) (support pin(s) not shown)
7-2002—deformable strip
7-2003—Lower hook
7-2004—Upper hook
7-2005—body
7-2006—Cut out on deformable strip (lower force for deformation)
7-2007—Slot on First deformable strip
7-2008—Pin hole (pin not shown) on Second deformable strip
7-2002A—First deformable strip
7-2002B—Second deformable strip
7-2009—Cutter
7-2010—Cuttable strip
7-2011—Slots for cutter. Longer slots allow cut to begin after displacement of cutter (for second and higher levels of force)
7-2020—Latch body for webbing strip adjustment
7-2021—Webbing control Latch catch (pin support not shown, tension pulls towards retain wall on latch housing. Spring mounted for release)
7-2022—Retain wall on Latch housing
7-2023—lever for operating latch from front of seat
7-2024—fastener aperture for fastening to Latch body
7-2025—apertures for fastening on seat body
7-2026—Insert for Car seat belt Latch
7-2027—Latch for Car Seat Belt latch insert mounted on load limiter
8-1001—Pivot tube (inserted into an option bushing on frame)
8-1002—Latch tensioning assembly
8-1003—Cable lead-in (Latch—not shown.)
8-1004—aperture in pivot tube (the pivot tube may also be in two sections with a break between for the insertion of the cable)
8-1005—optional support bush on latch tensioning assembly to support the pivot tube
8-1006—Cable
9-2001—Harness slots
9-2002—Release catch
9-2003 Right half—Chest plate
9-2004—Left half—Chestplate
9-2005—chin support surface
9-2006—access aperture of r catch on chest plate
9-2007—Chin rest
9-2008—Belt
9-2009—crush pad—level 1
9-2010—crush pad—level 2
10-1000—Shoulder guard
10-1001—Headrest
10-1002—Headrest pivot support
10-1003—Headrest pivot support link
10-1004—Headrest Pivot support—forward pivot
10-1005—Headrest Pivot support—rear pivot
10-1006—Headrest support (attached to vertical movement mechanism or fixed to seat)
10-1007—Attachment means to vertical movement mechanism or fixed seat.
10-1008—Edge of shoulder plate—(engages notch on headrest Pivot support link)
10-1009—side of shoulder plate
10-1010—thorax guard
10-1011—Shoulder slide backplane
10-1012—Shoulder slider
10-1013—shoulder slider slots for sliding
10-1014—shoulder slide backplane—Pins for support of slider and sliding on slot
10-1015—shoulder slide—actuating arm for headrest
10-1016—Shoulder slide—actuating arm for headrest—slot
10-1017—headrest attachment pivot for shoulder slide—actuating arm (pin not shown)
7-2000—Main Roller
7-2002—Deformable Strip
7-2003—Lower Hook
7-2004—Upper Hook
7-2005—Body
7-2006—Cutout on deformable strip
7-2012—Sheath
7-2013—pin
7-2014—Side Roller
7-2015—cutout for Lower hook
7-1016—recess to allow the end stop as it moves along a trajectory attached to the end of the deformable strip towards the roller.

7-1017—protrusion to lock the (slightly flexible) sheath to the tube on the hole on the tube
7-1018—sides of recesses for the two legs of the deformable strip to keep the deformable strip in the middle of the roller.
12-001—spool
12-002—webbing
12-003—fill tape
12-004 fill tape, webbing insert slot for securing on spool
12-005 retractor drum
12-006—pin load limiters to spool
12-007—pin load limiter A to retractor drum
12-008—pin: load limiter B to retractor drum
12-009—spring for retractor
12-010—housing
12-011—slot on retractor drum for delayed engagement of load limiter B
12-012—slot for webbing connection (may be an open slot for threading a loop of webbing)
12-013—spool with splined bearing surface for sliding tubular axle
12-014—splines on spool
12-015—sliding tubular axle with screw thread engaging the housing
12-016—load limiter A' has a slot for increasing and decreasing the active twist length.
12-017—slot on load limiter A'
12-018—Threads on the outer surface of sliding tubular axle
12-019—graded height profile of fill tape.
12-020—ratchet
12-021—Spring loaded ratchet key
12-022—Ratchet key secondary spring
12-023—gong strike
12-024—gongs (different frequencies for the two gongs signal position of key)
12-025—aperture for connecting cable or webbing for control of ratchet key (a second cable may be connected on the far side of the pivot if locking and unlocking of the key are required by cables or webbing
12-026—Apertures for supporting ratchet on retractor drum with pins on drum.
13-001—Upper Unit/occupant support
13-002—Lower unit/occupant support
13-003—Base unit
13-004 seat track for support
13-010—seat track
13-011—latch body
13-012—Latch pin
13-013—Horizontal slider support
13-014—Horizontal slider
13-015—Horizontal spring damper
13-016—Vertical slider with attachment for base unit or occupant support
13-017—Lower vertical spring damper
13-018—Upper vertical spring damper
13-019—Aperture for pin holding units/occupant supports/bases
13-020—pin hole to support horizontal slider support
10-1000—Shoulder guard
10-1001—Headrest
10-1002—Headrest pivot support
10-1003—Headrest pivot support link
10-1004—Headrest Pivot support—forward pivot
10-1005—Headrest Pivot support—rear pivot
10-1006—Headrest support (attached to vertical movement mechanism or fixed to seat)
10-1007—Attachment means to vertical movement mechanism or fixed seat.
10-1008—Edge of shoulder plate—(engages notch on headrest Pivot support link)
10-1009—side of shoulder plate
10-1010—thorax guard
10-1011—Shoulder slide backplane
10-1012—Shoulder slider
10-1013—shoulder slider slots for sliding
10-1014—shoulder slide backplane—Pins for support of slider and sliding on slot
10-1015—shoulder slide—actuating arm for headrest
10-1016—Shoulder slide—actuating arm for headrest—slot
10-1017—headrest attachment pivot for shoulder slide—actuating arm (pin not shown)
10-2001—Pulley with Male protrusion that matches the female groove axial forces compress the protrusion against the groove to hold together Some embodiments use serrations on circular sections that are co axial to the form/pulley surfaces to increase the friction during axial loading.
10-2002—Pulley with Female groove that matches the male protrusion axial forces compress the protrusion against the groove to hold together. Some embodiments use serrations on circular sections that are co axial to the form/pulley surfaces to increase the friction during axial loading.
14-001—Seat back support
14-002—seat bottom
14-002A—seat bottom Sleeping position
14-002B—seat bottom Sitting position
14-003—Upper Sleeper enclosure/mini-cabin
14-004—Lower Sleeper enclosure/mini-cabin
14-005—support bins (with foot frame integrated on separate inside for structural support)
14-006 pop-up storage bins
14-006A—pop-up storage bin—retracted provides the armrest or bed surface
14-007—Screen or projector (for projection on table top)
14-008—Mount for Oxygen mask (and generator if used in embodiment) and mount for screen or projector
14-009—symbols for locking mechanisms between units.
14-010—Steps for egress and ingress to upper sleeper
14-011—Leg space covering protecting lower occupant
14-012—Leg rest—center section
14-013—rear wall for steps also is a shear plane bracing element for strengthening the support for the upper sleepers
14-014—handles for egress ingress
14-015—Bin Drawer open for accessing baggage. Some embodiments have belt at bottom to move luggage back and forward
14-016—Profile of human occupant
14-017—Shear "plane" (may not be flat) for bracing the lower sleeper for supporting the upper sleeper particularly under imp-act conditions.
14-018—Ribs for bracing the side walls of the lower sleeper. Ribs are within the space under the arm rests and straddle the pop-up bins in some embodiments.
14-019—Main actuator for some embodiments of changing the incline of the seat back and seat bottom. In some embodiments, the same actuator with limit switches can be used for pushing out the leg rest that slides under the seat bottom. The lower force and higher displacement requirements for the leg rest retraction and deployment can be achieved with suitable gearing or levers well disclosed in the background art.

14-020—Seat pan
14-021—Side element of leg rest attached to the seat bottom
14-022—step above the sleep position seat bottom and leg rest are positioned at end of sleeper to avoid conflict with upper passenger egress and ingress
14-023—cutout on the lower sleeper flange (and in some embodiments the leg rest side element) allows a comfortable foot position on the bottom step for the upper passenger for egress ingress.
14-024—bottom step for egress and ingress of upper passenger
14-025—enclosure for bracing ribs for lower sleeper enclosure (bracing ribs not shown) can be on both sides of the lower sleeper enclosure.
14-026—Bracing ribs
14-027—seat back anchor
14-027A—seat back anchor Sleeping position
14-027B—seat back anchor Sitting position
14-028—Seat mechanism Support Pan
14-029—Slider (or roller) slot for seat bottom front support on Seat Pan (slide or roller on seat bottom front end. The slot profile can change the angle of the sitting position and all positions of recline as the seat bottom moves about the pivot at the rear end.
14-030—Seat slider or roller (2 positions shown for sitting and sleeping positions
14-031—Pivot of the seat back anchor on seat pan
14-032A—Pivot of seat anchor on seat bottom rear end in the sleeping position
14-032B—Pivot of seat anchor on seat bottom rear end in the sitting position
14-033—Actuator pivot support on support Pan
14-034—Actuator body (other embodiments may be rotational actuators attached to rotate about either of the pivots noted
14-035—Actuator shaft. Alternative embodiments may have limit switches activated when the seat bottom gets to the sleeping position and thereafter the head of the actuator is locked to the leg support that can be pushed out. Variable gearing or lever arrangements for displacement force ratios are well disclosed in the background art.
14-036—Leg Rest side sections attached to seat bottom
14-037—Slot in Seat bottom for sliding leg rest center section that can be retracted under the seat bottom when in the sitting position and deployed for the full sleeping surface when the seat bottom is normally (but even other positions) in the sleeping position.
14-038—Bottom Bin with structural support integrated or attached thereto to support the AirSleeper occupant supports. Attached to the floor or tracks of the aircraft cabin.
14-039—Belt for moving baggage
14-040—Rollers/pulleys for guiding the belt
14-041 secondary rollers for supporting belt with load. Alternative embodiments will have a low friction surface between the two surfaces of the belt between the pulleys. Still other embodiments may simply have a low friction inside surface of the belt so that the upper and lower sections slide easily on each other.
15-2000—Main roller
15-2002—deformable strip
15-2003—Lower hook may be fabricated from bent sheet metal
15-2004—Upper hook
15-2005—body tube
15-2006—Cut out on deformable strip (lower force for deformation)
15-2010—Support Pin
15-2011—lower webbing attachment slot
15-2012—recessed lip for strip support
15-2013—Assembly wedge
15-2014—pin for webbing attachment (may have head and cotter pin at ends to secure)
15-2015—aperture for pin for webbing attachment
15-2016—body channel section (instead of tube as in eg 2005)
15-3000—headrest
15-3001—shoulder guard
15-3002—links
15-3003—slot attachment on shoulder guard to attach to headrest pivot
15-3004—head rest pivot axle
15-3005—belt slots on adjustable height seat backplane
15-3006—recess on headrest for should guard slider engagement
15-3007—Slide guides on seat height adjustment backplane
15-3008—slides in shoulder guard
15-3009—slots for support rivets/bolts/sliding attachment means between shoulder guard slide and height adjustment backplane
15-3010—Link pivots on headrest
15-3011—link attachments on height adjustment backplane.
16-1000—Seat Bottom
16-1001—Leg rest base
16-1002—Leg rest Slider
16-1003—Main Slider
16-1004—Side Slider
16-1005—Pusher rod 1
16-1006—Pusher rod 2
16-1007 optional front flange on leg rest slider
16-1008—Lock on leg rest to the leg rest slider
16-1009—Lock on Seat bottom to the main slider
16-1010—Actuator body
16-1011—Actuator shaft
16-1012—Seat Back in flat bed position
16-1013—Seat Back in sit up position
16-1014—Pivot of Seat Back on support member of AirSleeper
16-1015—Pivot between Seat Back and Seat Bottom
16-1016—Seat Bottom in flat bed position (seat bottom in sit up position not shown)
16-1017—Pivotal attachment between Actuator shaft and Main slider
16-1018—Pivotal attachment between Actuator body and support member of AirSleeper FIGS. 1-01, 02, 03 and 03A represent different views of the latch tension assembly. FIG. 1-04 to 1-12 show different embodiments of load limiters for occupant supports. In addition FIG. 1-05 incorporates a latch for the tension webbing of the child seat harness. FIG. 1-12 also is a chin support attached to the harness. Either or both the chin support function and the load limiting function can be incorporated I the device on FIG. 1-12.

FIGS. 2-01 to 2-04c show an embodiment of a headrest actuated by a shoulder guard to move to ensconce the head during a lateral impact thereby protecting the head.

FIG. 2-01 shows two view of a headrest actuated by a shoulder guard. In the centered or normal position the shoulder guard is fixed to the headrest and the assembly is attached with links to the shell. FIG. 2-02 shows the same arrangement with the right shoulder of the child pushing the shoulder guard outwards resulting in the headrest moving around the head. The movement is usually spring loaded to return to the centered position. It may also have a disconnect member at a pre-determined load.

FIG. 2-03A shows the same arrangement as FIG. 2-03 without the Thorax Guard.

FIG. 2-04A shows different views of the Headrest/shoulder guard/thorax guard assembly in the centered position.

FIG. 2-04B shows the same assembly as 1-04A in the displaced position with the actuation of the headrest by the shoulder guard/thorax guard.

FIG. 2-04C shows the overlaid centered position of the shoulder guard and thorax guard on the assembly as in FIG. 2-04B to show movement.

FIGS. 2-05 to 2-07 show a load limiting module for the front impact for a child seat or for the use as a module on a seat belt of a car. In particular the design is adapted for a manufacturing process and assembly process is a part of this invention.

FIG. 2-05 shows the assembled load limiting module.

FIG. 2-06 shows the exploded view particularly with a view to show the process for assembly which is part of this invention.

FIG. 2-07 shows different views of the sheath

FIGS. 3-01, 02 and 03 show different views of the headrest and shoulder guard mechanism. These figures show additional aspects of the invention that illustrate provisions for intrusion loading of the mechanism during side impact.

FIGS. 3-04, 05, 06 and 07 show different levels of assembly of a mechanism for supporting the load of the harness during front impact while preventing excess load on the external edge of the webbing and preventing the "bunching up" of the webbing towards the center end of the slot leading the webbing from the front of the seat to the back of the seat.

FIG. 4-01 is a cross section of an embodiment of the adaptive load-limiter/retractor.

FIG. 4-02 Shows a surface mounted embodiment of the adaptive load limiter/retractor (autolock sprocket and mechanism is not shown) This may be used in a vehicle for the seat belt or on a CRS.

FIG. 4-03 is a exploded view of the adaptive load-limiter/retractor

FIG. 4-04 show the webbing and fill tape wound on the spool.

Figure 1:
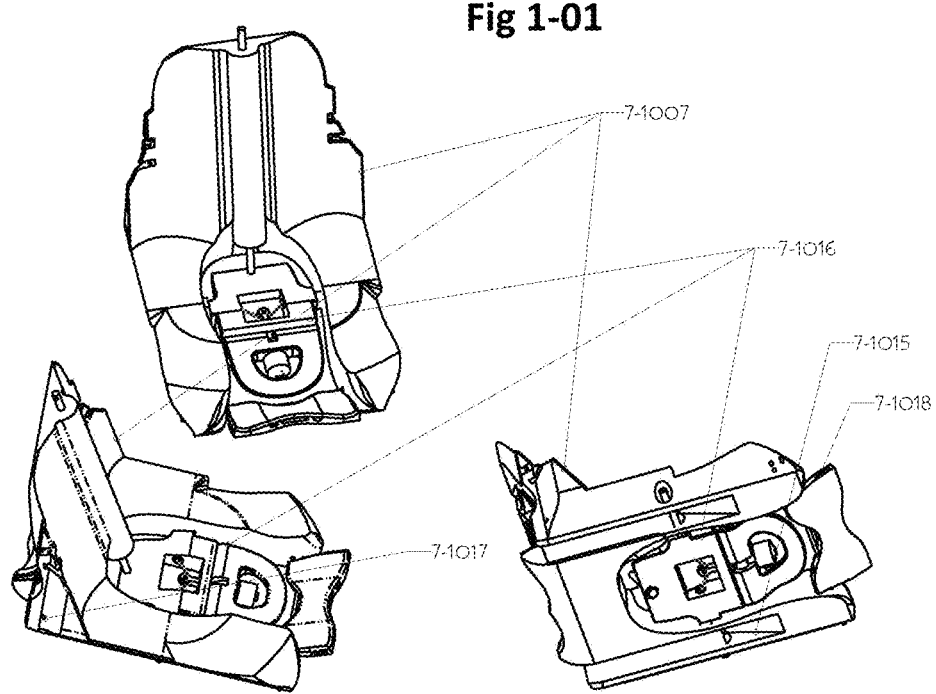
Figures 1, 2:
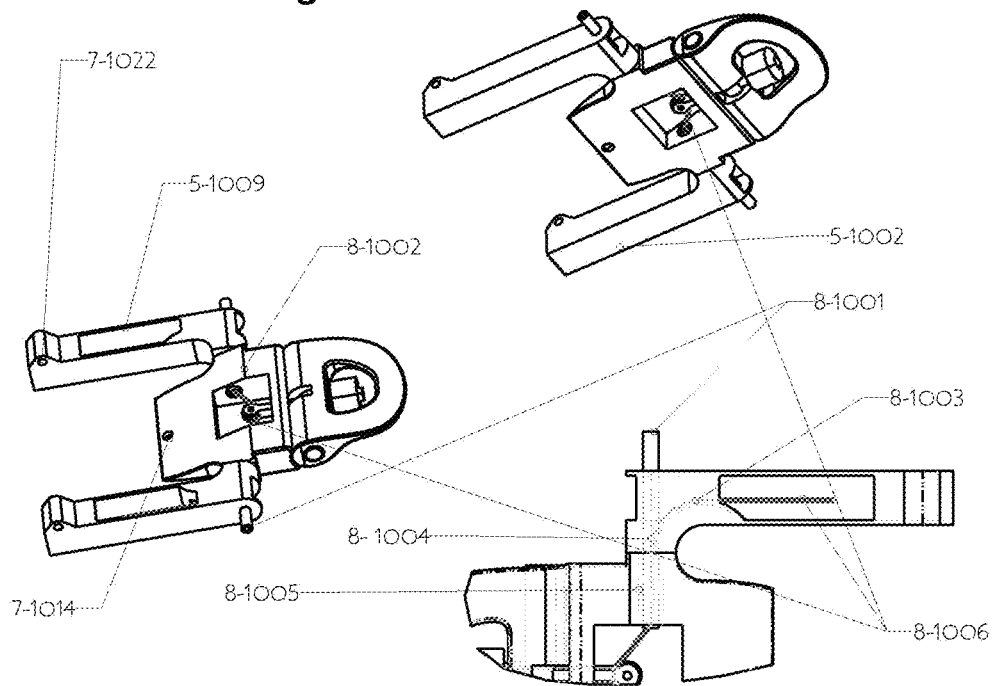
Figures 1, 2, 3:
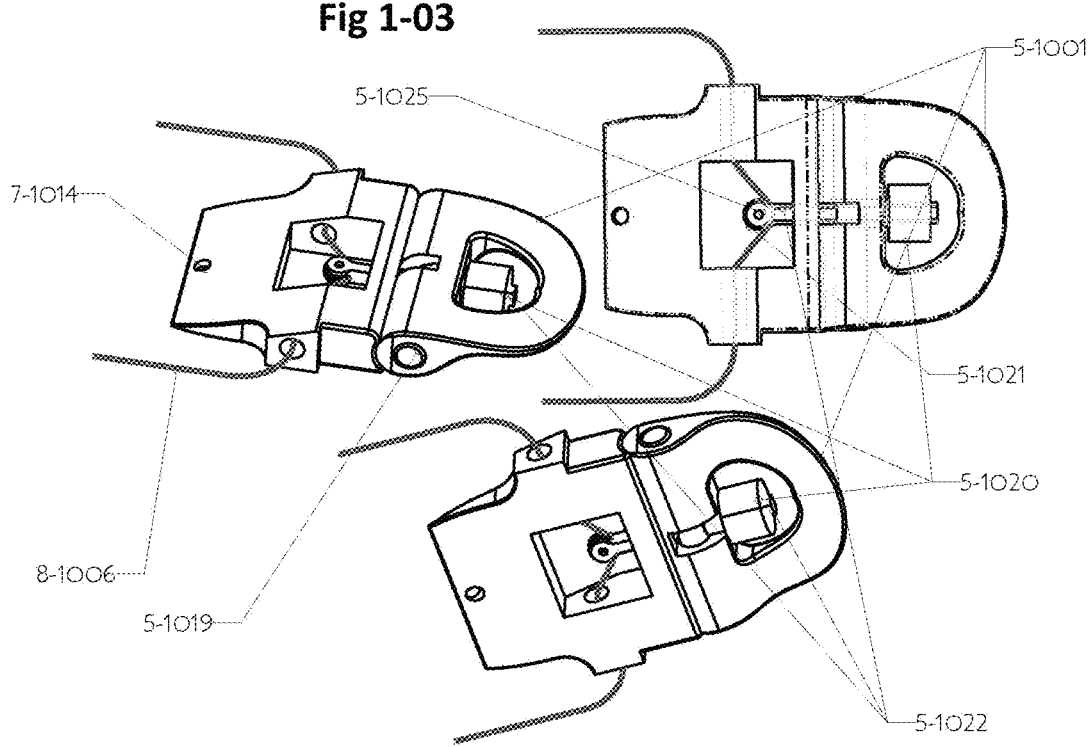
Figures 1, 2, 3, 3A:
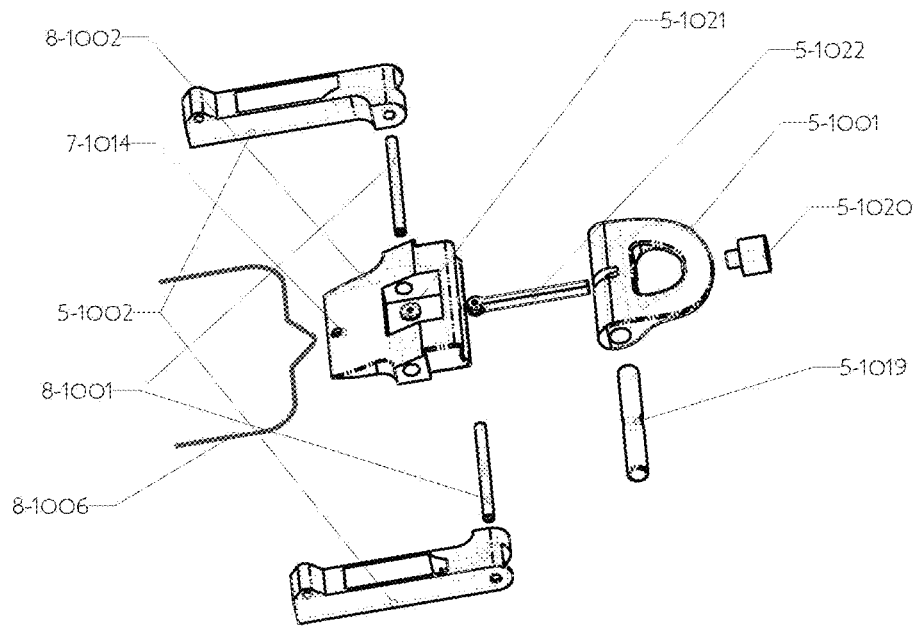
Figures 1, 2, 3, 4:
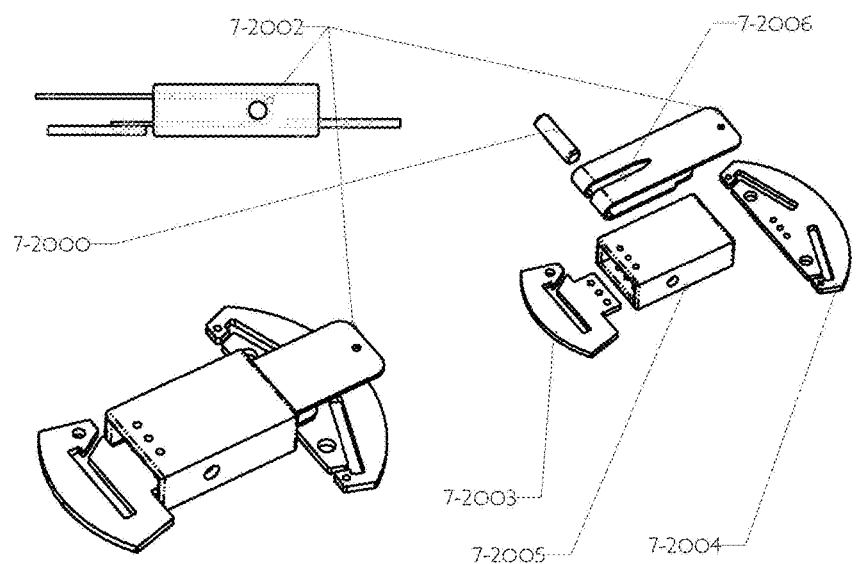
Figures 1, 2, 3, 4, 5:
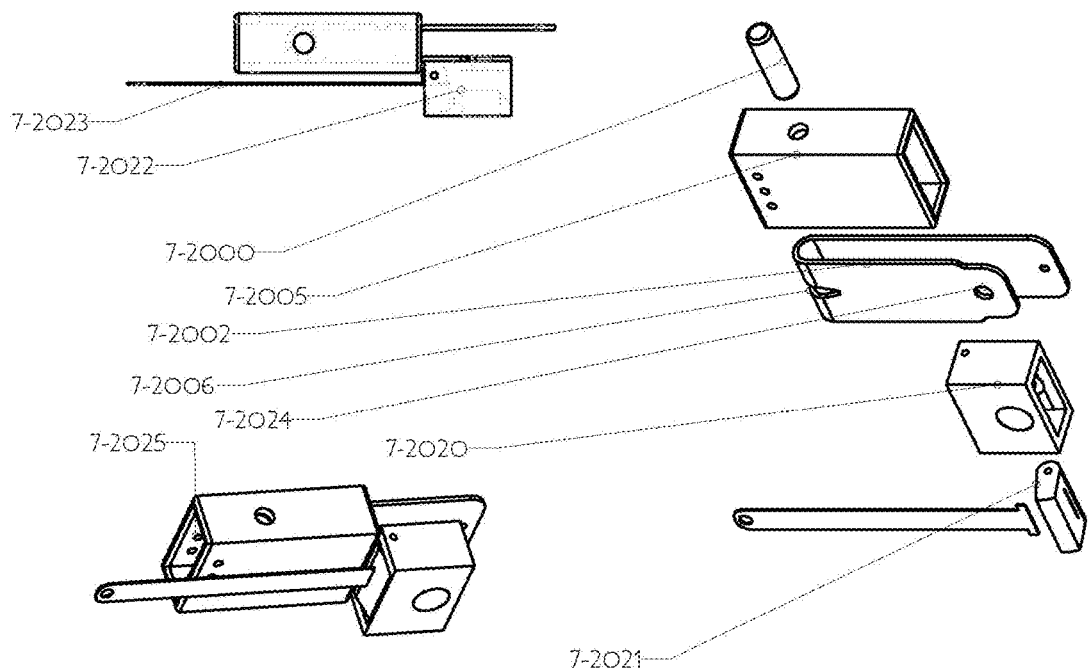
Figures 1, 2, 3, 4, 5, 6:
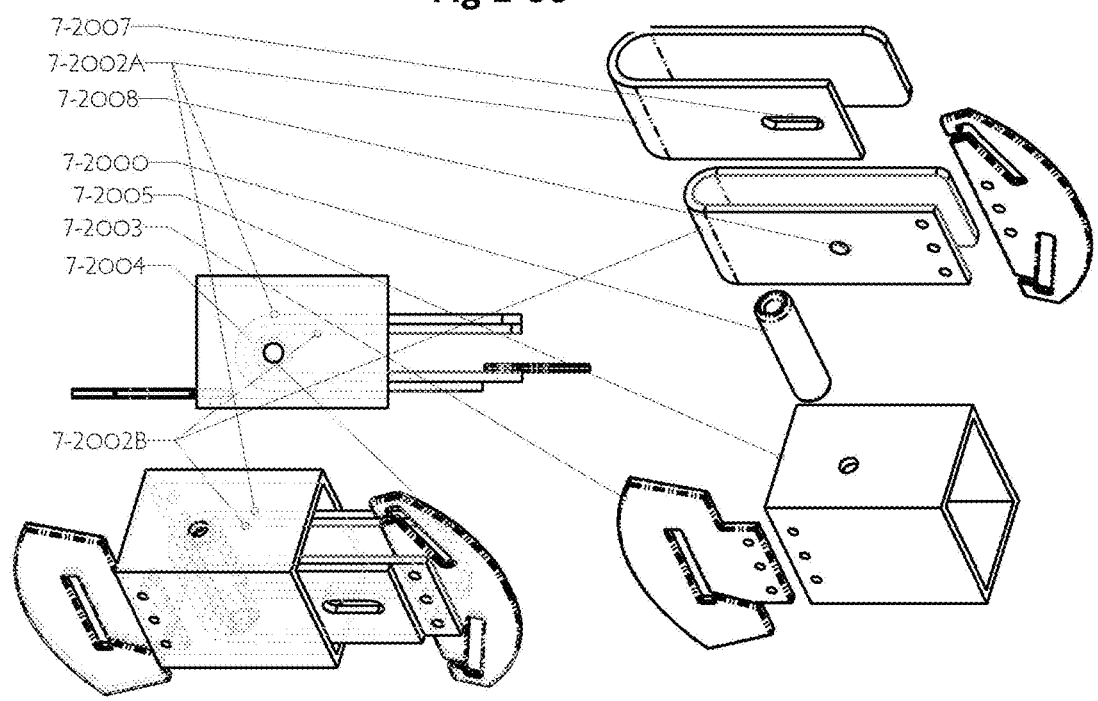

FIG. 4-05 shows a webbing mounted embodiment of the adaptive load-limiter/retractor FIG. 4-06 shows the different radii of the moment of the force from the load limiter at the axis of the spool as the webbing unwinds FIG. 4-07 Shows another embodiment of the adaptive load-limiter/retractor where the load limiter force is varied by changing its effective length, here with a thread on the spool shaft that moves the sliding tubular axle in or out depending on the how much the spool has turned and therefore how much webbing has been dispensed.

FIG. 4-08 Shows another embodiment of the fill tape with a variable cross section to control the moments of the force from the load limiter at different lengths of dispensed webbing.

FIGS. 4-09 and 4-10 shows the additional machinery for an embodiment of a ratchet mechanism for locking the retractor while in use. This load limiting function is separate from the ratchet retractor mechanism and other retractor mechanisms may be used with the adaptive load limiter.

AirSleeper Certification

FIG. 5-01 to 5-05 show different embodiments of modular occupant supports in a vehicle.

FIG. 5-01 shows a modular system of occupant supports where there is a single upper occupant support supported by two lower occupant supports.

Figures 1, 5:
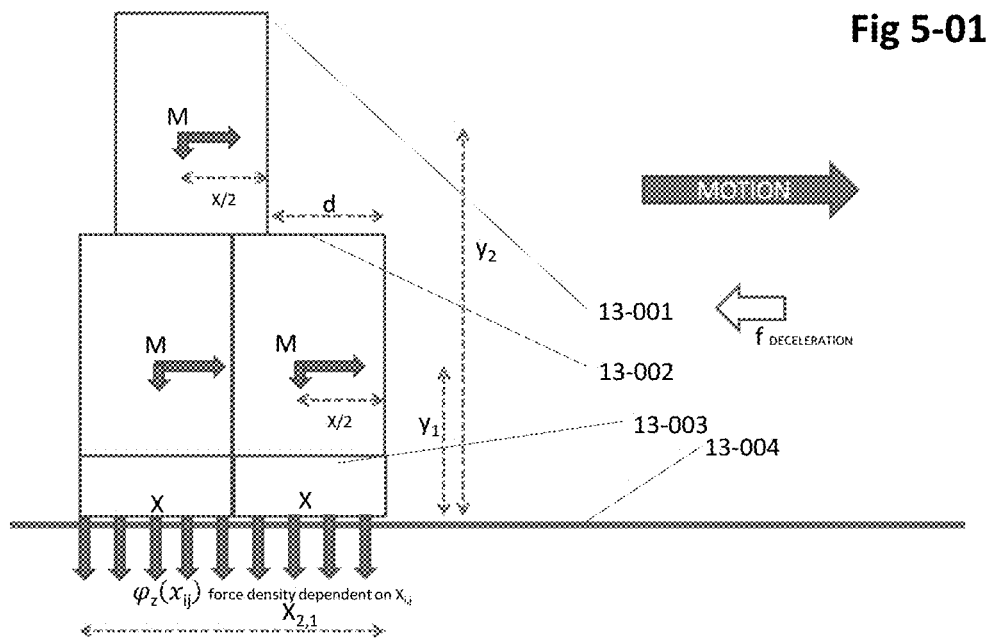
Figures 1A, 5:
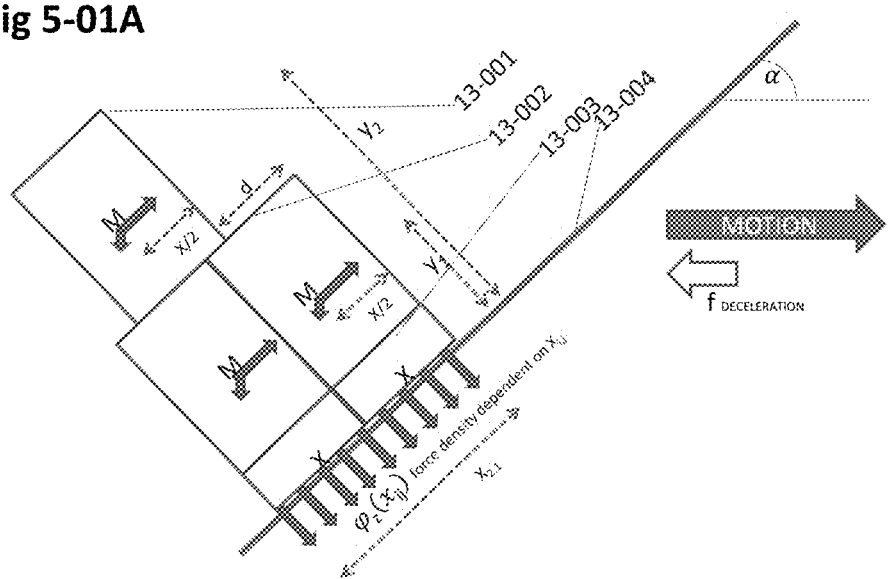
Figures 2, 5:
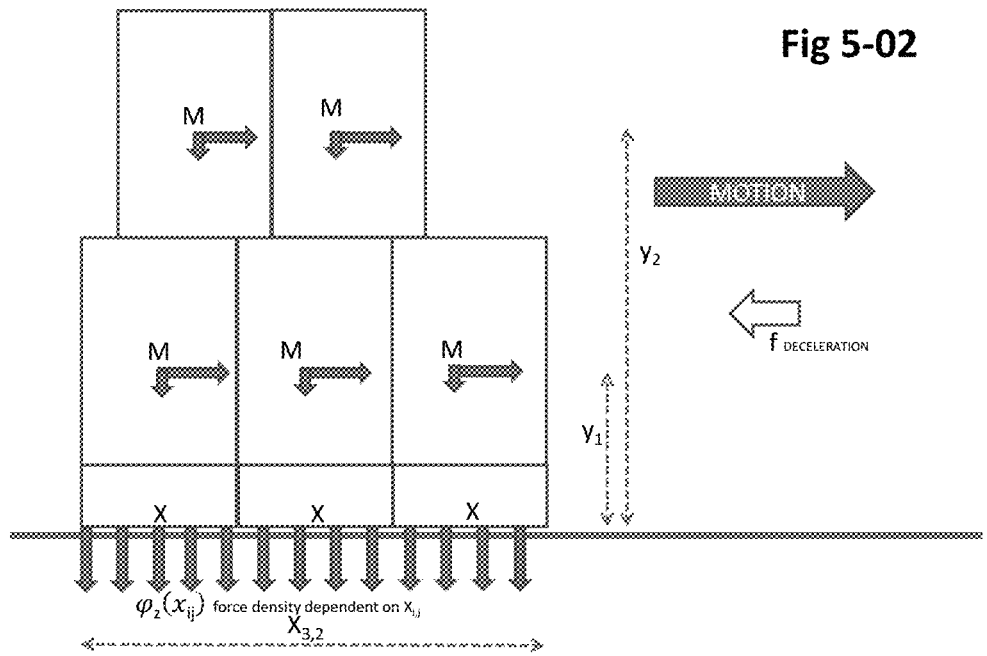
Figures 3, 5:
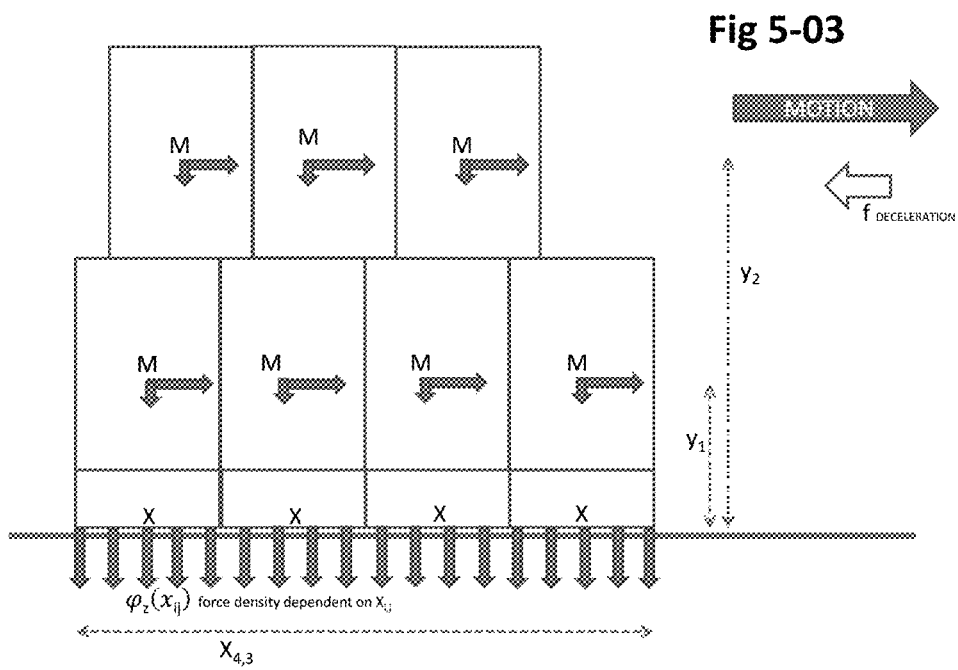
Figures 4, 5:
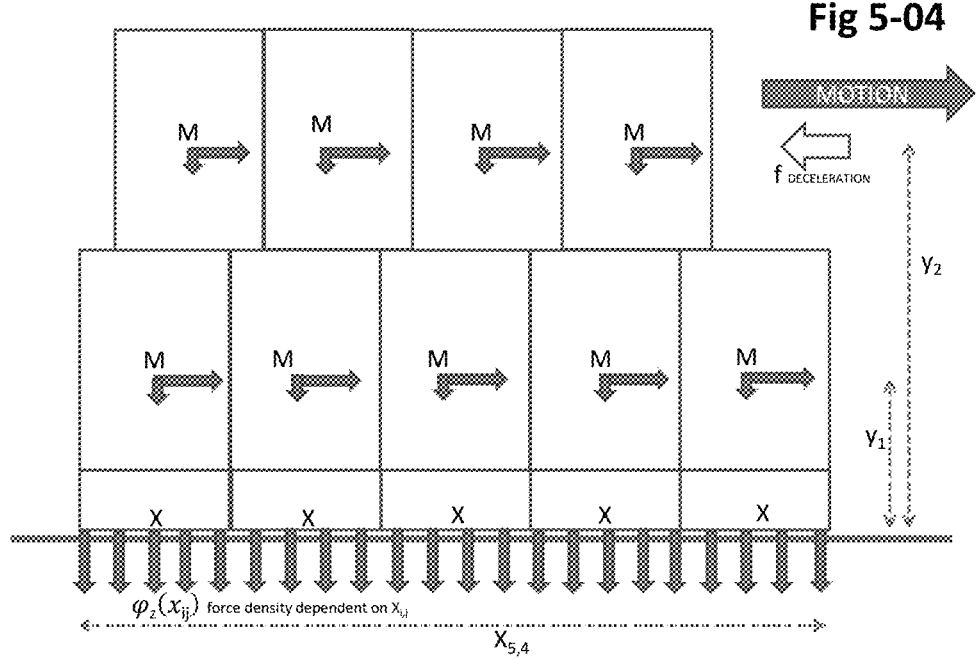
Figure 5:
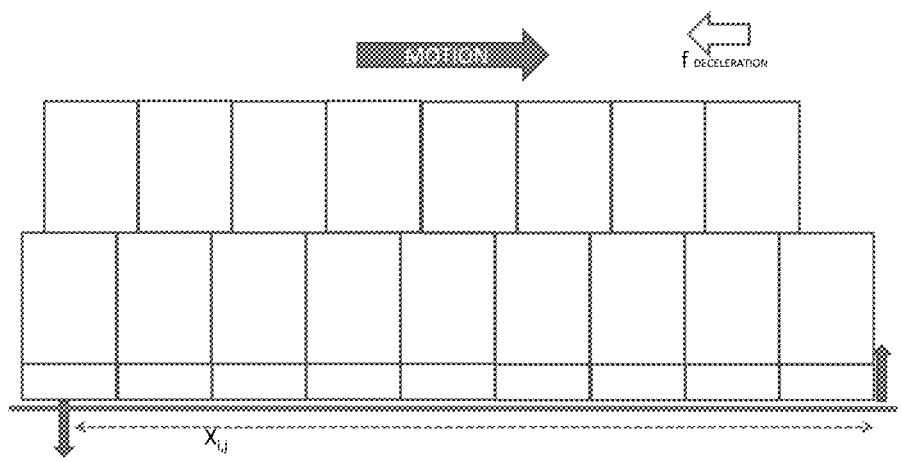
Figures 5, 6:
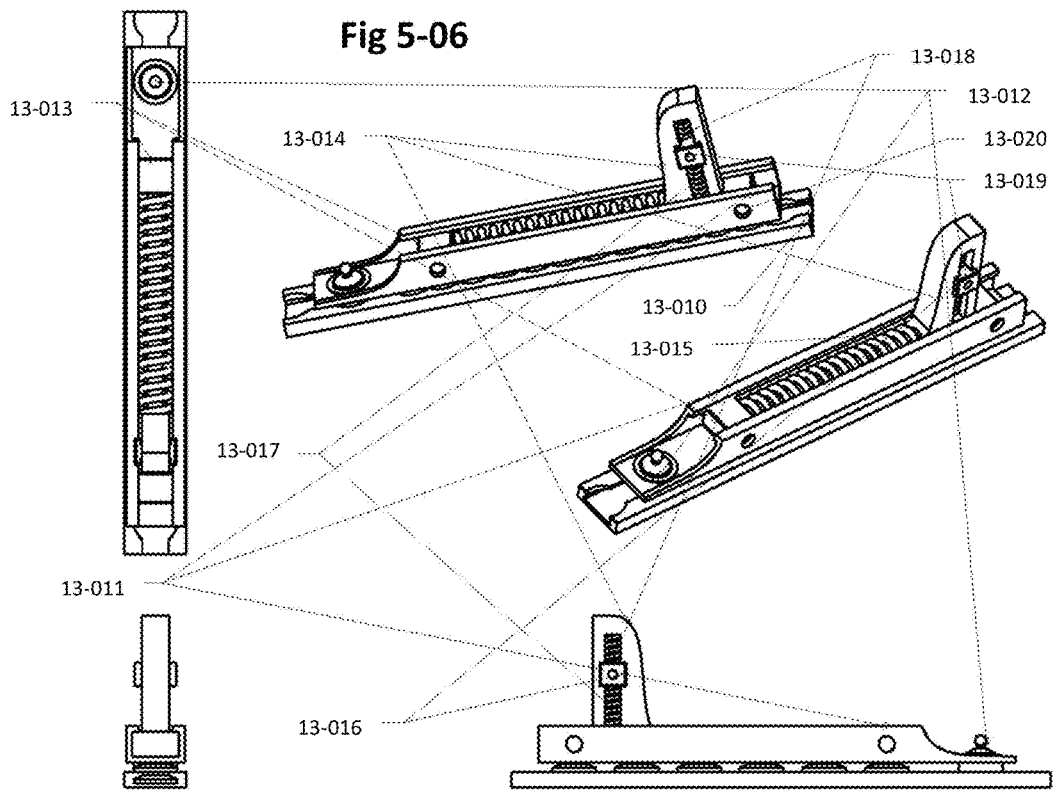
Figures 5, 6, 7:
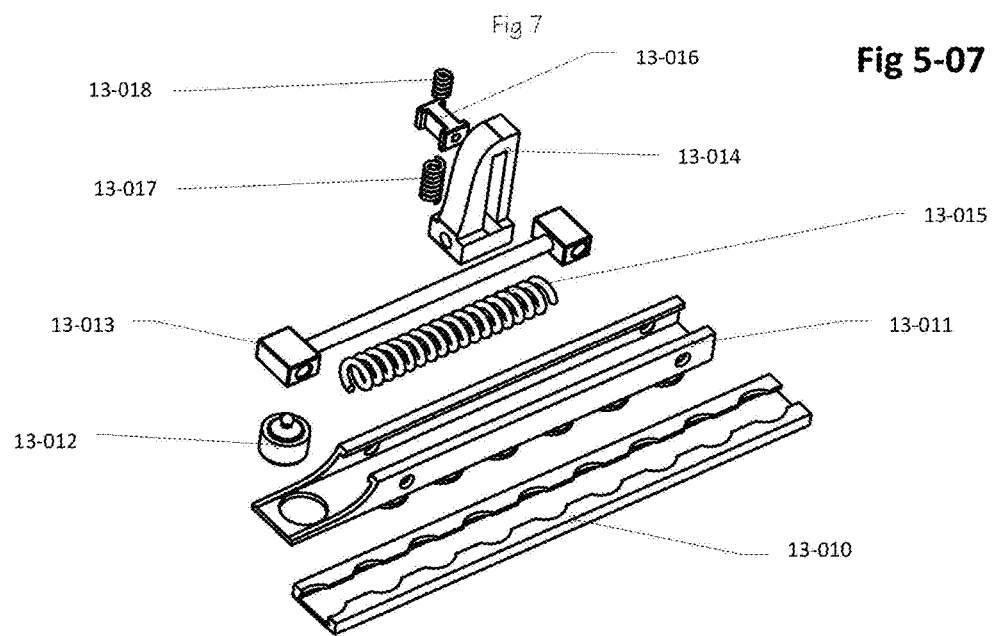
Figures 5, 6, 7, 8, 9, 9D:
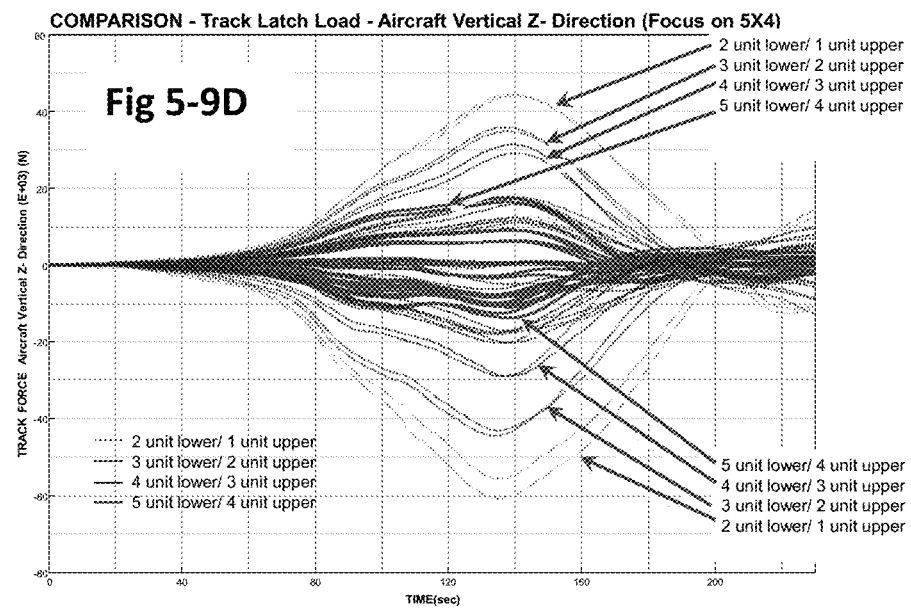
Figures 5, 6, 7, 8, 9, 10:
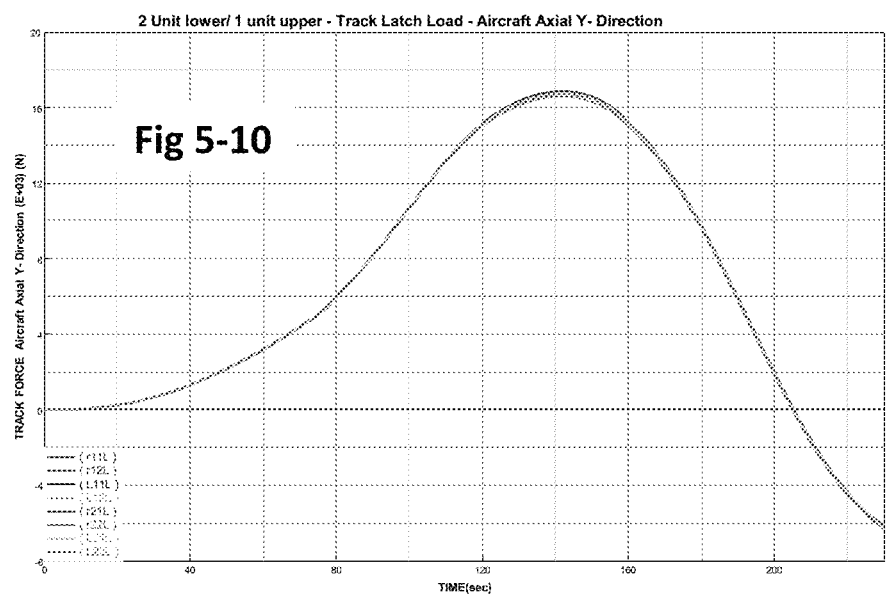
Figures 5, 6, 7, 8, 9, 10, 11:
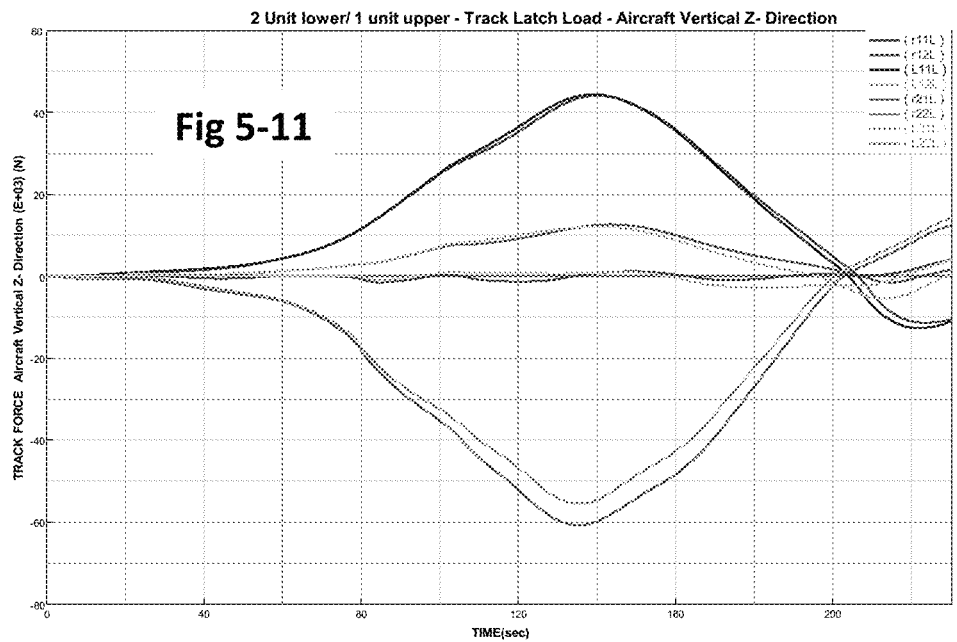
Figures 5, 6, 7, 8, 9, 10, 11, 12:
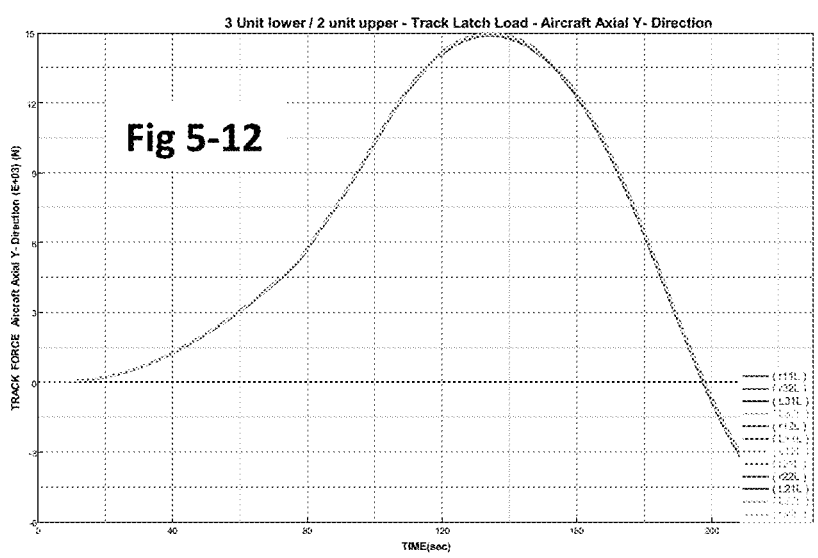
Figures 5, 6, 7, 8, 9, 10, 11, 12, 13:
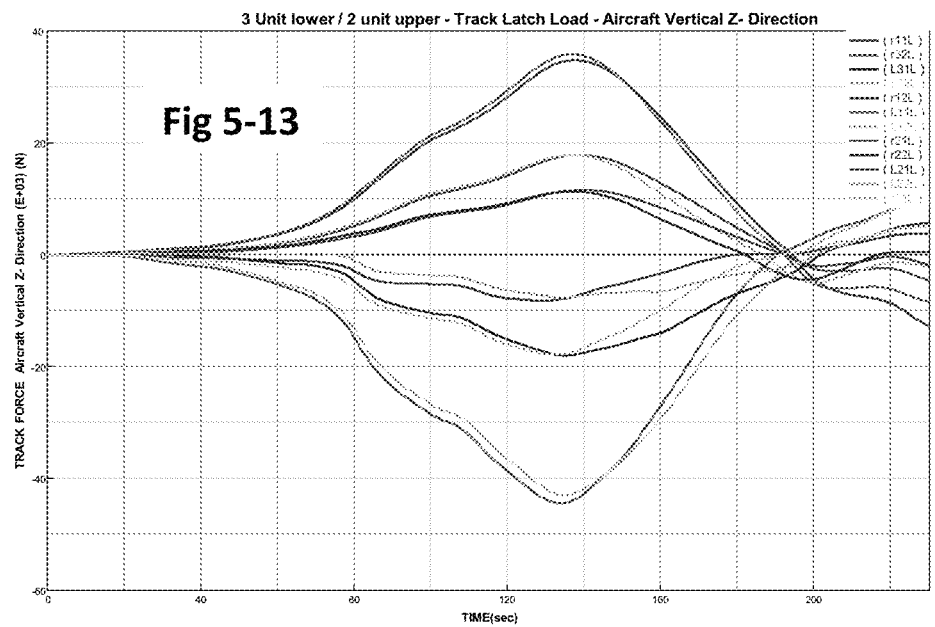
Figures 5, 6, 7, 8, 9, 10, 11, 12, 13, 14:
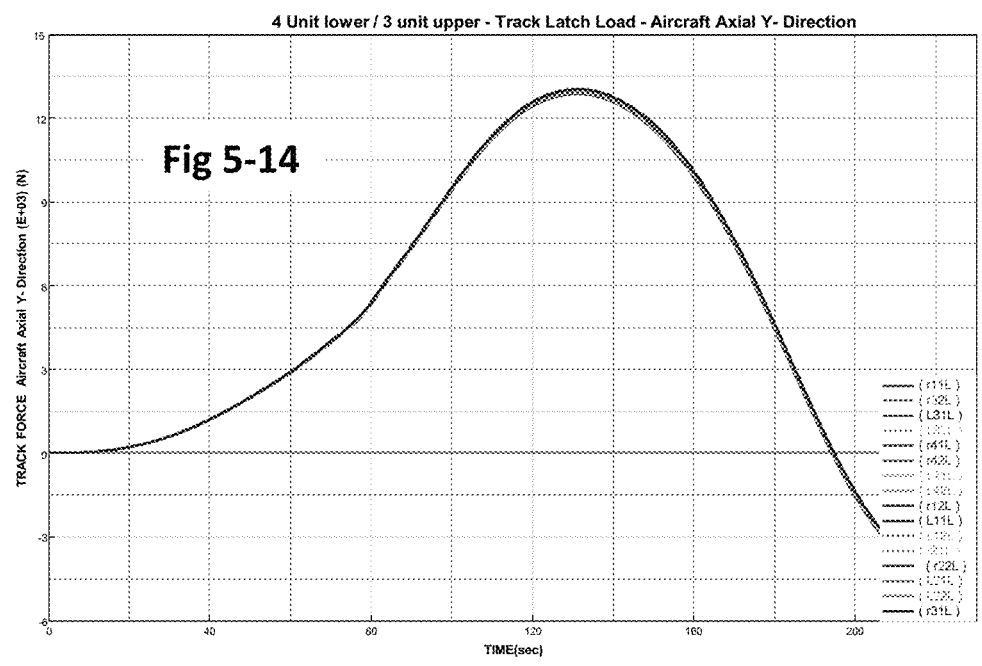
Figures 5, 6, 7, 8, 9, 10, 11, 12, 13, 14, 15:
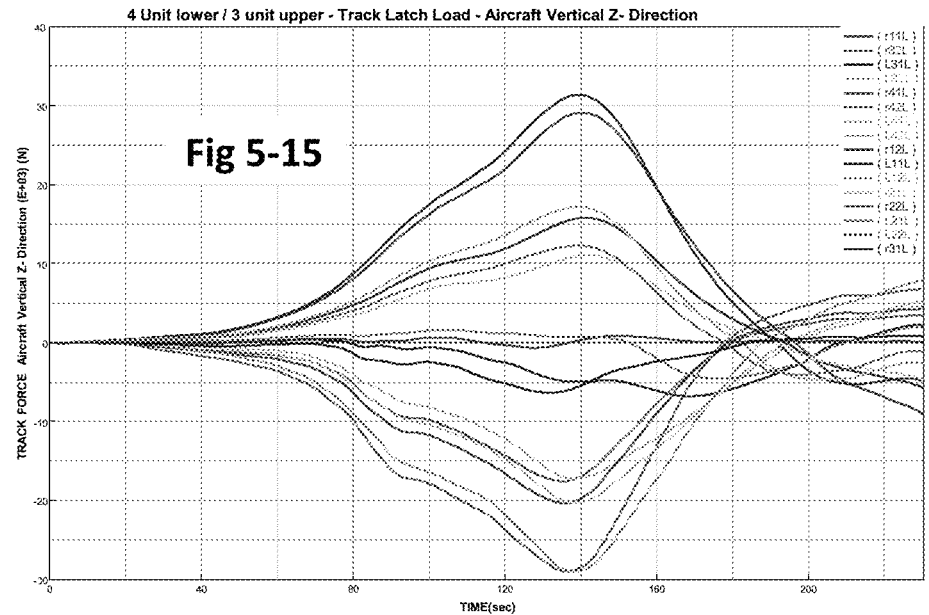
Figures 5, 6, 7, 8, 9, 10, 11, 12, 13, 14, 15, 16:
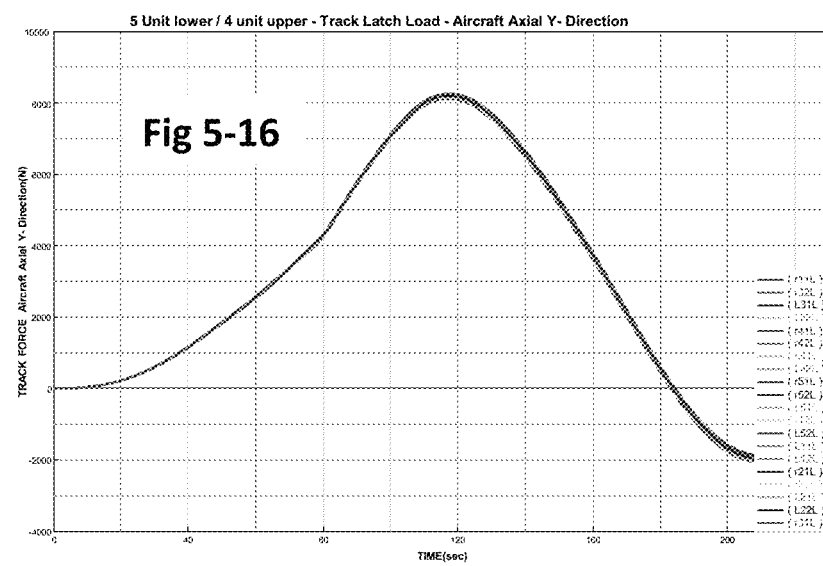
Figures 5, 6, 7, 8, 9, 10, 11, 12, 13, 14, 15, 16, 17:
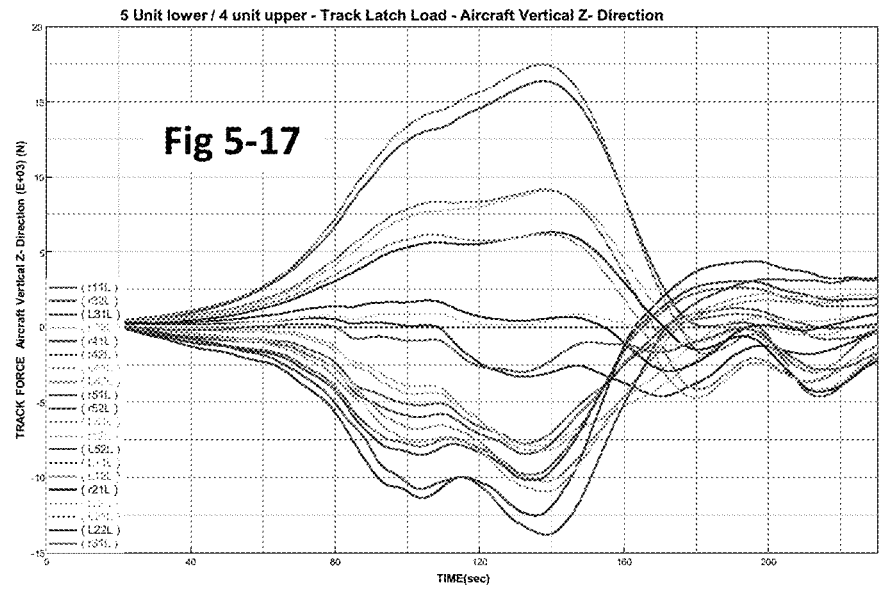
Figures 5, 6, 7, 8, 9, 10, 11, 12, 13, 14, 15, 16, 17, 18, 18A:
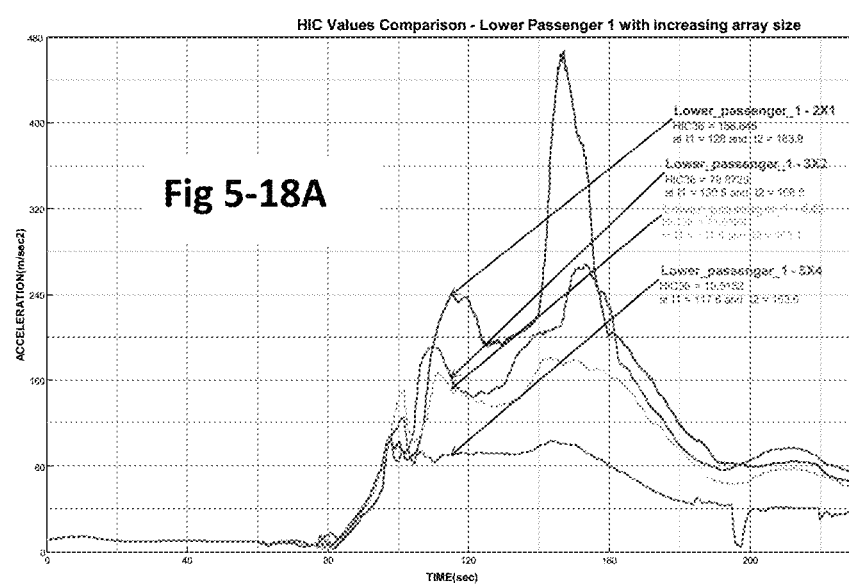
Figures 5, 6, 7, 8, 9, 10, 11, 12, 13, 14, 15, 16, 17, 18, 19, 20, 21, 22:
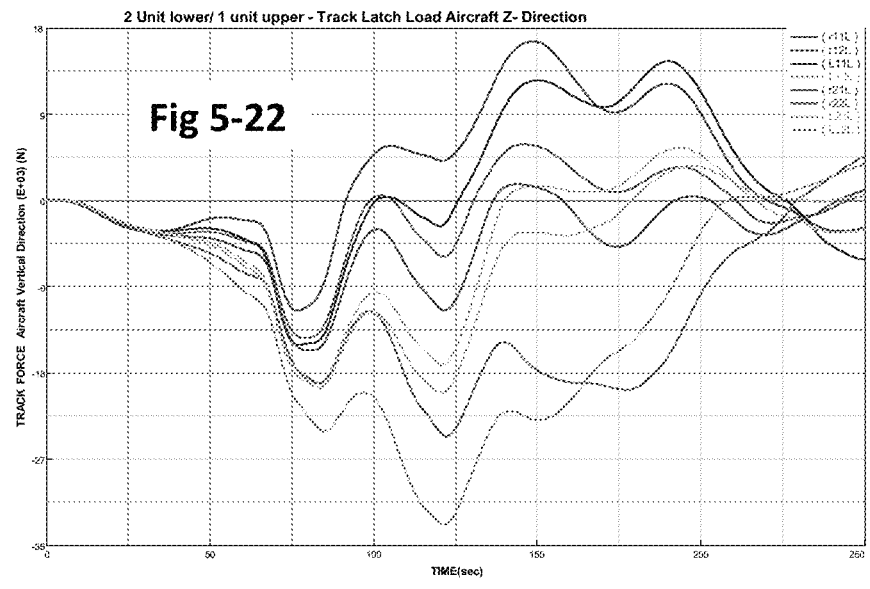
Figures 5, 6, 7, 8, 9, 10, 11, 12, 13, 14, 15, 16, 17, 18, 19, 20, 21, 22, 23:
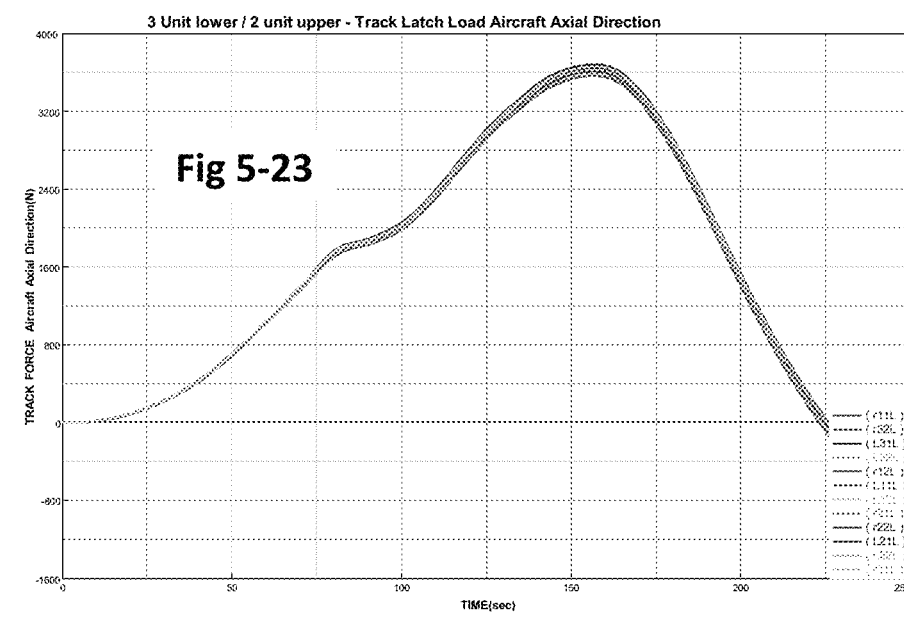
Figures 5, 6, 7, 8, 9, 10, 11, 12, 13, 14, 15, 16, 17, 18, 19, 20, 21, 22, 23, 24, 25, 26:
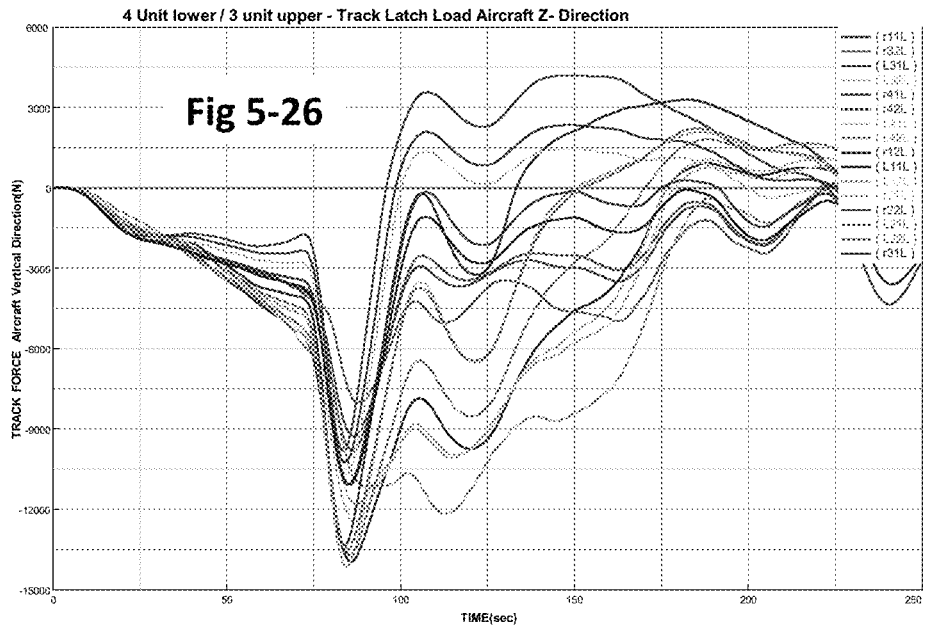
Figures 5, 6, 7, 8, 9, 10, 11, 12, 13, 14, 15, 16, 17, 18, 19, 20, 21, 22, 23, 24, 25, 26, 27:
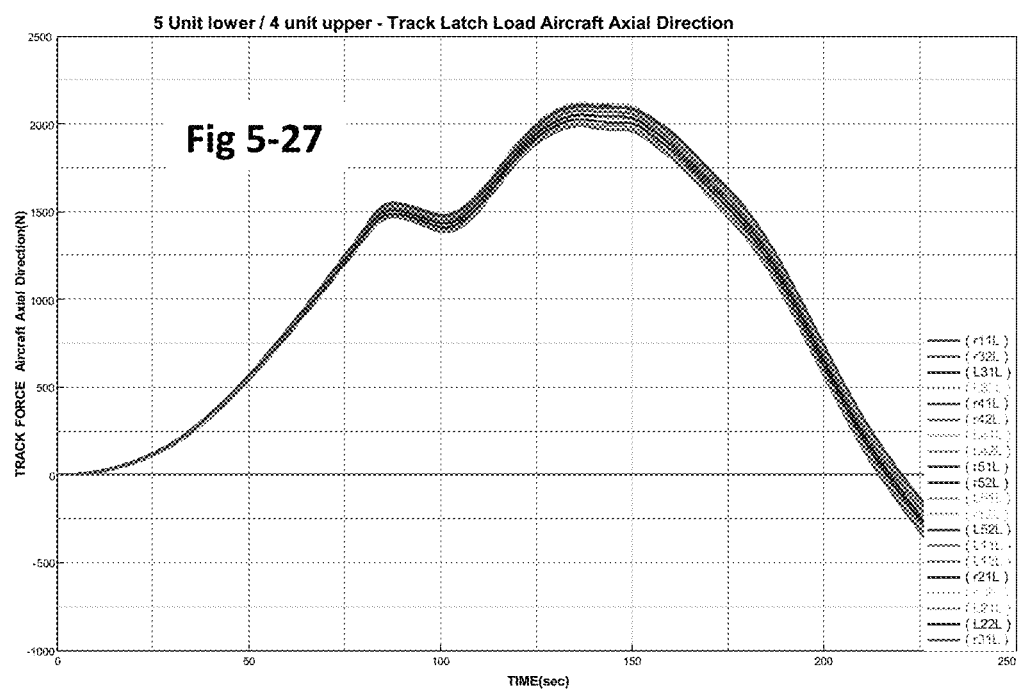
Figures 5, 6, 7, 8, 9, 10, 11, 12, 13, 14, 15, 16, 17, 18, 19, 20, 21, 22, 23, 24, 25, 26, 27, 28:
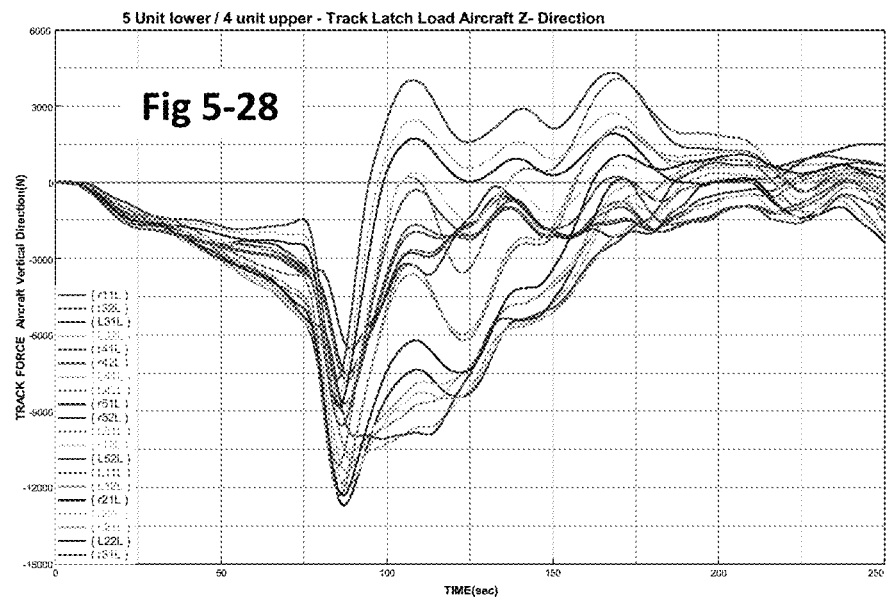
Figures 5, 6, 7, 8, 9, 10, 11, 12, 13, 14, 15, 16, 17, 18, 19, 20, 21, 22, 23, 24, 25, 26, 27, 28, 29:
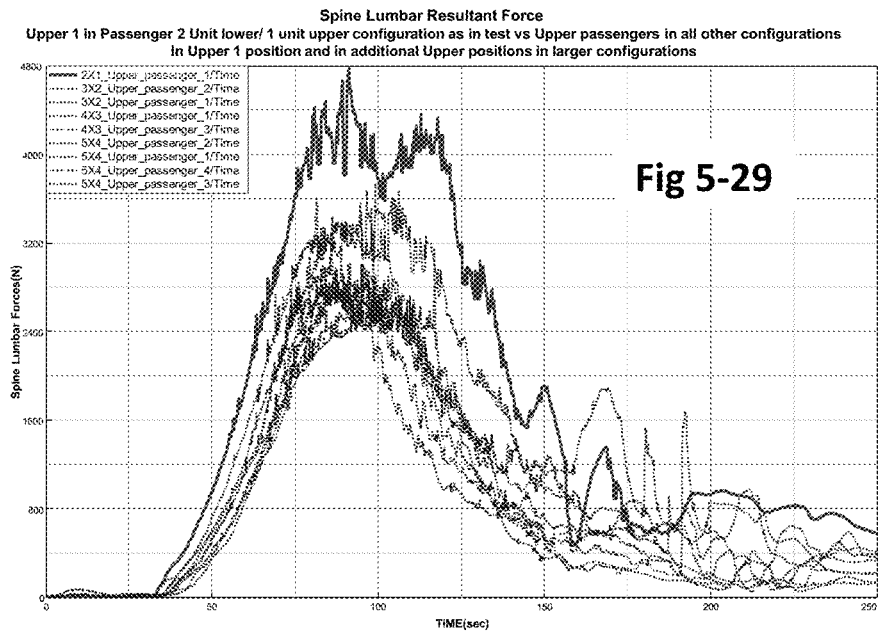
Figures 5, 6, 7, 8, 9, 10, 11, 12, 13, 14, 15, 16, 17, 18, 19, 20, 21, 22, 23, 24, 25, 26, 27, 28, 29, 30:
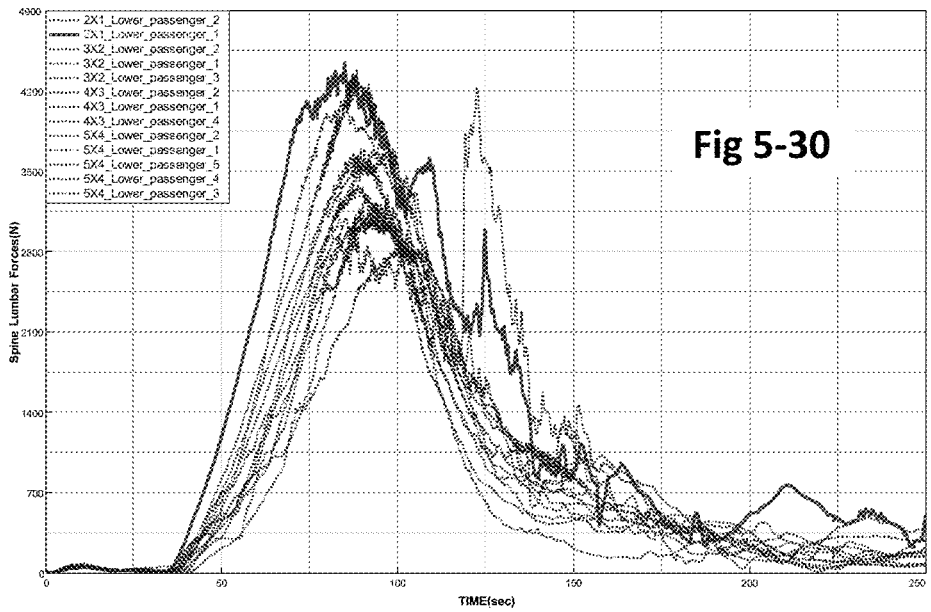
Figures 5, 6, 7, 8, 9, 10, 11, 12, 13, 14, 15, 16, 17, 18, 19, 20, 21, 22, 23, 24, 25, 26, 27, 28, 29, 30, 31:
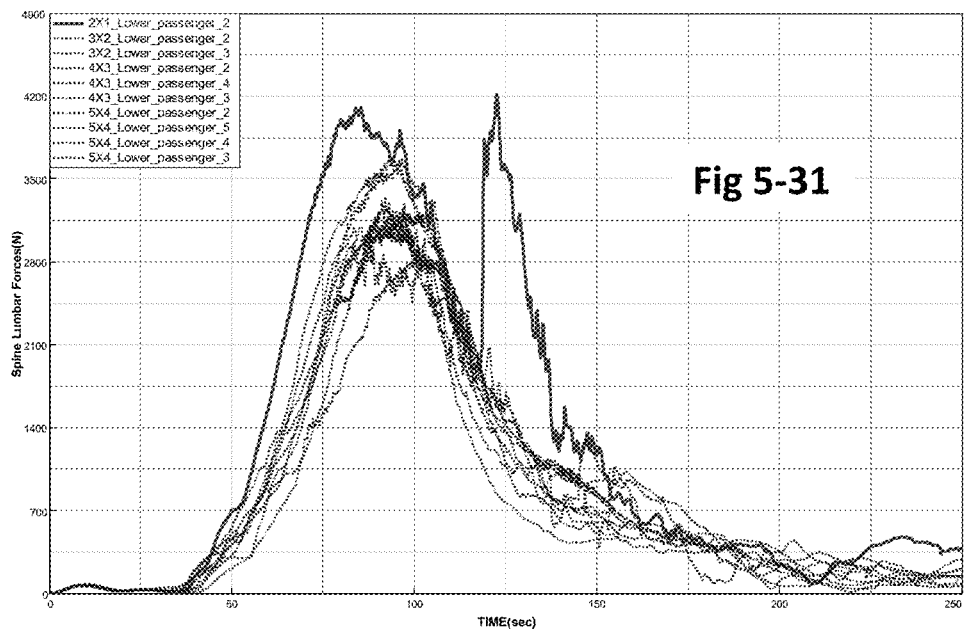
Figures 5, 6, 7, 8, 9, 10, 11, 12, 13, 14, 15, 16, 17, 18, 19, 20, 21, 22, 23, 24, 25, 26, 27, 28, 29, 30, 31, 32:
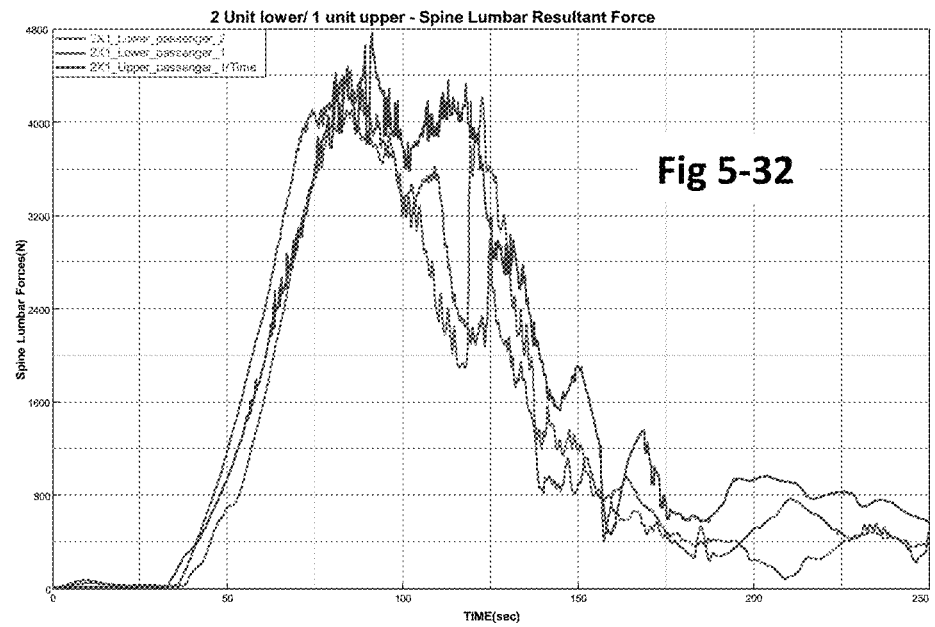
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33:
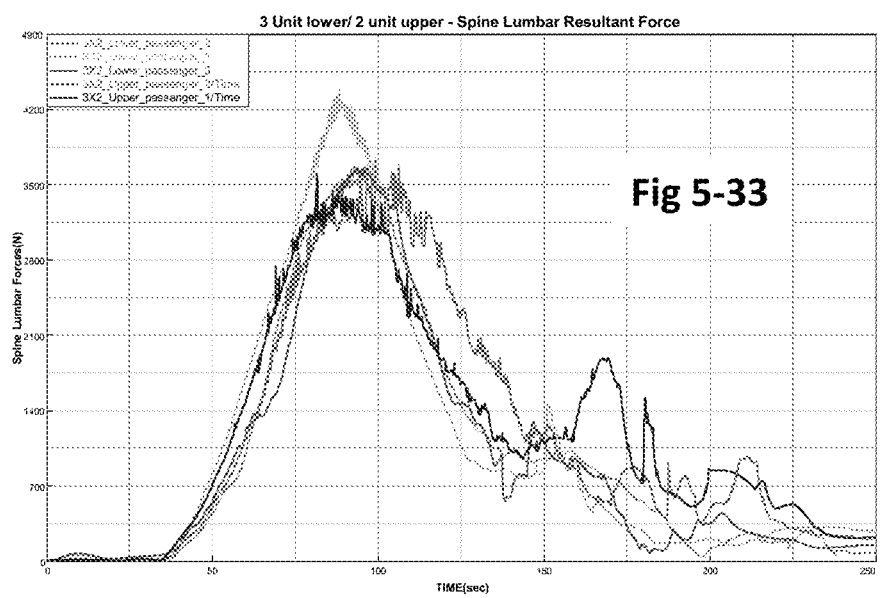
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
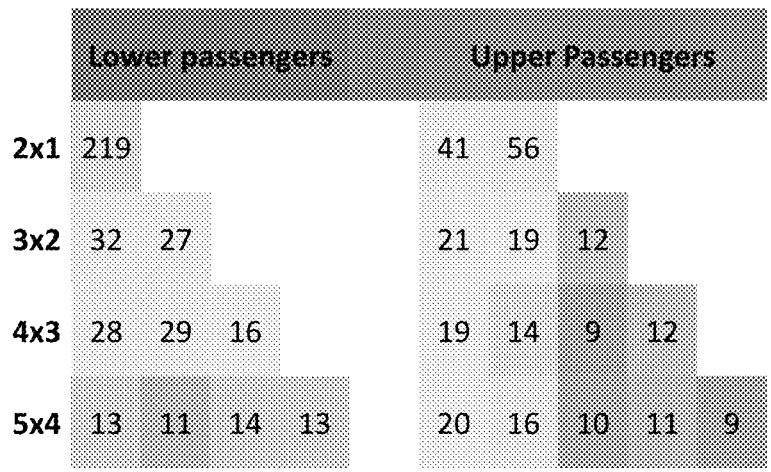
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
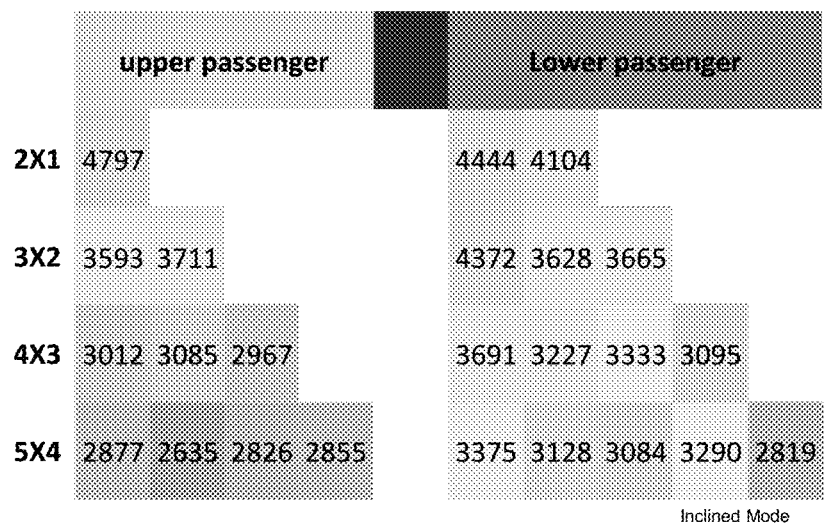
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
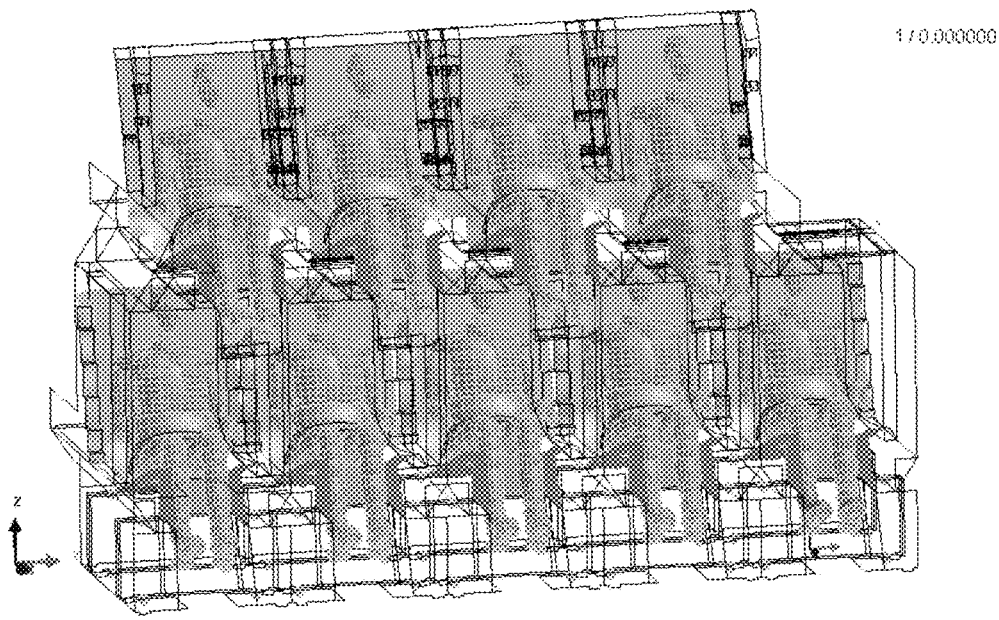
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
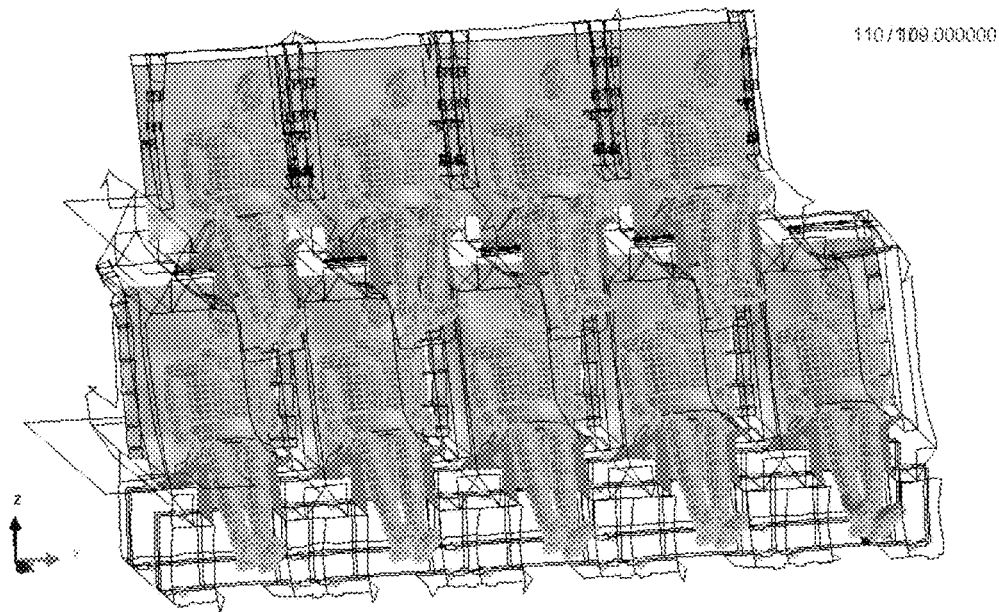
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
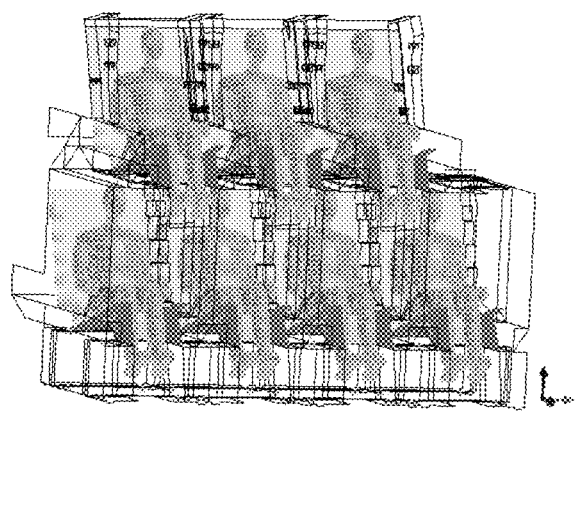
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
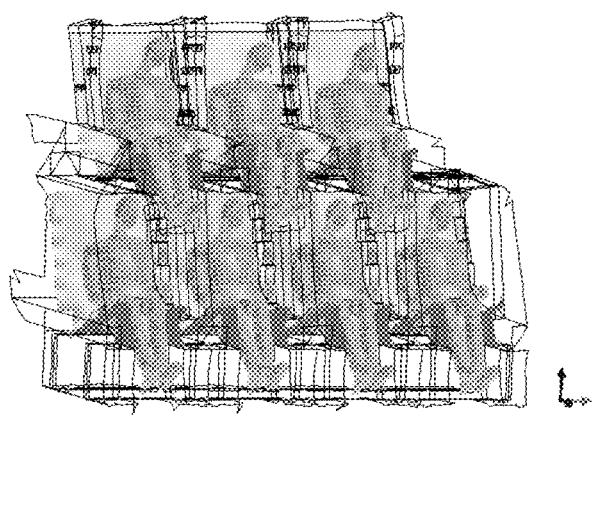

FIG. 5-01A shows the same modular system of FIG. 5-01 but where the impact loading is at an angle α To the orientation of the tracks.

FIG. 5-02 shows a modular system of occupant supports where there are two upper occupant supports supported by three lower occupant supports.

FIG. 5-03 shows a modular system of occupant supports where there are three upper occupant supports supported by four lower occupant supports.

FIG. 5-04 shows a modular system of occupant supports where there are four upper occupant supports supported by five lower occupant supports.

FIG. 5-05 shows a long array of occupant support along the axis of a vehicle.

Figures 1, 2, 3, 4, 5, 6, 7:
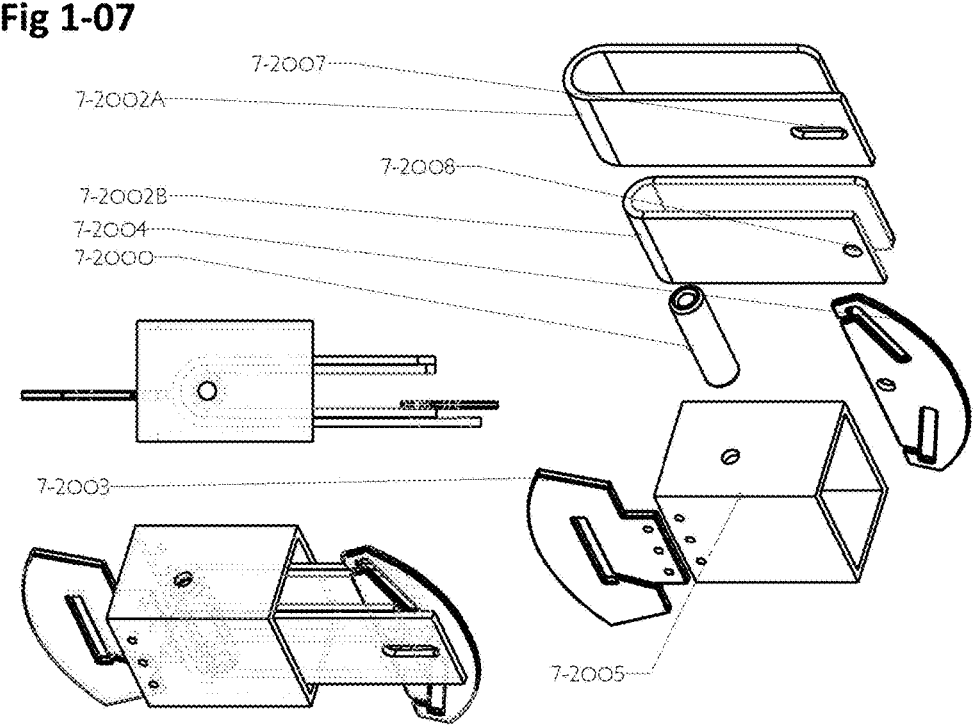

FIG. 5-06, FIG. 5-07 shows different views of a Latch mechanism for the array of occupant supports with shock absorption devices with spring dampers (only springs shown)

FIG. 5-08 to 5-36 show results for the empirical simulation validation of the method of this invention.

FIG. 5-37 is a table of Lumbar Loadings for inclined orientation.

FIG. 5-38 to 5-44 show the different configurations in the simulations both at the start of the frame sequence and during the impact event.

FIGS. 5-38 to 5-45 show the arrangement in the simulations at time −0 and during impact.

FIG. 5-46 shows the load supported by a lower unit in the tiered configurations of FIG. 5-01 to 5-05.

FIG. 5-47—shows views of a side guard for a child seat

FIG. 5-48,5-49—shows parts of the side guard modified to accommodate different shoulder (or thorax) widths. It has serrations or notches that allow the ends to be secured in different positions relative to the center.

FIG. 5-50 shows the tapered form for leading the harness over the support bar, while providing a profile that does not allow it the harness to ride up towards the center of the seat.

FIG. 5-51 shows the same form that is either slidably or pivotally attached to the bar—in a version that is field installable by having two interlocking halves that are designed to stay together during an axial load as in a impact situation where the harness is under tension.

FIGS. 6-01 to 6-05, Show an array of AirSleeper occupant supports in a vehicle—in particular an aircraft.

FIG. 6-06 to 6-10 show a single lower AirSleeper occupant support unit

FIG. 6-11 Shows an upper Air Sleeper occupant support unit.

FIGS. 6-12 to 6-13 Show an embodiment of the actuation mechanism and motion of the seats for multiple positions between sit up and lay flat.

FIG. 6-14 shows the retraction of the center section of the leg rest in one of the embodiments. The Leg rest may also retract with an angular displacement about the rear edge and attached to the seat bottom in other embodiments.

FIG. 6-15 shows the bottom storage bin that has either integrated or attached support features with an option al drawer and optional belt FIGS. 6-16 and 6-17 show an alternative architecture for the actuation of the seat back and bottom.

The seat bottom here moves forward when in the sitting position.

Figures 1, 2:
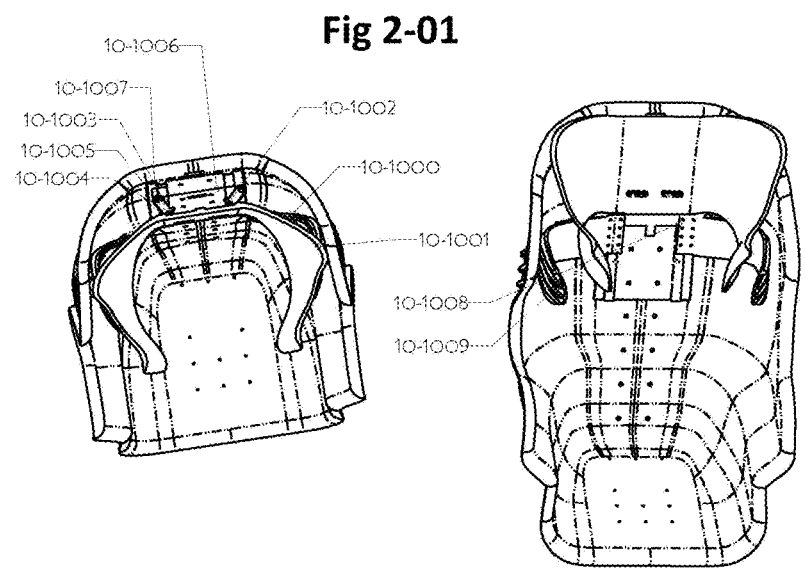
Figure 2:
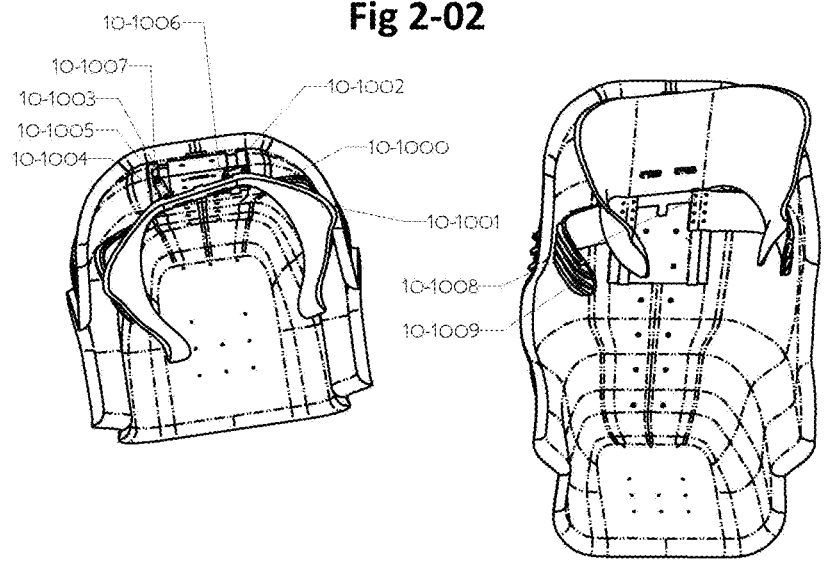
FIG. 2-03 shows another design of the invention where the headrest continues to be attached to the links however the shoulder guard and the thorax guard (one of the shoulder guard and the thorax guard are needed. Alternatively another support on the side of the body can be used) are on slides for lateral sliding they are engaged together with an actuating arm.
Figures 2, 3:
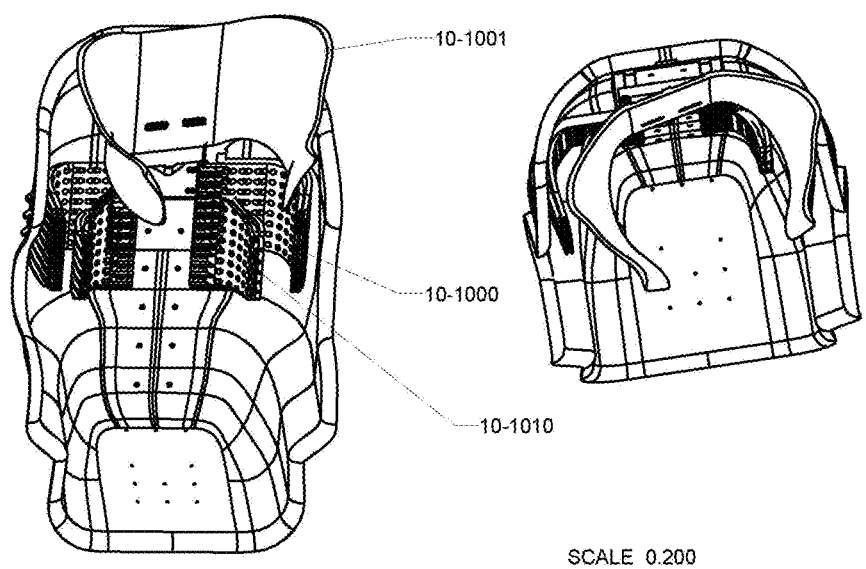
Figures 2, 3, 3A:
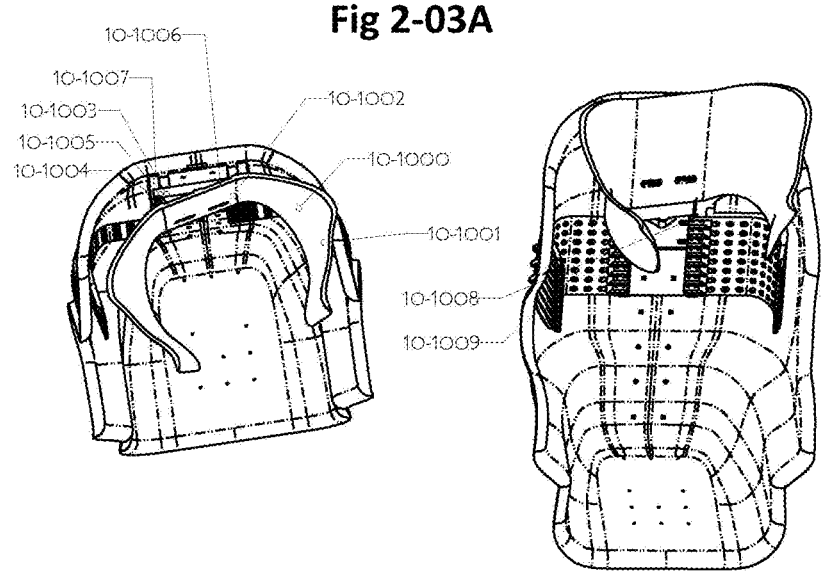
Figures 2, 3, 4, 4A:
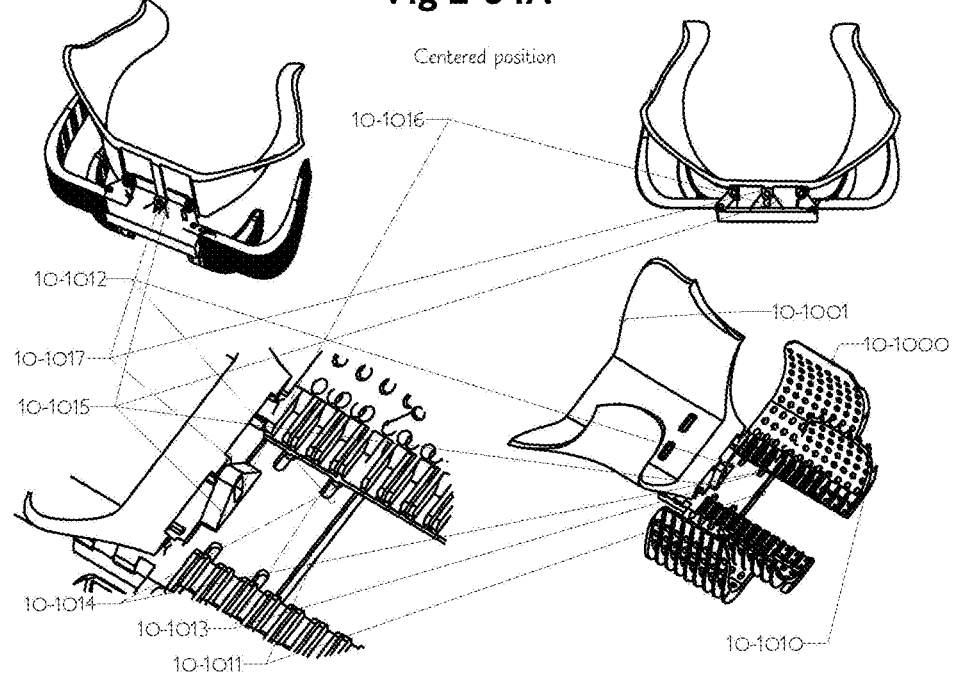
Figures 2, 3, 4, 4B:
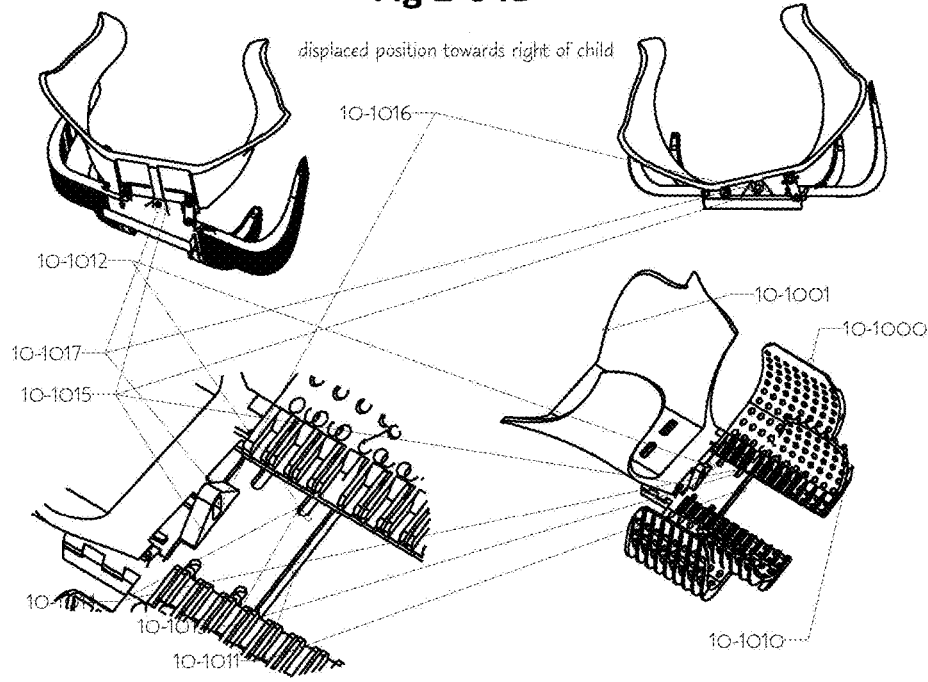
Figures 2, 3, 4, 4C:
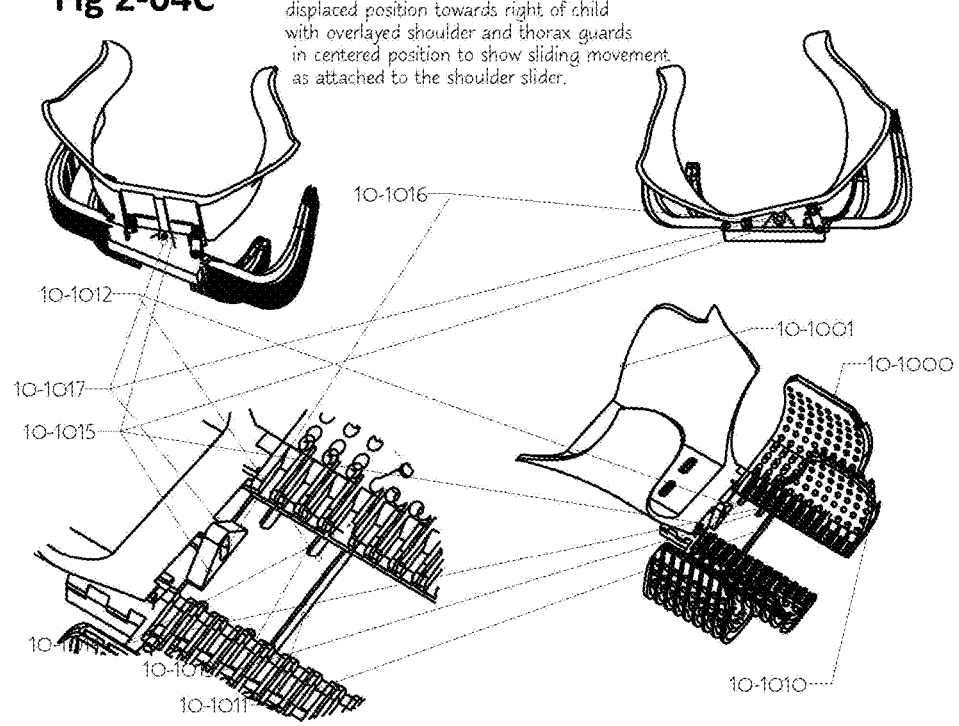
Figures 2, 3, 4, 5:
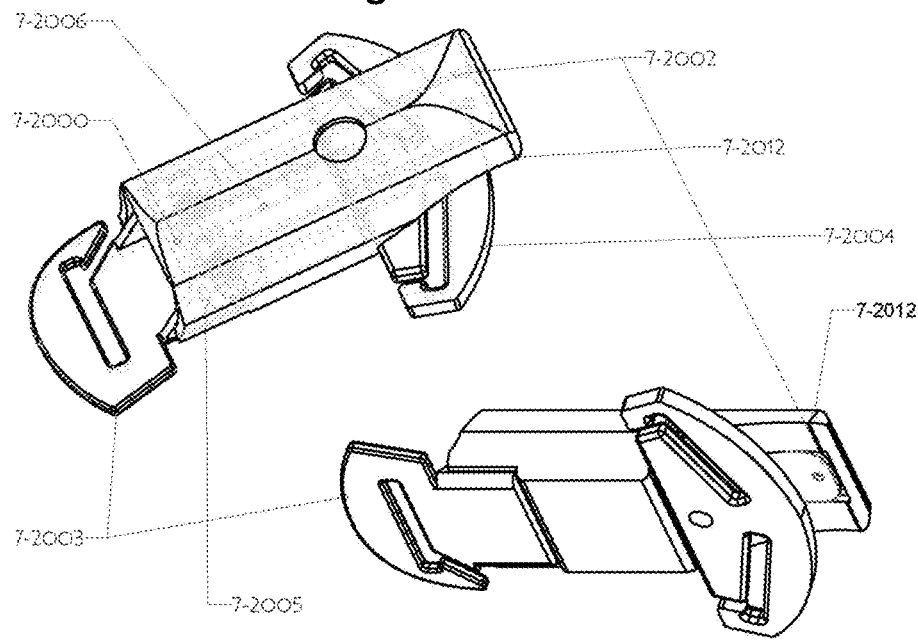
Figures 2, 3, 4, 5, 6:
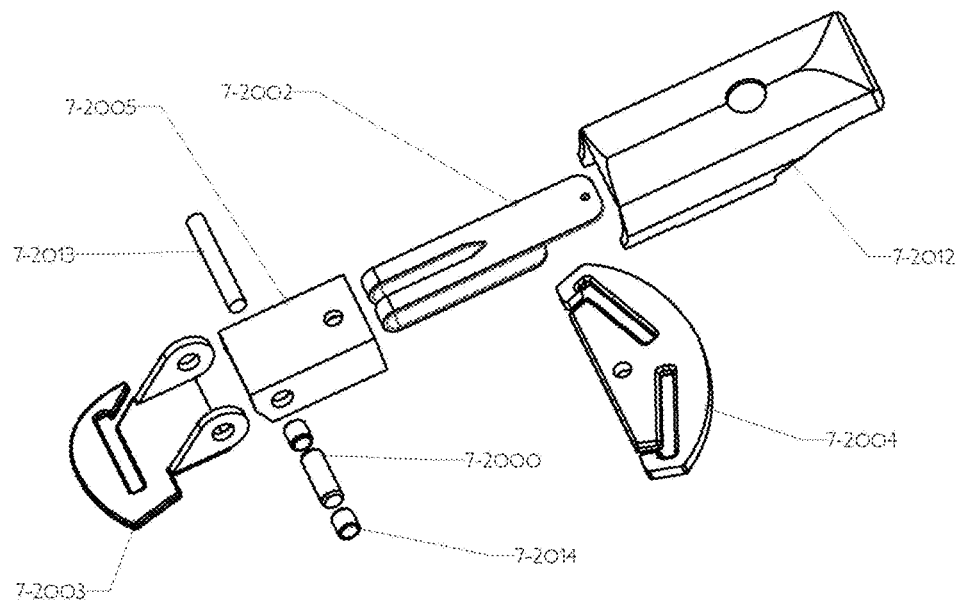
Figures 2, 3, 4, 5, 6, 7:
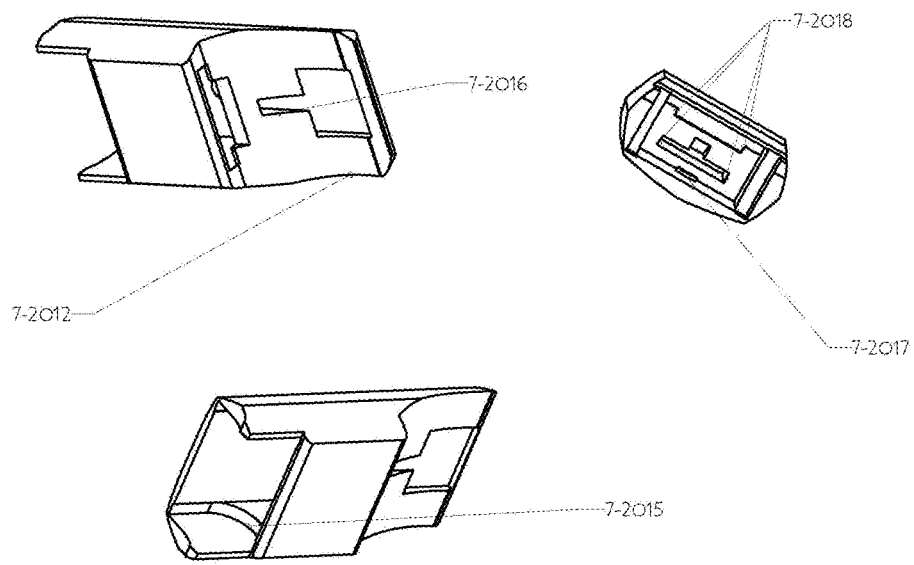
Figures 1, 3:
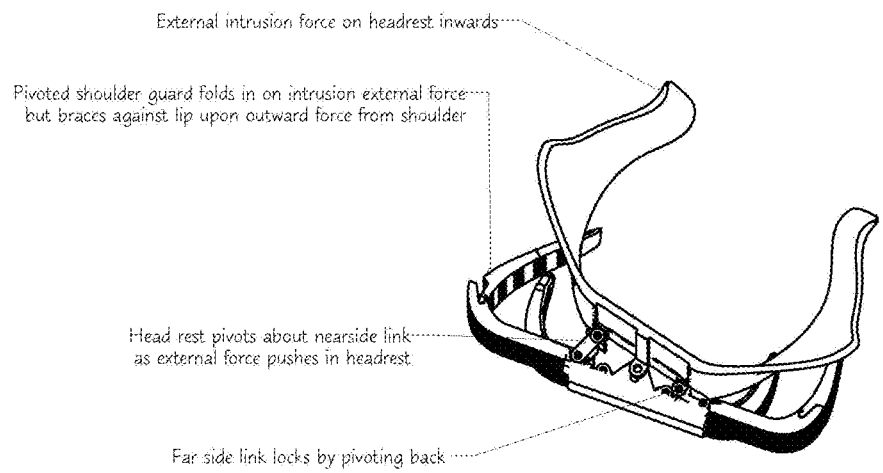
Figures 3, 4:
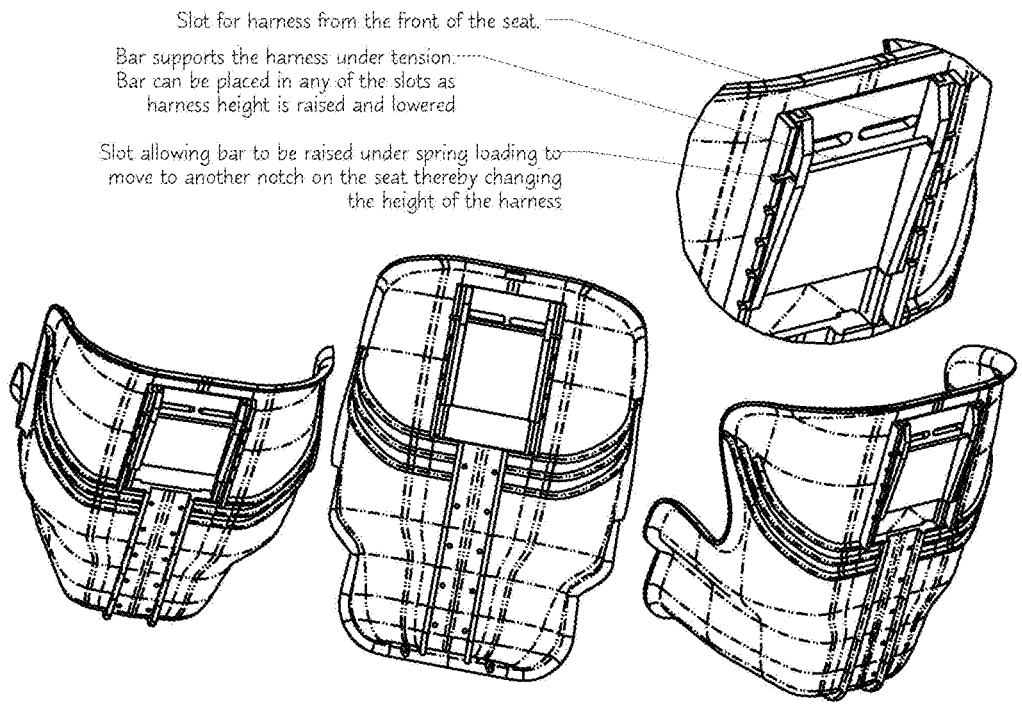
Figures 3, 4, 5:
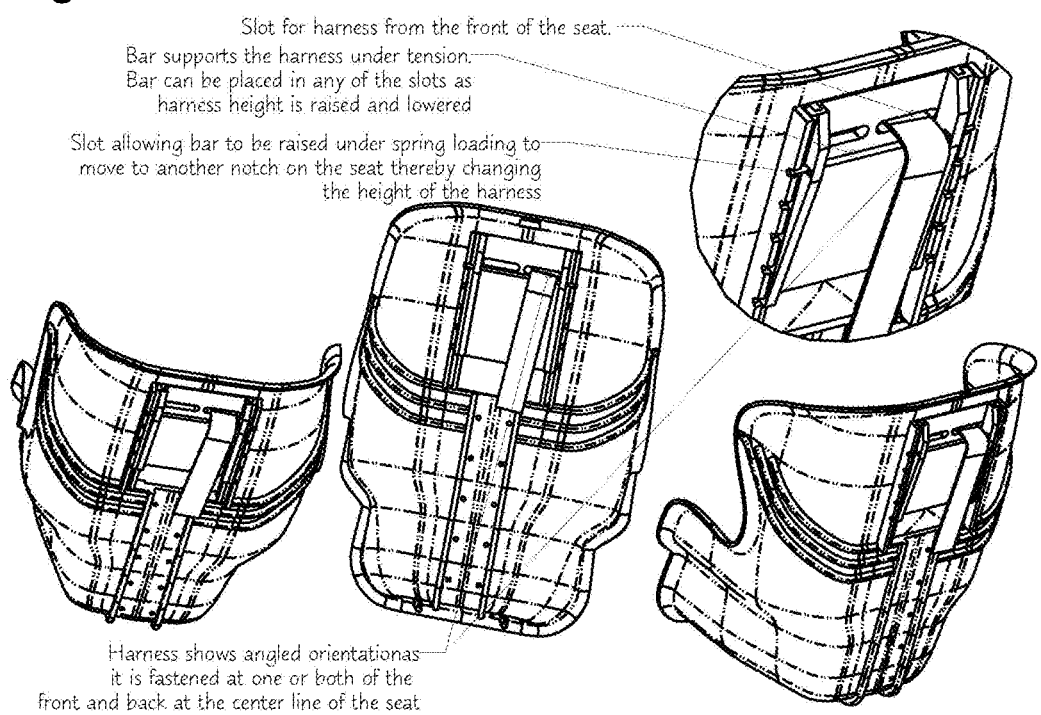
Figures 3, 4, 5, 6:
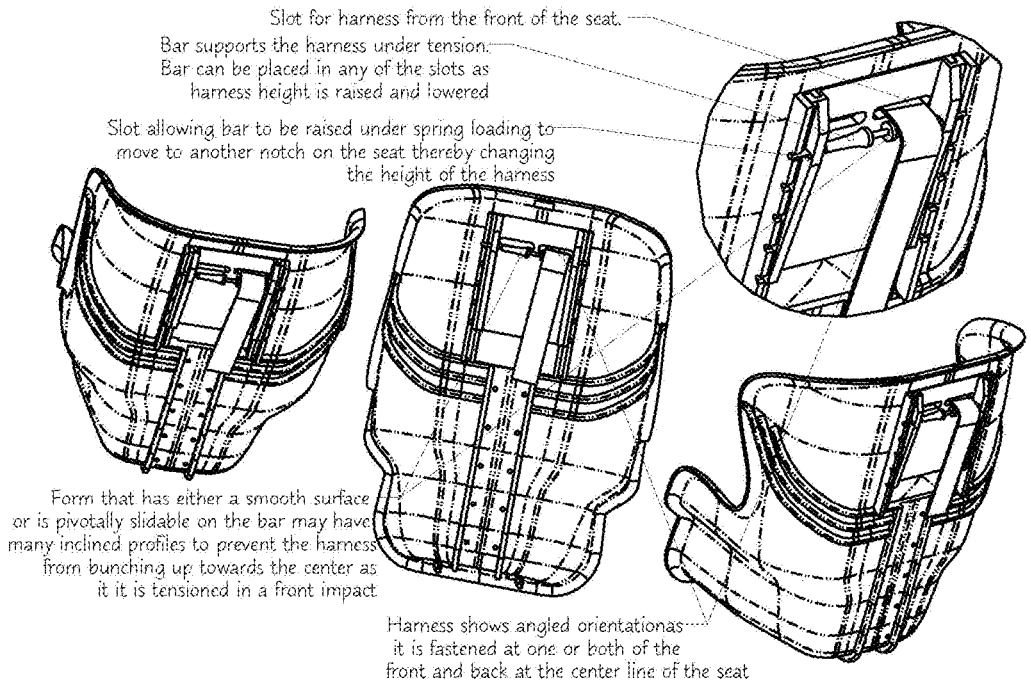
Figures 3, 4, 5, 6, 7:
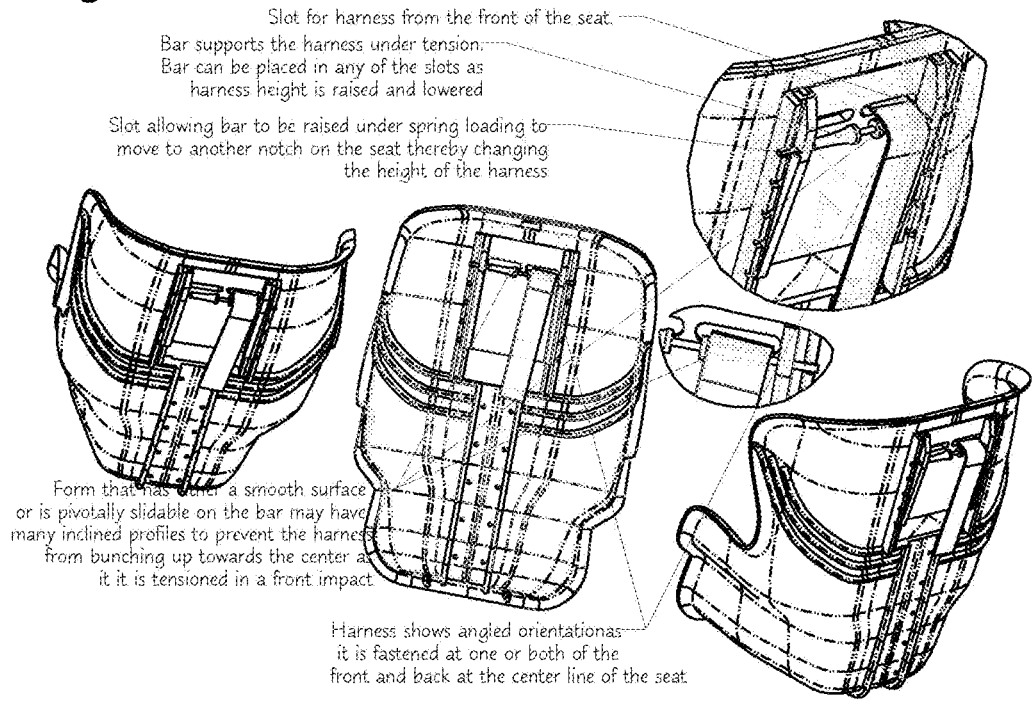
Figures 1, 4:
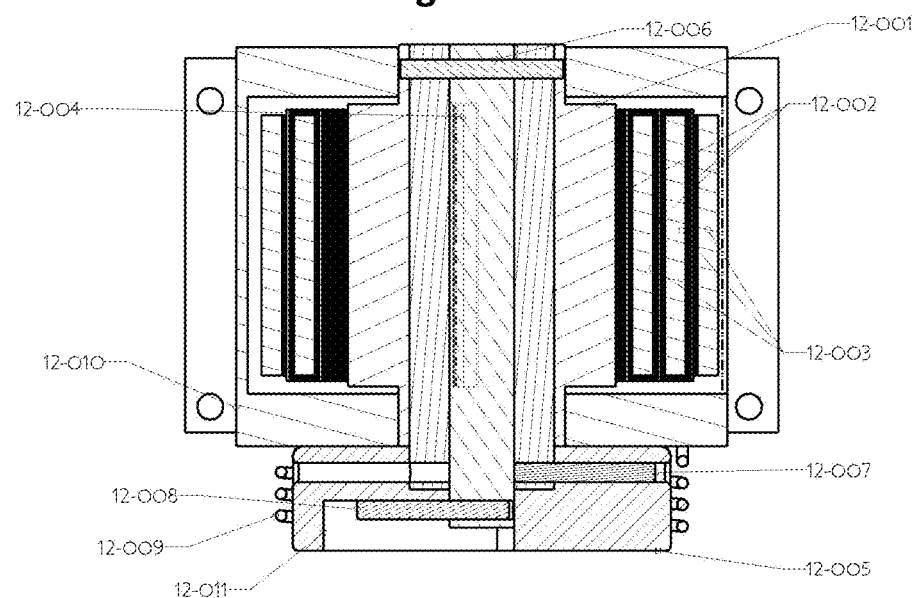
Figures 2, 4:
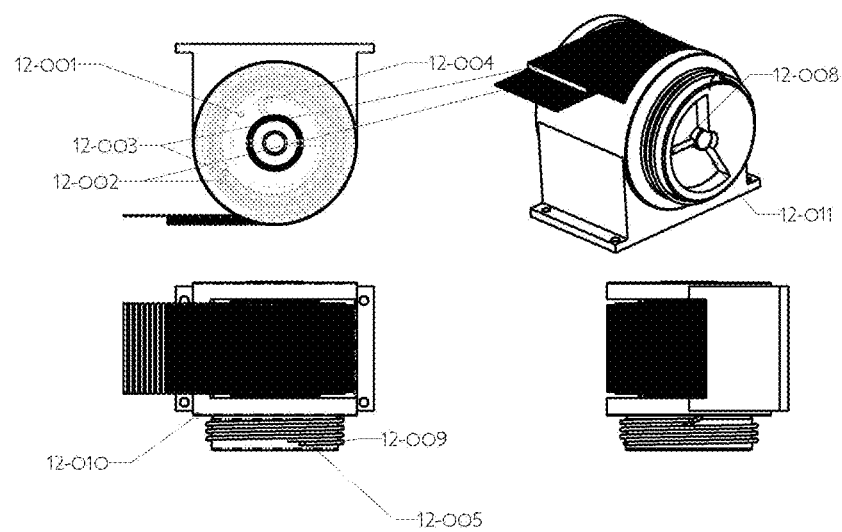
Figures 3, 4:
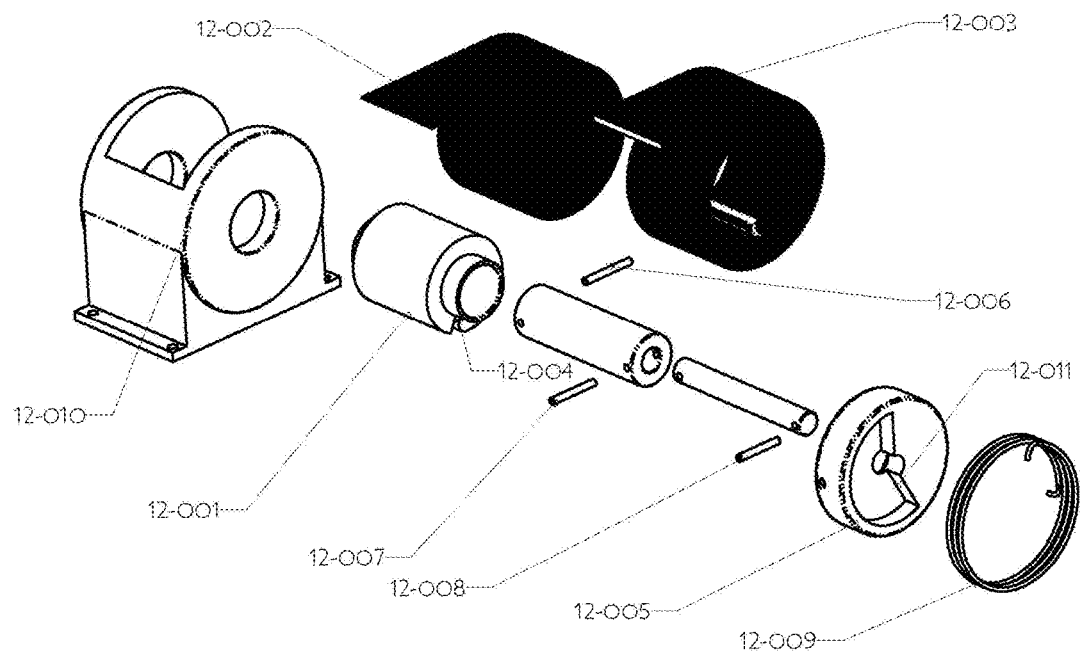
Figure 4:
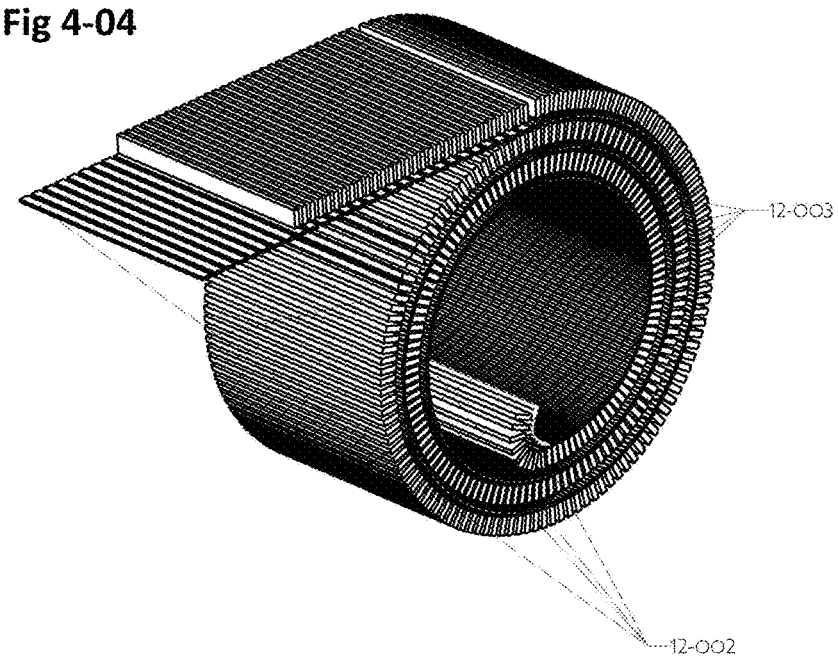
Figures 4, 5:
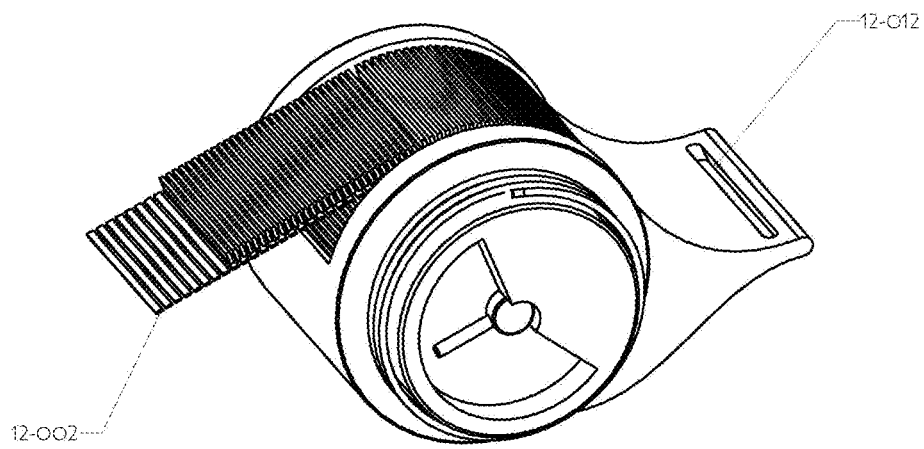
Figures 4, 5, 6:
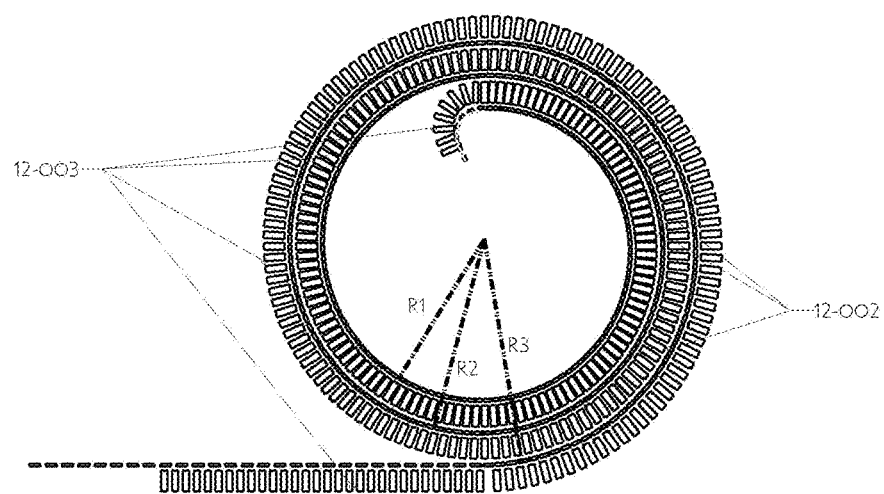
Figures 4, 5, 6, 7:
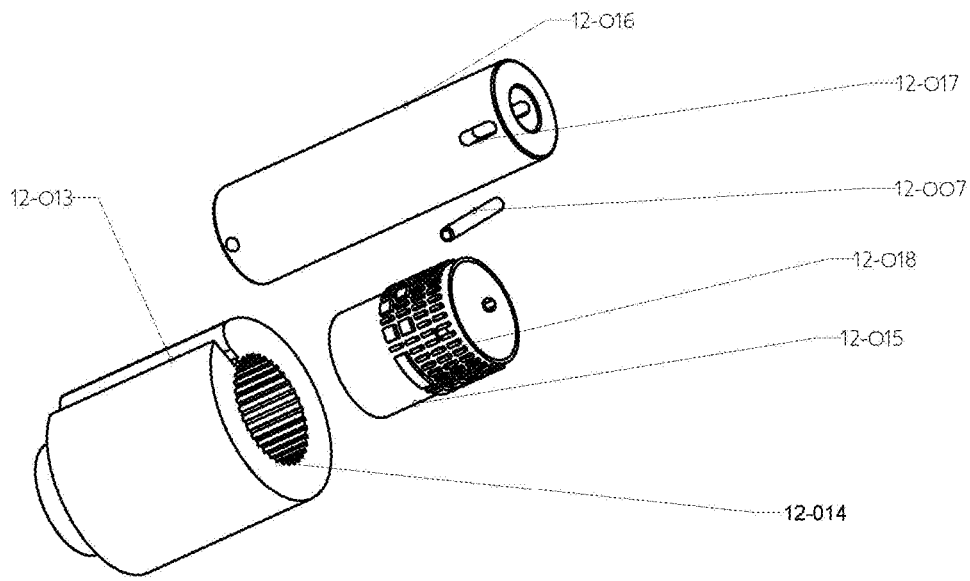
Figures 4, 5, 6, 7, 8:
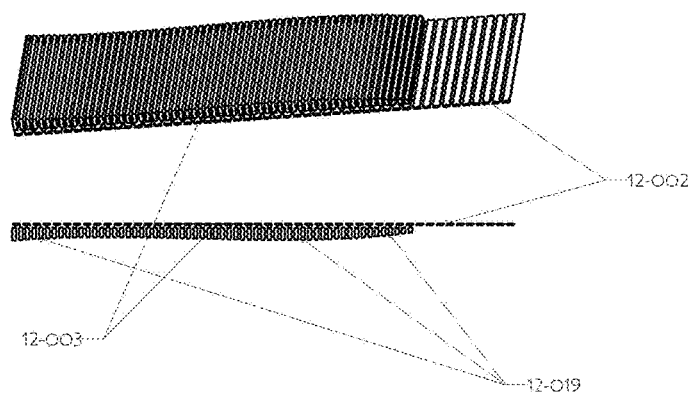
Figures 4, 5, 6, 7, 8, 9:
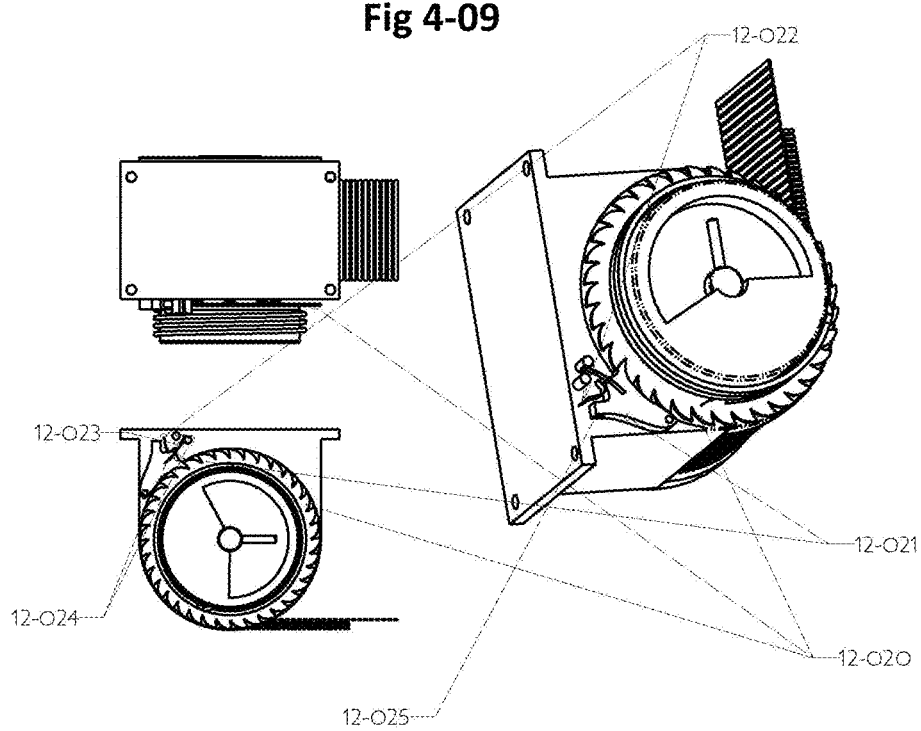
Figures 4, 5, 6, 7, 8, 9, 10:
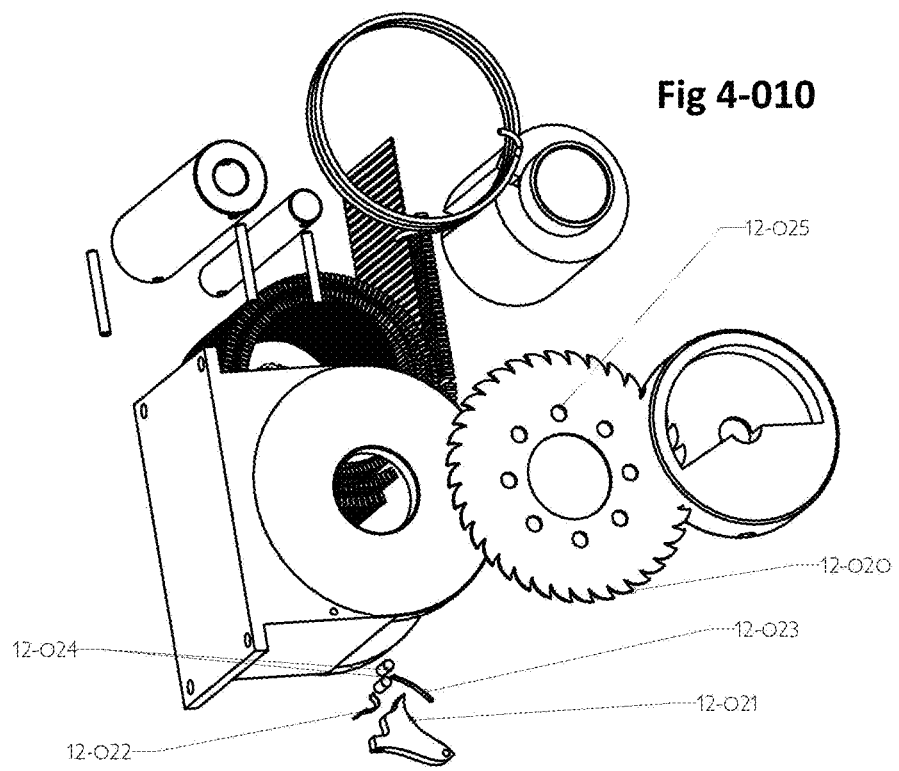

FIG. 7-01 to FIG. 7-04,04A, 04B show several embodiments for a load limited that may be used on either the harness (as shown) or for the tether (with end attachments modified). FIG. 4, 4A, 4B show variations in the housing structure using channel sections tubing and bent material. They also show different securing means for the lower webbing section.

FIG. 7-05, FIG. 7-06 side hard for pro-active head support in side impact with actuating shoulder guard with seat headrest height adjustment backplane shown in FIG. 7-05 but not in FIG. 7-06. Both have the headrest actuated to an angled position with the shoulder guard which has been moved laterally with the inertial load of the shoulder and thorax.

Figures 1, 2, 3, 4, 5, 6, 7, 8:
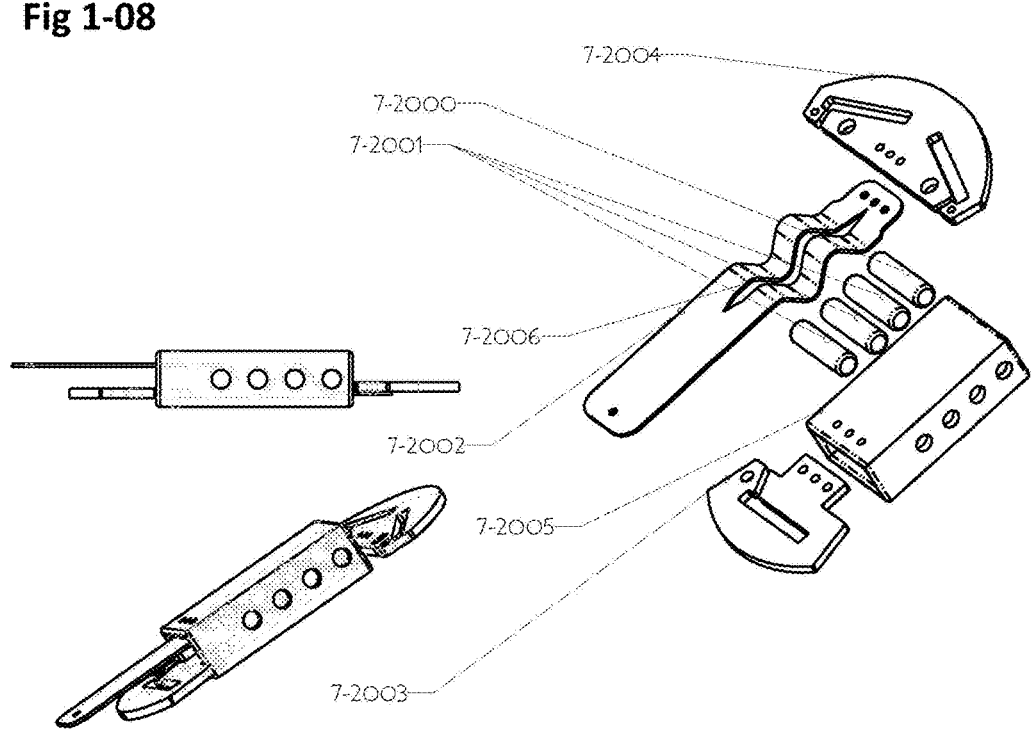
Figures 1, 2, 3, 4, 5, 6, 7, 8, 9:
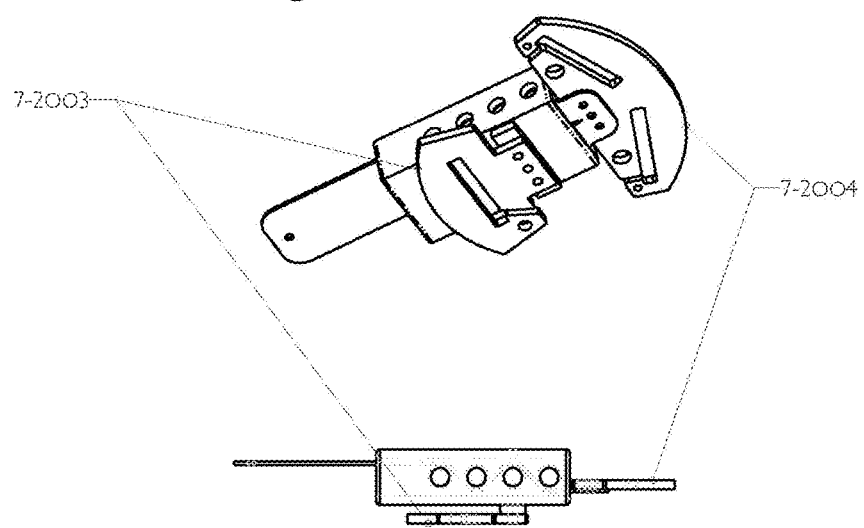
Figures 1, 2, 3, 4, 5, 6, 7, 8, 9, 10:
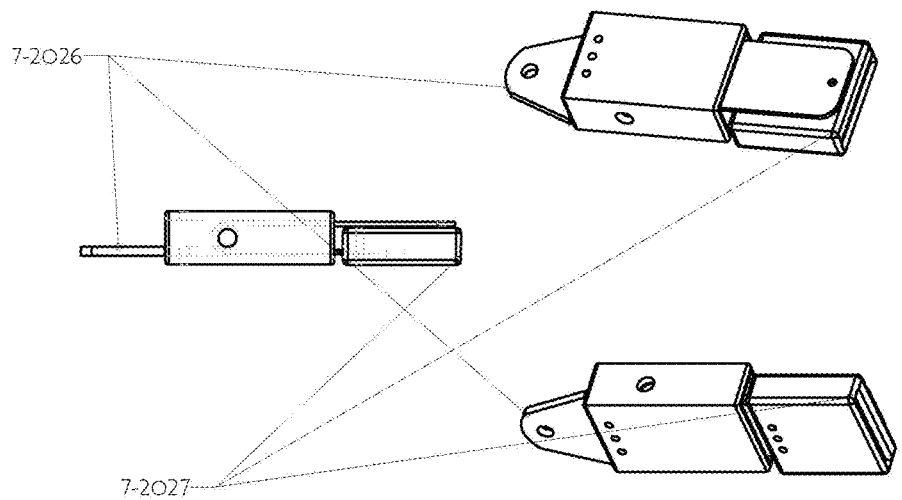
Figures 1, 2, 3, 4, 5, 6, 7, 8, 9, 10, 11:
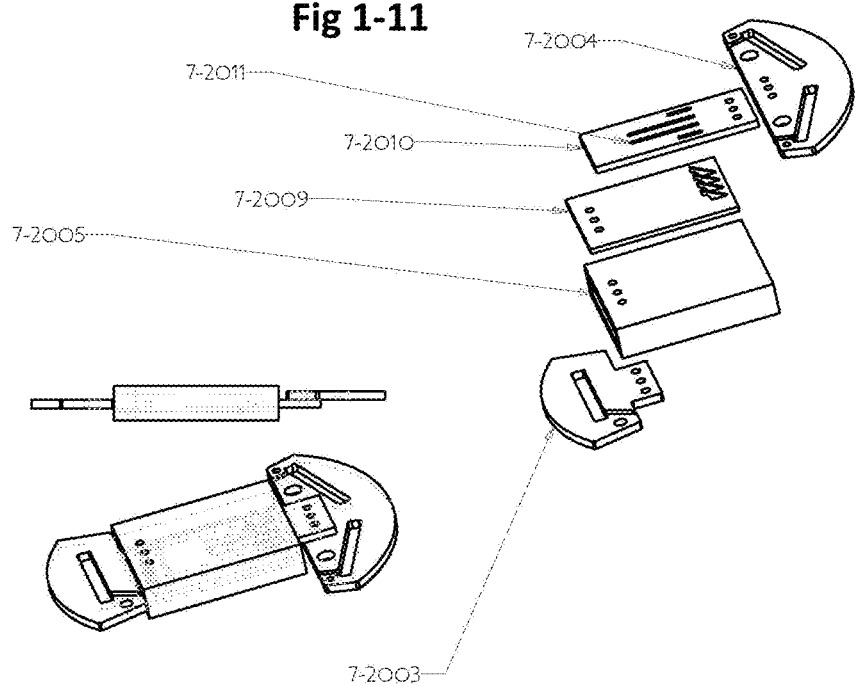
Figures 1, 2, 3, 4, 5, 6, 7, 8, 9, 10, 11, 12:
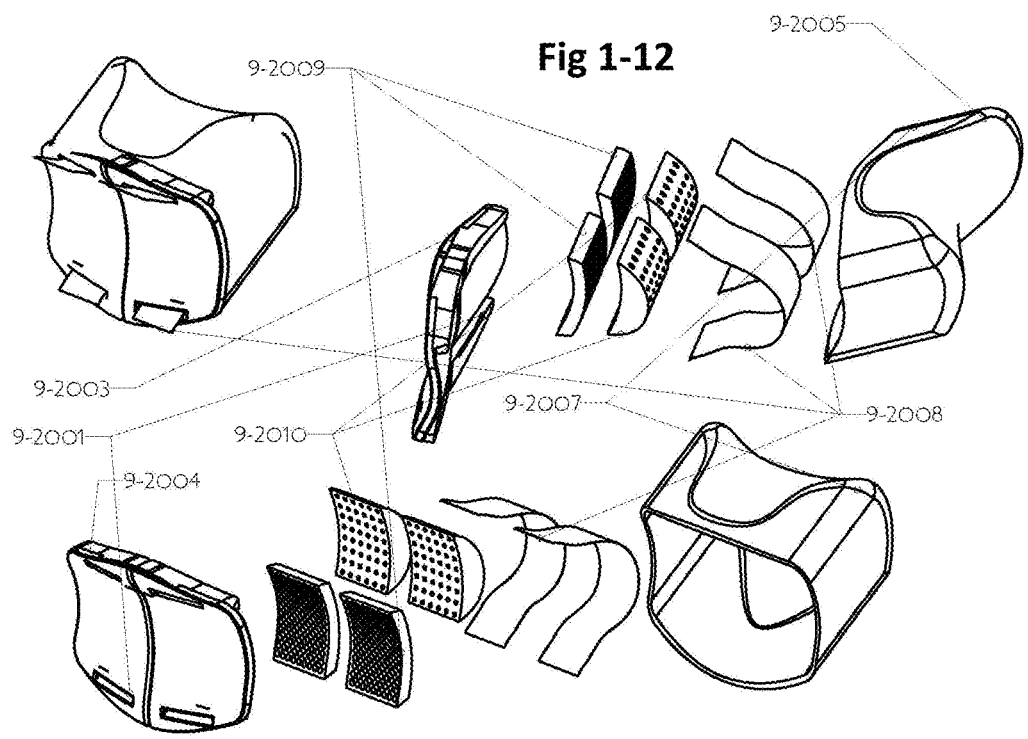

FIG. 7-07, 08 show the Headrest and the shoulder guard with headrest height adjustment backplane removed. The links are pivotally connected to this and the shoulder guard is slid ably connected to this.

FIG. 7-07 shows the actuated position (laterally displaced shoulder guard and rotated headrest) FIG. 7-08 shows the normal position.

FIG. 8-01 to 8-04, 03A shows the seat bottom mechanism for using a single actuator to change the angle of the seat bottom by displacing a point on the seat bottom relative to a moving pivot attached to the seat back in many embodiments; moving forward a sliding leg rest; and sliding side ways a leg rest wing and an optional leg rest extension.

FIG. 8-05 to 8-08 show AirSleeper modules where the steps for egress and ingress to the upper Air Sleeper module are recessed thereby providing greater aisle space particularly at shoulder level. Other aspects are that the steps have a grade that is ergonomically attractive. Finally the steps are positioned to have minimal effect on the lower occupant space in the lower Air Sleeper enclosure or mini-cabin.

DETAILED DESCRIPTION OF INVENTION

CRS Embodiments

The LATCH or ISOFIX tensioning mechanism has a cable (or other flexible attachment) 8-1006 between the two LATCHs or ISOFIX attachments. This cable is passed through the support arrangement—the latch carrier 5-1002 for the LATCH/ISOFIX head and through the pivot axis on the pivot tube 8-1001 to the latch tensioning assembly 8-1002, where it is tensioned first for rough tensioning with the Cam Thumb nut 8-1020 and for fine tension on a normal basis with the Latch Tension Lever 5-1001.

The Latch carrier has an aperture 5-1009 that allows the removal of the latch and rotation of the latch about the axis of the Latch Carrier so that the same latch can be used right side up for front facing mode and rear facing mode of the latch carrier. The Latch carrier is pivoted on the Pivot tube that may be supported on the outer side of the latch carrier or on both sides of the Latch carrier by the seat structure. This may be a thin flange that is on the outside of the Latch carrier and in some embodiments also on the inside of the latch carrier and besides the Latch tensioning assembly 8-1002. The Seat Frame (support structure of the seat) 7-1007 has a recess on the bottom 7-1015 to accommodate a rear facing or front facing orientation of the Latch Carrier 5-1002. The Latch Carrier is locked for the Front facing seat position with the aperture 7-1022 to the aperture on the seat frame 7-1017 and in the rear facing mode for the seat with the aperture on the Foot rest 7-1018. There are multiple inclinations possible with the multiple holes 7-1018. A rod or pair of rods secure the 7-1022 in either position.

The Latch Carrier 5-1002 has a cable lead in 8-1003 to support the cable as it curves through 90 degrees into the Pivot tube 8-1001.

The Pivot tube may have a slot on its side to accommodate the cable 8-1004 or be split in two parts. If a split structure is used the outer part need not be a tube but can be a rod.

The Pivot tube supports the cable up to the inner opening of the Tensioning assembly as shown in FIG. 1-02.

Both the tensioning Assembly and the Latch carrier may have bushes that strengthen them for the support of the Pivot tube 8-1001.

The Tensioning assembly 8-1002 has a tensioning mechanism that pulls (or pushes) the cable away from it natural axis between the two pivot tubes, thereby tensioning the cable 8-1006. The cable goes over a pulley 5-1021 (or a pin) which is secured to a Cam Tension Bar 5-1022 that goes through a section of the main body of the tensioning assembly 8-1002, through an aperture at the front and then through an aperture in the Cam pin 5-1019, and then ha its threaded end attached to the threads of the Cam Thumb Nut 5-1020. The Cam Pin 5-1019 is inserted in to the Latch tension Lever 5-1001 ahead of the insertion of the 5-1022. The Latch Tension Lever 5-1001 is contoured at its contact surface with the body of the Tension assembly to have an increasing distance from the central axis of the Cam Pin 5-1019 to the surface of the Body of the Tensioning assembly, thereby moving the cam pin 5-1019 away from the body of the Tensioning assembly, thereby pulling the Cam tension bar and the attached pulley and in turn pulling the cable thereby tensioning the cable.

It may be seen from the FIG. 1-03 that the Latch tension Lever has a slot to accommodate the cam nut end and the Cam tension Bar as the lever is raised and depressed.

Load Limiters that May be Used with the Harness and Tether in CRS.

FIG. 1-04 to FIG. 1-12 show several embodiments for a load limited that may be used on either the harness (as shown), for the tether (with end attachments modified), for the attachment point for the tether on the vehicle, or as an attachment to the car seat belt latch attachment specifically tuned for the needs of children in boosters or child seats, or specially custom tuned for occupants as an after market product that can be inserted into any car seat belt latch point.

This class of load limiters are designed to have controllable force displacement characteristics by bending strips of material, cutting materials such as metal or compressing blocks of materials such as compressible foams with known crush characteristics. Notably each of the load limiters disclosed may have multiple load levels that are activated sequentially as the load progresses over time protect occupants of different masses.

With regard to the bendable strips, The width and thickness of the strips at different points along their length of displacement will determine the force at that point of displacement. The principal application in the CRS is to have constant forces over a given displacement which may be achieved with a constant cross section for the strip for that length. However, it may be desired to have multiple "plateau"s of constant force to cater for different loads on the CRS. This can be done with multiple cross sections along the length of the strip.

For example in FIG. 1-04, 05, 08, 09, 10 we have a cut out on the strip that changes the cross section for part of the length. When this section is bent it will show a lower force whereas when the full section is bent it will have a larger constant force.

One issue that needs to be overcome for a lower initial force plateau and a higher force plateau later, is the problem that the smaller cross section needs to pull the wider cross section through the process of bending. If the differences in cross section are large the narrow section will begin to extend substantially in preference to bending the wider cross section. The solution in FIGS. 1-06 and 1-07 among other benefits, addresses this problem by having two separate strips. This embodiment will be described later.

The embodiments shown bent the strip over a roller (although a low friction rod may be used) the angle over which it is bent may be varied. Also the strip may be supported on the side before bending by a retaining structure as in the body 7-2005 of the load limiters.

For the load limiters that bend strips, one of the attachment points for the harness or the tether is to the end of the strip 7-2002. The roller is pivotally attached to the housing or body 7-2005 which attached to the second attachment point. Notably the first and second attachment points can be the attachment points to the harness tensioning webbing section and the two harness sections that go to the front of the child seat below the child.

FIGS. 1-04, 05, 08, 09 show versions with a cut out on the strip that will reduce the force between the attachment points as the reduced section 7-2006 of the strip is bent around the main roller. The force will rise when the full section reaches the main roller. Any of the embodiments shown can have this reduced section feature. Moreover the reduced section feature can have a variable section to have a varying force.

FIGS. 1-06 and 1-07 use two strips for two "plateaus of force. The First deformable strip 7-2002A has a slot in it 7-2007 which engages a pin attached to a hole 7-2008 on the second strip. When there is tension applied between the upper and lower hooks, the first strip bends over the roller as the pin slides through the slot 7-2007. When the pin 7-2008 reaches the end of the slot the second strip is also pulled along and therefore its cross section is also bent and therefore the force rises to the second plateau.

In the embodiments shown in both FIGS. 1-06 and 1-07, the first strip 7-2002A is bent over the second strip 7-200B. The second strip deforms first and there is marginal force on the first strip 7-2002A. Once the end of the slot is reached the first strip 7-2002A is also pulled and the aggregate force increases. Multiple strips can be used for this for multiple force plateaus.

In FIG. 1-06 The pin hole and the slot are indexed and a pin (not shown) holds them together. In FIG. 1-07 the same pin is used to also hold the Upper hook 7-2004 for cost economies and compact architectures.

FIG. 1-05 shows any of the load limiter architectures with bending or cutting strips compression of material, extension of materials as disclosed herein and in prior disclosures, for use in child seats, wherein the body of the load limiter 7-2005 is attached to the bottom of the seat ahead of the opening customarily used for the harness adjustment latch. This embodiment includes a harness adjusting latch 7-2020 and obviates the need for a separate latch. The harness is threaded through an aperture in the front of the seat below the child as usual and enters the latch body 7-2020. It is held against the body with a spring loaded webbing control latch catch 7-2021 which is pushed against the rise in the body— the retaining wall 7-2022 upon tension of the harness during impact and thereby locks the harness. Adjustment of the harness length but the user is effected by pulling the lever 7-2023 that acts against the spring loaded latch catch 7-2021 to allow movement of the harness support webbing in either direction for correct adjustment. Upon release of the lever the spring loading of h7-2021 pushes the webbing against the retain wall 7-2022 of the latch housing and prevents tension on the harness from releasing the control webbing. FIG. 1-05 shows a bent strip version of the load limiter. FIG. 1-08 uses multiple rollers 7-2000, 7-2001 (or pins) for bending the strip. The width of the slots may be adjusted at different distances along the strip to synchronize the force of bending on each roller as the strip reaches it. If a fixed width slot is used on 7-2002 the force will progressively increase as each roller encounters the strip without the slot for the first time.

To reduce the distance between the load points of the load limiter, the support points may be changed as in FIG. 1-09 where the support on the body lies close to the front hook. This can be used for any of the load limiter architectures ie using bending strips cutting strips extending or compressing materials as in this disclosure and prior disclosures. Such architectures will help negotiate curves on the supporting structure of the seat.

FIG. 1-10 shows an architecture of any of the strip bending or cutting material extending or compressing versions that can be installed to a vehicle seat belt assembly by the user. The 7-2026—Insert for Car seat belt Latch is clicked into the car seatbelt latch and on the other side of the load limiter there is a cavity and latch 7-2027—Latch for Car Seat Belt latch insert mounted on load limiter that accepted the car seat belt insert attached to the loop of the belt. The load limiter may be tuned for children in boosters or for child seats and indeed customized for occupants of any mass. Moreover, it can be tuned for the stiffness of the car to optimize protection with the load limiter. Moreover, it can be tuned for the stiffness of the car to optimize protection with the load limiter.

FIG. 1-11, shows an embodiment that cuts a strip of material (usually metal. The slots 7-2011 of different lengths allow the cutting edges to meet the ends of the slots at different times thereby allowing multiple plateaus of force.

FIG. 1-12, shows a load limiter that is on the front of the harness. This may in some embodiments be a part of the chin support disclosed. However it may be a stand alone load limiter separate for each of the sides of the harness or combined together with a chest clip type lock to hold them together.

FIG. 1-12 shows the harness threaded through the chest plate (separate left and right or split with a latch holding them together)

The harness is threaded through the slots in the chest plate 9-2-003, 9-2004 and is routed over the crush pads 9-2009 and 9-2010 and are then threaded through the lower slots 9-2001 on the chest plate oleft and right sections.

The (optional) cover or chin support surface covers the assembly. It may be split with a latch between the sides or attach onto one or both of the chest plate left and right sections.

The Crush pads—level 1 9-2009 and Crush pads Level 2—9-2010 are tuned to have crush parameters that provide plateaus of force required for 2 different masses of children. (multiple crush pad levels can be used for multiple levels of child masses) The thicknesses are chosen to give the required level of crush during the peak loadings that need to be mitigated.

The headrest/shoulder guard/thorax guard assembly is designed to protect the head in particular during a side impact or for that matter fast lateral acceleration. The simpler embodiment in FIG. 2-01, 02 has the shoulder guard attached to the headrest. The actuation of the shoulder guard sideways by the shoulder will pull the headrest along with it. The linkage arrangement that comprises the two headrest pivot support 10-1002 attached to the links 10-1003 which are pivotally attached to seat shell through the headrest support 10-1006 which may be a part of the mechanism for raising and lowering the headrest. The shoulder guard is attached to the headrest.

The links are angled as shown in the figures and therefore as the headrest moves laterally it is forces to rotate thereby ensconcing the head. This is seen in FIG. 2-02

FIG. 2-03, 03A are variations of another embodiment that has the shoulder guard 10-1000 and thorax guard 10-1010 in this embodiment (alternative embodiments may have any protrusion that can be pushed by the child's body sideways upon impact) that are attached with slides to the rear of the shell or the headrest mechanism for raising and lowering the headrest and harness support.

Leaf springs supported the shell or support point indirectly attached to the shell are attached to the headrest or the shoulder guard to return them to the centered normal position. Such assemblies are well disclosed in the background art. In this embodiment the same actuation of the headrest occurs as in the previous embodiment of FIGS. 2-01 and 02 However the actuation of the headrest is done with an actuation pivot 10-1017 attached to the headrest and with a pin that slides in a slot 10-1016 on the shoulder slide—actuating arm 10-1015 which is attached to the shoulder slider 10-1012. This particular slider uses a slots 10-1013 sliding on pins 10-1014 attached to the shoulder slide back plane 10-1011 which is attached directly or indirectly to the shell.

FIGS. 2-04A, 04B and 04C show different positions of the shoulder guard/thorax guard and the actuation of the headrest as a result.

The Shoulder slide has a actuating arm 10-1015 that has a slot 10-1016 that is pivotally and slidably attached to the pivot 10-1017 on the headrest. The lateral movement of shoulder guard 10-1000 or the thorax guard 10-1010 force the slider 10-1012 laterally resulting in the actuating arm 10-1015 moving laterally. This pushes the headrest attachment pivot sideways thereby enabling the movement as shown of the headrest which ensconces the head. The slot 10-1016 on the actuator arm accommodates the change in the distance from the pivot on the headrest and the actuator arm changes as the headrest reorients and rotates.

The sliding arrangement of the shoulder slider can use any sliding arrangement disclosed in the background art. The slider may also be spring loaded to return to the centered position using spring arrangements well disclosed in the background art.

The load limiting module shown in FIG. 2-05 is used to limit peak loadings on the harness of a child seat or other occupant support to reduce injury. The embodiment shown has a deformable strip that is pulled over a roller when the force on the Upper hook exceeds a threshold thereby limiting the load.

The assembly of the embodiment shown in FIG. 2-05 is illustrated with the exploded view of FIG. 2-07.
1. An end stop rivet or other protrusion (not shown) is attached to the small hole at the end of the deformable strip 7-2002. This protrudes inwards within the deformable strip and engages the roller after the strip bends and slides through the body with impact force.
2. The Deformable strip 7-2002 is inserted into the Body 7-2005 so that the end of the bent section aligns with the lateral hole on the body 7-2005.
3. The side holes on the Lower Hook 7-1003 is aligned with the hole on the body.
4. The side rollers 7-2014 are designed to be take the load of the pin 7-2013 supported by the sides of the hole on the body 7-2005 and the lower hook 7-2004. The main roller 7-2000 is designed to facilitate the bending and movement of the deformable strip. The assembly of the side rollers the main roller all supported on the pin is pushed through the aligned holes on the body and the lower hook.
5. The sheath 7-1012 slides over the body and (optionally) locks with a protrusion on the hole on the top of the body. Finally the top hook is riveted to the deformable strip.

Several variations of the process are possible such as the use of a reduced form of the lower hook with topological equivalents that is simply a "U" channel with holes on the side flanges and where the webbing is passed over the center section of the U channel or topological equivalents.

The Lower hook can be removed completely and a slot on the body can be used to attach the webbing.

FIG. 2-07 shows some of the features of the sheath I a preferred embodiment. 7-2015 shows a recess that supports the ends of the pin and the side rollers and prevents them from falling out.

Several features are shown. The recesses 7-2018 will support the deformable strip at the center of the body to avoid skewing of the deformable strip as it is pulled over the roller. A recess 7-2016 allows the end stop (rivet) to move through the body as the deformable strip is pulled through, to finally engage the roller to stop further movement.

Notably the invention does not need the rollers, but can simply have the strip rolling over the pin with sliding friction.

The operation of the headrest actuating mechanism has been disclosed in a prior application and this disclosure provides additional aspects of this mechanism.

FIG. 3-01 shows the mechanism for actuating the headrest using the sliding shoulder guard. This embodiment in addition has a folding shoulder guard that folds in upon intrusion forces from the outside. The fig is depicts the position following a side impact left side and following intrusion that folds in the shoulder guard. Note in the shoulder guard the protruding lip of the rear section of the shoulder guard that will engage the front flap of the shoulder guard so that inertial loading resulting from the shoulder on impact will push it out.

The FIG. also shows the position of the two links after the inertial loading on the shoulder guard actuates the headrest. The link on the near side relative to the impact as seen is approximately orthogonal to the headrest support on the seat shell or mechanism for raising and lowering the headrest and harness attachments and shoulder guards in this embodiment, while the link on the far side lies flat or close to the support. In the event of intrusion forces on the headrest, the headrest is forced inwards and therefore pivots on the near side link and pushes the far side link further towards lying flat with the support thereby locking the links from returning to the normal position which necessitates the far side link rising up away from the support. This will ensure that the head is protected by the headrest that ensconces the head.

FIG. 3-02 shows the mechanism for actuating the headrest to protect the head as in FIG. 3-01 here the ratchet mechanism has two ratchet keys (pawls), one on each side spring loaded to contact the surface of the ratchet teeth on the static backplane of the shoulder guard slider mechanism (directly or indirectly with the mechanism for raising and lowering the seat, attached to the seat) that is spring loaded to touch the ratchet teeth. Notably the ratchet key on the side of the impact and inertial movement of the shoulder guard and shoulder slider will engage upon movement in that direction while the ratchet on the far side will simply slide over the ratchet teeth because of the inclination of the teeth surfaces and the inclination of the ratchet teeth. The pawls are enabled to rest on a flat surface without teeth in the center section under normal conditions and are therefore not able to engage any of the saw tooth sections.

The Ratchet will prevent the slider from sliding back following the intrusion force or external force thereby preventing the shoulder guard from moving back to the normal position in the event of intrusion thereby protecting the child and also preventing the headrest from being actuated back to the normal position.

FIG. 3-03 also shows the backward rotation of the far side link upon intrusion forces pushing the headrest in and thereby forcing it to pivot about the nearside link. This ensured that the guard ensconces the head. It also shows the folding shoulder guard upon intrusion forces pushing it in. Moreover the ratchet with teeth engaging on the impact side (Left side for the child).

FIG. 3-04, FIG. 3-05 shows a mechanism for raising and lowering the headrest assembly that includes the harness support. The metal rod shown is spring loaded within a slot on the sliding panel of the headrest raising and lowering mechanism, that has the slots for the harness as shown. If the rod is moved against the spring loading away from the seat back it will rise out of the slots on the seat back and therefore allow the panel to move up and down. When the rod is released to return to the bottom of the slot it will engage a notch and thereby lock the headrest assembly in a vertical position represented by that notch.

The metal rod has another function in this embodiment. Because of its strength the harness passes over it and down to the splitter plate that holds the harness in tension with a tensioning webbing as amply disclosed in the background art. FIG. 3-05 shows in addition the position of a section of the harness. As it is attached near the center plane on one or both of the front and back of the seat, it I slightly inclined as shown. However the rod is horizontal. There will therefore be a greater force on the webbing of the harness on the outer edge than on the inner edge, resulting in damage to the harness and possible rupture in the event of a rough rod preventing the harness webbing from sliding inwards upon the high tension forces encountered during front impact. If the sliding friction between the webbing of the harness and the rod is lower the harness webbing slides inwards and bunches up on the inner edge, or even gets forced into the inner side edge of the slot. Such bunching up and getting forced into the inner edge of the slot reduces its ability to slide over the rod during such an impact. The elastic nature of the webbing of the harness is a factor in the design of the shock absorption of the harness during front impact and this is adversely affected as a result as the section of the harness behind the slot and the tensioning webbing attached thereto cannot stretch to accommodate the movement of the child upon such from impact as such stretching would require the webbing to move over the bar and through the slot on the seat back which leads the harness to the front of the seat from the back. This problem is accentuated if there are load limiting devices installed on the harness webbing on the rear of the seat or replace the splitter plate or are attached on any section of the harness tensioning webbing. Such splitter plates and harness tensioning webbing are well disclosed in the background art.

This invention provides a solution for this problem FIG. 3-06 with a pair of sleeves (Forms) that are tapered as shown in the FIG. This can be attached rigidly to the lateral rod so that the webbing can slide over it or be slidably attached to rotate about the rod and act as a pulley for the webbing. The latter embodiment will require an end stop on the inner side to prevent the sleeve from moving inwards upon tensile force on the harness that will have a component towards the center along the rod. The profile of the sleeve can be such that it optimally prevent the bunching of the webbing towards the center and prevents it from moving to the edge of the slot. This will therefore aid in allowing the webbing the move freely over the rod and the slot thereby enabling the use of the rear section of the webbing of the harness, the tensioning section and any installed load limiting devices mounted at the back of the seat.

FIG. 3-07 in addition shows an inset with the angled webbing the orientation of the sleeve.

The Sleeve would normally be made of a low friction material such as PTFE or smooth polypropylene (for cost reasons). Smooth Glass filled plastics such as nylon or polypropylene could be effective as the glass on the surface could help lower the friction both against the rod and the webbing. Metal sleeves can of course be used or lowering the friction if weight is not critical.

One of the main challenges in designing load limiters for a seatbelt restraint system is that it needs to accommodate different passenger sizes and therefore masses of the passengers. Larger passengers with higher masses will require higher forces to decelerate them whereas smaller passengers with smaller masses will need smaller forces. The compounding problem is that while a smaller force for a large passenger of high mass will provide good performance in terms of head and other peak acceleration parameters the excursion of the head and other body elements may be excessive. This balance is therefore a critical one in designing a belt system.

The solution of this invention uses the information inherent in a retractor to infer the size of the passenger and then use the architecture of the load-limiter/retractor to provide the appropriate force for decelerating the occupant.

There is also a second class of embodiments that use multiple load limiters that engage at different levels of excursion of the webbing during impact. For example a first load limiter will resist the excursion for a pre-determined excursion threshold (that is adequate for a small mass passenger) and then a second load limiter will additionally engage when the first excursion threshold is passed. Thereafter there may be additional load limiters that may engage at higher thresholds for even heavier passengers.

Another factor that enters into a load-limiter/retractor combination is that the webbing that is wound on the retractor spool can slip or tighten and therefore reduce the effectiveness of the load limiter. There are therefore benefits in reducing the slip of the webbing on a seatbelt in the sections that are wound on the spool of the retractor.

Yet another factor that can be helpful for load limiting using the architecture of a retractor is the elastic properties of the wound webbing or other materials on the spool. Compression of these materials can be useful to get suitable load limiting characteristics.

The adaptive load-limiter/retractor of this invention has several technologies that can each provide a solution for the one or more of the above challenges. They can be used in combination to further enhance the performance of the load limiter.

The figures show embodiments of the invention. The figures do not show the automatic locking mechanism of the retractor but only the spring for the retractor. This is well disclosed in the background art. Any of the architectures of such locking arrangements such the pendulum or centrifugal triggers can be used with the present invention.

The first technology used to capture the information of the size of the passenger and therefore infer and provide the appropriate force in the load limiter, is the length of the webbing that is dispensed by the spool. The spool has a fixed diameter and therefore the number of turns of webbing on the spool will provide the information on the length dispensed. Large occupants will need more webbing dispensed and therefore there will be less webbing left on the spool after dispensing enough webbing to buckle up the occupant. Therefore the effective diameter or radius of the wound up webbing on the spool will be smaller than for a small passenger that will need less length of webbing to buckle up (less dispensed webbing). This invention uses a load limiter along the axis of the adaptive load-limiter/retractor. Notably as the force on the webbing holding the occupant is place is derived from the force on the webbing that touches the wound webbing on the spool or the webbing that is tangential to the roll of webbing on the spool, the force multiplied by the radius of the spool and the spooled up webbing will be the moment of the force that counters the moment created by the twisting of the load limited at the center of the adaptive load-limiter/retractor. As the diameter of the spooled up webbing on the spool rises—with the smaller occupants requiring shorter webbing lengths to be "buckled up"—a smaller force is required to create the same moment to twist the load limiter as the distance or radius of the spool with spooled up webbing has risen. Therefore a smaller force is applied to control a smaller occupant and the larger force is used to control a larger occupant during impact. This architecture of this invention will work well of the ratio of the spool diameter to the thickness of the webbing is in a range that will imply that that spooling up the webbing changes the diameter of the spool with the webbing enough to change the force by what is required. While this is one embodiment of the present invention it may require thick webbing which is both more expensive and less pliable. Several alternative versions of the invention overcome this challenge. A fill tape may be attached to the webbing or simply overlaid on the webbing to "build up" the thickness of each turn of the webbing and therefore quickly build up radius on the spool as the webbing is retracted for smaller occupants and therefore provide a smaller force from the load limiter. The fill tape can be attached at the end to the webbing or at intervals to ensure that it stays with the webbing and gets spooled in with the webbing. Fill tape can be used for other purposes as well such as providing a surface on the webbing that prevents slippage of the webbing on other layers of itself on the spooled section, and also for providing a in the spooled up section a compression characteristic that helps with the load limiting function of the adaptive load-limiter/retractor.

Moreover the further control of the variation of the radius of the wound webbing with adjoining fill tape can be achieved by changing the thickness of the fill tape along its length. Such variation of thickness will change the rate of change radius with the spooled in length and therefore provides a wide variation in forces available for different sized occupants where as a fixed thickness fill tape will have a constant change in radius with spooled in length.

A second tool for varying the load limiter force at the time of impact or tension of the webbing is with a multi element load limiter that are installed concentrically along the axis of the adaptive load-limiter/retractor. This approach can be used on its own or with the spool diameter approach noted above. The first load limiter can be the widest tube with one end attached to the spool and the other end attached to the retractor drum or mechanism which is locked during impact (in the absence of a retractor it is simply fixed to the housing and becomes a simple load limiter). Additional tubes (and a rod at the center is an option) are also attached at one end to the spool and at the other end are enabled to have lag in engaging the retractor. This is shown in the embodiments with a slot open over an arc that engages a pin after the pin has traversed the angle of the arc thereby offering support after a pre-determined rotation of the spool. The first tube may engage immediately upon rotation of the spool as shown in the figures.

Additional tubes or rod for the center may be used with slots of varying angles of arc to control the delay for engaging the load limiter upon rotation of the spool. An alternative embodiment will have fixed connections for all the load limiter tubes/rod on the retractor or fixed side and have the angular slots for delayed engagement on the spool side.

This approach will offer an initial force from the first load limiter tube/rod to offer the resistance required for the smallest passenger, and then after the spooling out of a predetermined length of webbing and rotation of the spool to achieve this the second load limiter tube/rod will engage and so on for the additional load limiter tubes/rod.

FIG. 4-01 shows a cross section of an embodiment of the invention. 12-001 is the spool that has axial support on the sides on the housing 12-010. The spool is attached to multiple load limiter tubes/rod (in this case one tube and a rod) with pin 12-006. The load limiter tubes/rod are loosely fitted to the spool to allow rotation if needed, and to each other. On the other side the load limiter tubes/rod are each attached separately to the retractor drum or other retractor assembly. In this embodiment load limiter A which is a tube is attached with pin 12-2007 to the retractor drum 12-005. Load limiter B which is a rod has a slightly longer length to protrude outside load limiter A and is attached with a pin 12-008 which is in a slot 12-011 that does not engage the pin until the spool has rotated through a pre-determined angle. This arrangement will enable the second tool as noted above for load limiting. This second tool for load limiting does not require (but can work with) the information of the effective spool radius. It also therefore does not need a retractor (manual or automatic) to spool in the webbing and change the effective radius.

The first tool for load limiting can be with the design of the webbing to be thick enough to provide the variation in spool effective radius or alternatively with fill tape that provides the required thickness. FIG. 4-06 shows three effective radii of the spool as the webbing (and fill tape) unwind from the spool. For a small passenger the effective radius will be R3. As the webbing (and fill tape) are dispensed for larger passengers, the radius will reduce to R2 and then to R1 for the largest occupant, thereby reducing the moment arm of the force and effectively increasing the force to be in equilibrium with the torque provided by the load limiters at the axis of the spool.

The retractor in the embodiment shown in the FIGS. winds up the spring 12-009 as the webbing (and fill tape) is dispensed and reels in the webbing to return to its normal state. There are many architectures for retractors and this is just one architecture for the sake of illustration of the invention. The invention will work with any retractor manual or automatic with a lock manual or automatic during the deployed state.

FIG. 4-02 shows different views of an embodiment that is attached to the vehicle, seat or other fixed object.

FIG. 4-03 is an exploded view that shows the parts of the embodiment.

FIG. 4-04 shows the webbing with the fill tape in the coiled state on the spool.

FIG. 4-05 shows another embodiment that can be attached to webbing rather than to the vehicle/seat/fixed object. The operation is the same.

FIG. 4-08 shows a fill tape of varying thickness to change the rate of change of radius with spooled in length of webbing.

A third tool for varying the load limiter force is by changing effective length of the load limiter rod or tubes in the center of the spool.

FIG. 4-07 is an embodiment of this arrangement. The spool 12-001 is adapted 12-013, to have a splined section for a splined (or slotted) hollow shaft section 12-015. This splined tubular axle can move axially with regard to the spool but will transfer torque to the spool. It is attached to the load limiter tube 12-016 (in this case only one load limiter tube is used and it may also be a rod) with the pin 12-007 However distinct in this embodiment the attachment to the load limiter is with a slot 12-017 or other connection that will allow movement of the connector to the shaft 12-015 to engage longer or shorter lengths of the load limiter. Typically if a slot is used the properties of the load limiter element with the reduced cross section near the slot needs to be considered. Other connection means can be splines.

Therefore with this arrangement the hollow shaft 12-015 can slide up and down the load limiter engaging different points along its length thereby changing the torque/twist characteristics of the load limiter. It is now necessary to provide the load limiter information about the size of the occupant. This information can be generated by knowing the turns of the spool (with our without the fill tape). This information is transferred from the spool to the sliding hollow shaft 12-015 with the threads on the surface 12-018 that engage the housing of the adaptive load-limiter/retractor. As the spool rotates the shaft 12-015 moves axially thereby engaging more or less of the length of the load limiter.

The embodiment shown has the threads overlapping the splines. However other embodiments may have them on separate sections of the cylindrical surface of the 12-015.

The adaptive load-limiter/retractor of this invention may be used for seat belts in all types of vehicles including cars and on harness systems in child seats where the retractor load limiter will replace the front adjuster strap. It may be mounted on the vehicle or seat or in alternative embodiments be mounted on a length of webbing.

Notably variations of the adaptive load-limiter/retractor can be to eliminate the automatic spring operated retractor with a manual retractor by manually spooling in the webbing and locking in place. Some child seat harness systems may be better served with such an arrangement.

A special case of the retractor locking mechanism is shown in FIGS. 4-09 and 10. This locking mechanism has a ratchet 12-020 that rotates with the retractor drum 12-005. As it rotates the key 12-021 engages successive notches on the ratchet wheel and prevents motion back. The ratchet key is spring loaded in this embodiment against the ratchet. When the retractor needs to be released the key is pulled back with a cable, webbing or other means attached at 12-025. This allows the retractor to release and feed out webbing against the tension of the retractor spring 12-009. The cable, webbing or other means may also be string loaded to bring back the cable to the position that engages the ratchet key with the ratchet.

Additional features are shown in FIGS. 4-09 and 10. Secondary spring 12-022 "clicks" the motion of the ratchet key between two positions and gives tactile feedback on the cable or webbing. In addition the gongs 12-024 with different frequencies for the two domes shown can be struck by the gong strike 12-023 when the ratchet key is in each of the two positions thereby giving audio feedback to the user on the position of the key.

Child Seat Shoulder Guard and Harness Support Pulley

As shown in FIG. 5-47 the slider for the shoulder guard has many embodiments. Two additional embodiment as in FIGS. 5-48, and 49 show the center section and the side sections separate and enabled to be mounted together with rivets or fixed means in one of the embodiments in different positions to give greater or less shoulder room for the child and depending on the width of the seat shell in which it is installed. In the other embodiment the "saw tooth" serrations are utilized where it is easier to move the sides towards the center if the attachment of the sides to the center are spring loaded as with a rivet or bolt but with a spring interposed as well disclosed in the background art. However, during a loading of either of the sides from the inside the saw tooth locks and does not permit the relative movement between the center and the sides. The spring loading holds the saw teeth interlocked.

FIG. 5-50 shows the form used for leading the harness over the support rod. However sometimes it is desirable to have this pulley or form field installable. FIG. 5-51 shows a version where it is two parts that can be locked together (2 parts that interlock in this case the two parts are complements of each other)

In some embodiments the mating surfaces are such that they lie substantially along the circumference of a circle about the axis of the rod and therefore when there is a radial load as during an impact the mating surfaces are squeezed together and do not slide apart. Another embodiment has serrations that interlock on these mating circumferential surfaces that interlock when there is a radial load. A further improvement has a saw tooth shaped serration pattern that allows easier sliding in of the two parts but locks when there is an attempt to separate the parts. The Radial force will help this process of locking the mating saw tooth surfaces Load Limiters that May be Used with the Harness and Tether in CRS.

FIG. 7-01 to FIG. 7-04,4A, 4B show several embodiments for a load limited that may be used on either the harness (as shown) or for the tether (with end attachments modified)

This class of load limiters are designed to have controllable force displacement characteristics by bending strips of material. The width and thickness of the strips at different points along their length of displacement will determine the force at that point of displacement. The principal application in the CRS is to have constant forces over a given displacement which may be achieved with a constant cross section for the strip for that length. However, it may be desired to have multiple "plateau"s of constant force to cater for different loads on the CRS. This can be done with multiple cross sections along the length of the strip. Of course variable cross sections will give variable force profile as desired.

The embodiments shown have several approaches for securing the lower webbing section of the harness system. Some have slots in the housing body and others have a removable pin that secured the harness adjustment webbing at the lower end.

The housing is either a section of tubing or another cross section of channel or bent metal as shown in FIGS. 7-04, 4A, 4B. Many embodiments have an assembly wedge to keep the deformable strip in contact with the roller. This wedge can be of a flexible material and designed to "wedge in" with a small lip at the front that lies over the bottom edge of the sections of the housing. Alternatively it may be mounted to the housing (eg body tube, or channel sections) with pins or slots and engagement protrusions.

The embodiments shown have a recessed lip for strip support that is designed to calibrate the extent of bending of the strip. The position of this lip will determine the angle over which the deformable strip bends about the roller and therefore the force that is required for activating the load limiter.

The embodiment in FIG. 7-04B has a pin that attaches the lower webbing section. This may have a cotter pin to secure it or other means that ensure it does not slide out.

Proactive Side Guard

The pro-active side guard embodiments shown are designed to have a gap to allow free movement of the harness through the slots for the harness on the rear backplane that raises and lowers the head rest. The shoulder guard is therefore designed to be below the slot position and the head rest above the slot position. Considering however that the shoulder guard with its lateral movement (upon engaging the inertial mass of the child in the seat during lateral impact), actuates the headrest about the connection point at 15-3003, 15-3004, the shoulder guard needs to be designed with a protrusion in the center to allow the slot on the shoulder guard to engage the pin on the headrest. Some embodiments in addition as shown may have a recess on the headrest that fits the protrusion on the shoulder guard that can transfer the required force. In some embodiments the pin attaching the headrest to the shoulder guard can have a reduced function of simply indexing the protrusion to the recess in the headrest or in other embodiments completely eliminated.

The headrest is attached to the height adjustment backplane 15-3005 with a pair of links 15-3002 that in the normal position are angled and when actuated by the shoulder guard, rotate the headrest as shown in the FIGS. 7-05, 6, 7 (FIG. 7-05 shows the back plane as well). FIG. 7-08 shows the normal position of the headrest and the side guard.

Modular Arrays of Attached Occupant Supports in Vehicles

A major challenge in evaluating the crash performance of occupant support units (units) in vehicles when they are linked together in arrays is that the forces and kinematics of the array will depend on the number and configuration of the individual occupant supports in that array and the forces that act between them. As a result a conventional approach to testing these arrays would need to destructively test the complete array as it is deployed in for example an aircraft. Moreover, the sled facility will need to accommodate this very large array as well.

These two requirements of destructively testing a number of such occupant supports on each test and the use of a large sled for testing can create serious cost barriers for the testing and certification of these arrays resulting in the economic penalty of testing and certification deterring the use of these arrays on their economic merit.

Therefore a cost effective method for testing such arrays will be enabling for the use of such arrays in vehicles such as aircraft. High occupant densities in such arrays can result in great economic value for the deployment of these arrays and therefore such a method for testing will have substantial economic value.

This invention provides a method to evaluate the performance of a large array with a small subset of the units in the array thereby requiring only a few of the occupant support units for destructive testing and also requiring a much smaller sled facility for these tests, thereby enabling the evaluation of the large arrays for a substantially reduced cost. The method therefore has significant economic value in enabling the deployment of such arrays of units.

Certain types of arrays of occupant supports such as the tiered architectures disclosed here are supported along seat tracks in the aircraft. Such arrays have a property that as the array gets longer with identical supports for each of the elements of the array, as the base increases the moment of the force through its center of mass along the axis of deceleration (which may be the axis of the aircraft of the aircraft or an axis that is inclined vertically to the axis of the aircraft to account for vertical loading in a crash situation) is countered by an increasing moment arm as a result of the longer base of the array. On the other hand the moment arm of the inertial loading remains the same along the direction of the seat tracks.

Consider FIGS. 5-01 to 5-05.

They show the cases of a two tier array of units. The arrays considered are:
1. 2 Lower/1 Upper
2. 3 Lower/2 Upper
3. 4 Lower/3 Upper
4. 5 Lower/4 Upper M—Mass of each unit acting through its center of mass.
X—width of each unit
f—deceleration of the vehicle
$Y_1$—height from the support seat tracks of the mass of the lower tier of units
$Y_2$—height from the support seat tracks of the mass of the upper tier of units
$X_{i,j}$—support base length in the direction of motion of the aircraft or vehicle.
$\varphi(x_{ij})$—force density along base of array attachment to latches dependent on location.
g—acceleration due to gravity.
d—displacement of upper tiers away from lower tier along axis of aircraft/vehicle.
1—Upper tier unit
2—lower tier unit
3—base support unit
4—seat track Notably in the architectures shown there are tensile and compressive forces along the base of the array that counter the moment of the forces due to the inertial masses decelerating. Moreover there are compressive forces that counter the gravitational force or weight of the units acting on the seat tracks.

It is seen that when assessing moments of forces at the front edge of the base of the array, that the moment due to the weight of the array and any tensile force on the latches holding the array on the seat tracks counter the moment of the inertial loading due to the acceleration "f" (against the direction of motion). When the acceleration "f" is much higher (eg 16 Gs) than the gravitational force on the array there will be a high tensile force holding the array down. (ie from the FIGS. 1-4 the acceleration "f" on the tracks will create a clockwise moment of the inertial load of the array. This will need to be countered by the small gravitational loading and a tensile force towards the far or back end of the array to "hold down" the array)

It can also be seen that as the length of the array increases the distance of the force due to the inertial loading as a result of the "f" will rise proportionate the number of upper and lower units in the array. However the moment arm that is the vertical distance of these forces remains the same. On the other hand as the array gets longer the distance of the latches on the base of the array get on average further away from the front edge. Therefore the moment arm of the latch forces rise and lower forces are needed to counter the inertial load of the acceleration "f".

In an angled test of the seat tracks at an inclination a to the horizontal, (FIG. 5-01A) there is an inertial loading that is horizontal of which there is a component in the direction the seat tracks (Y) (horizontal when α is 0) and a component that is at right angles or orthogonal to the seat tracks (Z). The component of the inertial loading horizontal to the seat tracks has the same effect as in α=0 case.

The orthogonal (Z) component now has the reaction force changing to accommodate the inertial loading of the array. Therefore the reaction forces in the Z direction will differ from the horizontal case in that there is an additional compressive force to counter the inertial loading in the Z direction during the acceleration. (The gravitational force is also now only the Z component of the horizontal case but this is in any case small when accelerations of the order of 14-20 Gs are considered for the inertial loading) Overall this would result in an increase in the compressive loading along the base and a decrease in the tensile loadings along the base. Therefore the maximum tensile loadings will occur in the horizontal case. The angled orientation as noted is equivalent to a horizontal seat track with the loading at an angle as in a crash landing with a significant vertical component. (the only difference is the relatively small gravitational force compared to a deceleration of 14 or more Gs) Notably in both inclined and flat cases as the array increases in length the latch forces drop. Moreover as the latch forces drop the resulting displacement of the array due to the latch forces decrease resulting in lower projections of the head of the occupant as a result of the displacement of the units relative to the seat tracks. This also reduces the head acceleration of the occupants in the units.

In the inclined case the lumbar loadings are largely determined from the Z inertial loading. The levels are determined by both the (clockwise in FIGS. 5-01 to 5-05) moment on the array due to the Y component and the Z direction direct loading. While the Z component is constant along the base the Y component torque will force the rear side up and push the front side down (both in reference to the axis of the aircraft). Overall for an angle of α=60 degrees for example the z-component is (i+j)Mf Cos α or (i+j)Mf·0.707

Which is a significant part of the loading and will be equally distributed along the base. The y-component will be (i+j)Mf Sin α or (i+j)Mf·0.5. This component at this angle and will cause the clockwise moment to pull up the rear side and push down the front side of the array. As the array size increases the latch forces supporting the moment due to the y-forces will fall.

Both the y- and z-components are affected by the small increase in the mass per latch as the array size Overall the variation in the force as a result of the y-component as the array size increases dominates and while the peak forces are nearly unchanged with increasing array size the forces fall with increasing array size.

This is another aspect of the invention for lumbar loadings.

Intuition for the method of this invention can be gained from the following analysis:

It is seen that particularly for f>>g (as in crash conditions eg 16G for f) there is a monotonic decrease in the force density of the tensile and compressive loadings across the base due to the inertial loading that dominates the compressive force due to the gravitation loading.

Equating moments about the near edge of the array, $$\int_0^{X \cdot i} \varphi_z(x_{ij}) \cdot x_{ij} dx =$$

$$(i \cdot My_1 + j \cdot My_2) \cdot f - \frac{MXg}{2} \left( \cdot \sum_{k=0}^{i-1} (1 + 2 \cdot k) + \sum_{k=0}^{i-2} (1 + 2 \cdot k) \right)$$

In the interest of simplicity considering that there is a gravitational force that is countered by the reaction force that is M(i+j)g distributed uniformly along the bottom and assuming a linearly varying force to counter the inertial loading of "f".

$$\varphi_z(x_{ij}) = \varphi_{zA} + \varphi_{zB} \cdot x_{ij}$$

Where $\varphi_{zA}$, $\varphi_{zB}$ are constants. Notably $\varphi_{zB}$ would allow a tensile force along a part of the base to counter the inertial load of "f".

Therefore, $$\int_0^{X \cdot i} (\varphi_{zA} + \varphi_{zB} \cdot x_{ij}) \cdot x_{ij} dx =$$

$$(i \cdot My_1 + j \cdot My_2) \cdot f - \frac{MXg}{2} \left( \cdot \sum_{k=0}^{i-1} (1 + 2 \cdot k) + \sum_{k=0}^{i-2} (1 + 2 \cdot k) \right)$$

$$\left( \frac{\varphi_{zA} x^2}{2} + \frac{\varphi_{zB} x^3}{3} \right) \Big|_0^{X \cdot i} =$$

$$(i \cdot My_1 + j \cdot My_2) \cdot f - \frac{MXg}{2} \left( \cdot \sum_{k=0}^{i-1} (1 + 2 \cdot k) + \sum_{k=0}^{i-2} (1 + 2 \cdot k) \right)$$

For I>2 there is the general simplification $$\left( \frac{\varphi_{zA} x^2}{2} + \frac{\varphi_{zB} x^3}{3} \right) \Big|_0^{X \cdot i} = (i \cdot My_1 + (i-1) \cdot My_2) \cdot f -$$

$$\frac{MXg}{2} \left( \cdot \frac{i-1}{2} \cdot (2 + (t-2) \cdot d) + \cdot \frac{t-2}{2} \cdot (1 + (i-3) \cdot d) \right)$$

With no inertial loading,
There is only the gravitational force and $M \cdot (i+j)g = \varphi_{zA} \cdot i \cdot X$
Therefore $\varphi_{zA}$ can be determined.

The remaining constant $\varphi_{zB}$ must cause a tensile loading increasing with distance from the near edge (front edge). This tensile loading constant falls with increasing values of i,j because the force is deployed over a longer base. This is particularly so when y1, y2 are small compared to i·X. The resulting force from the sum of the tensile force and the compressive constant force must be tensile at the far end and compressive at the near end. Finally the equations take into account the load of the upper tier on the lower tier and the support latches directly below them. It is seen from FIG. 5-44 that as the array gets longer the loading becomes asymptotic at 2.0. This loading change does not affect the horizontal case or the Y component. Moreover, in the angled case while it affects both the y- and z-components, this effect is dominated by the variation in latch loadings to the inertial loadings resulting from the Y components. (The z-component is constant except for the rise in mass which affects both y and z-components)

Simulations support the method of the invention empirically. These simulations are based on a more realistic case where each of the base units have 4 latches—2 on each of the tracks and towards the front and back edges of the base units.

The human mass is that of $95^{th}$ percentile male or about 220 pounds/6'2 . This is about 30% higher than the loadings in standard tests for certification of 50% percentile males. The actual values of forces and loadings are therefore higher than what would be experienced in standard tests.

For the "flat" case the acceleration pulse used was triangular with a peak of 17 Gs a rise time of 90 mS and a fall time of 90 mS. The 60 degree inclined case had an input acceleration peak of 16 Gs rise time of 90 and a fall time of 90 mS. The latches are designed to have a vertical and horizontal shock absorption feature.

Notably the arrays are made of deformable materials and therefore the latch loadings accommodate the deformations. The simulations also show the rebound and the related forces over time.

Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
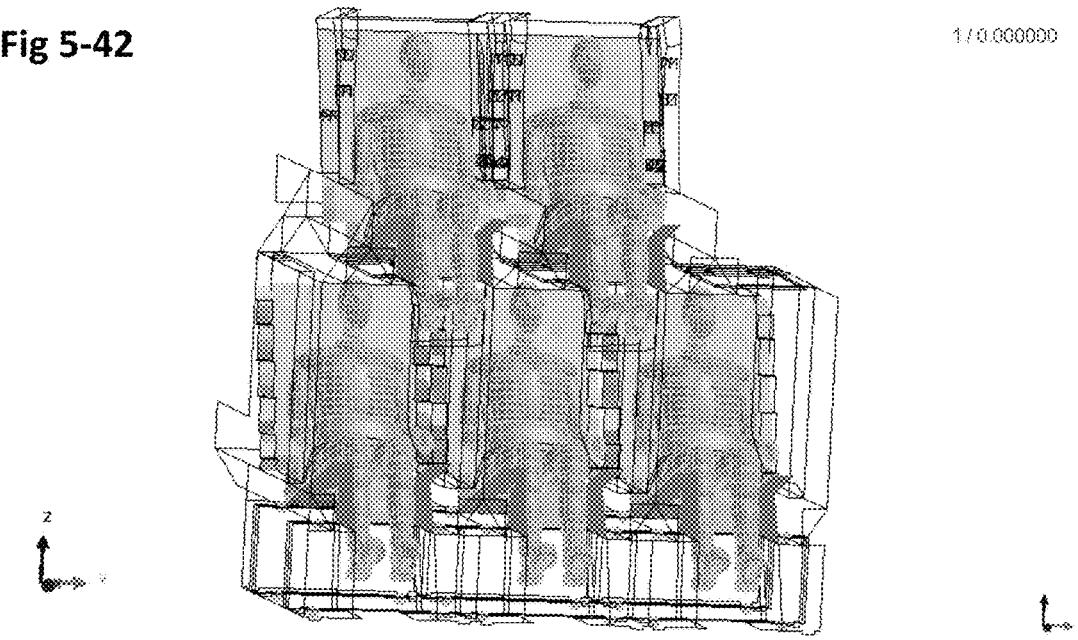
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
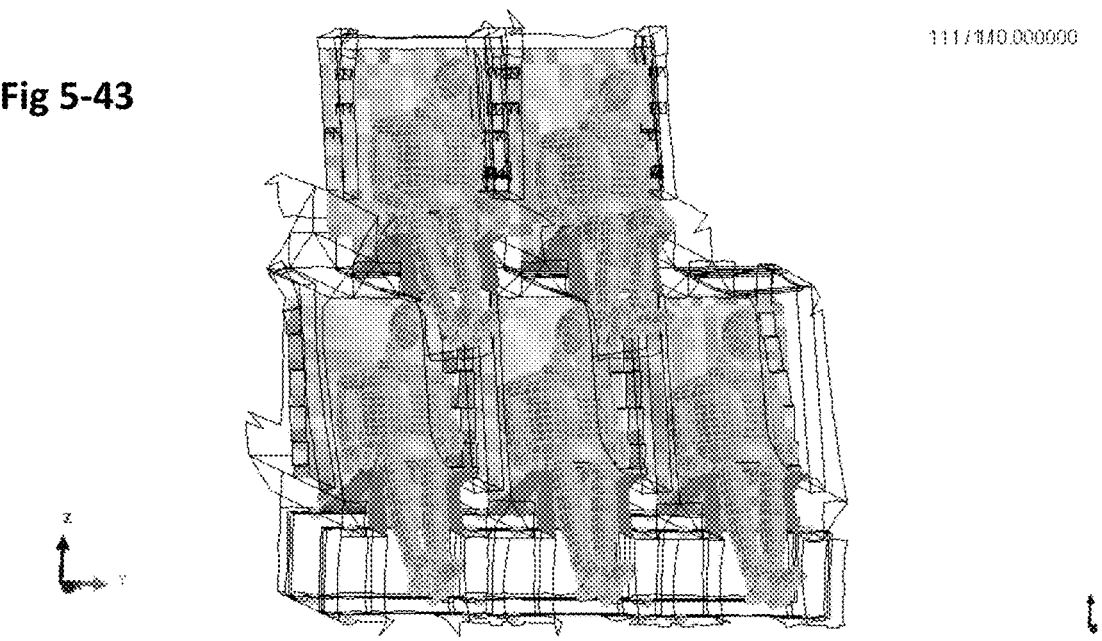
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
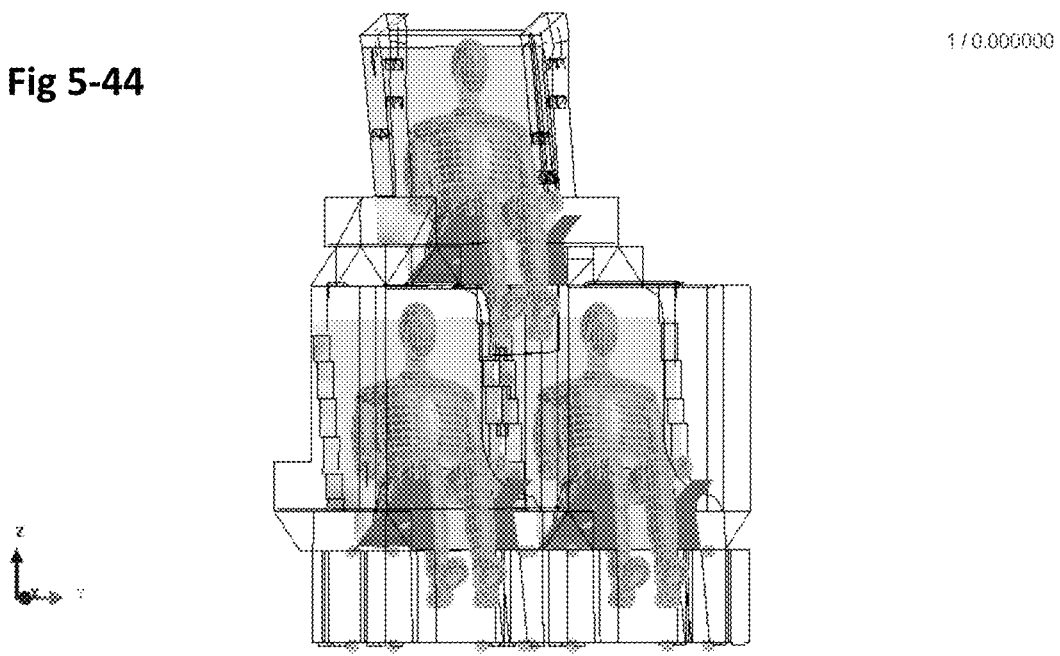
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
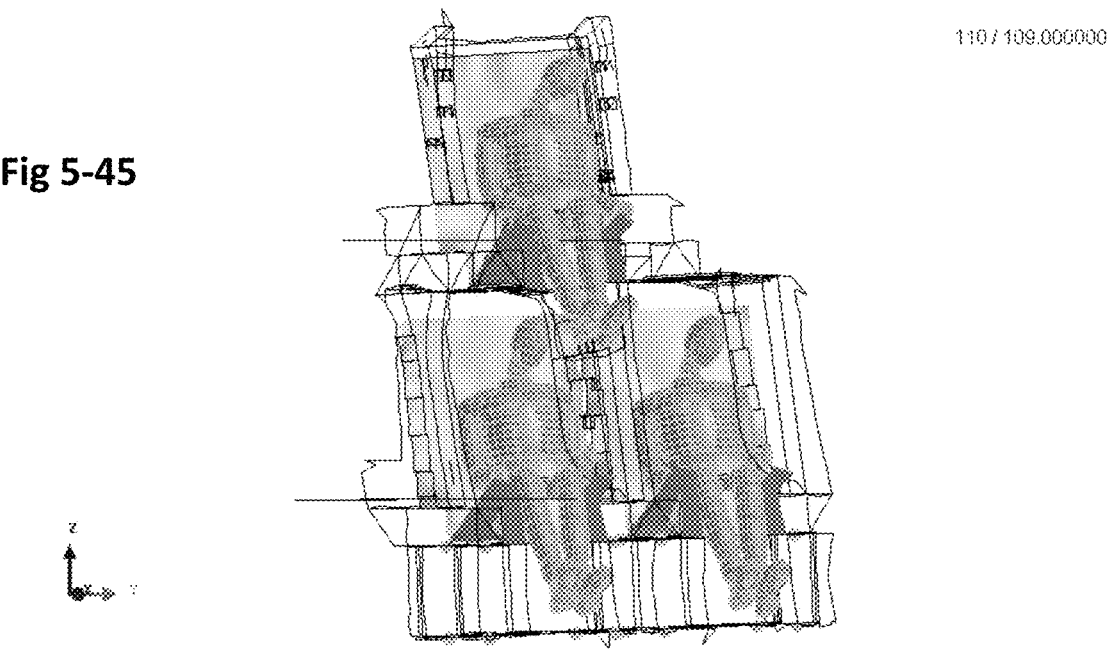
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
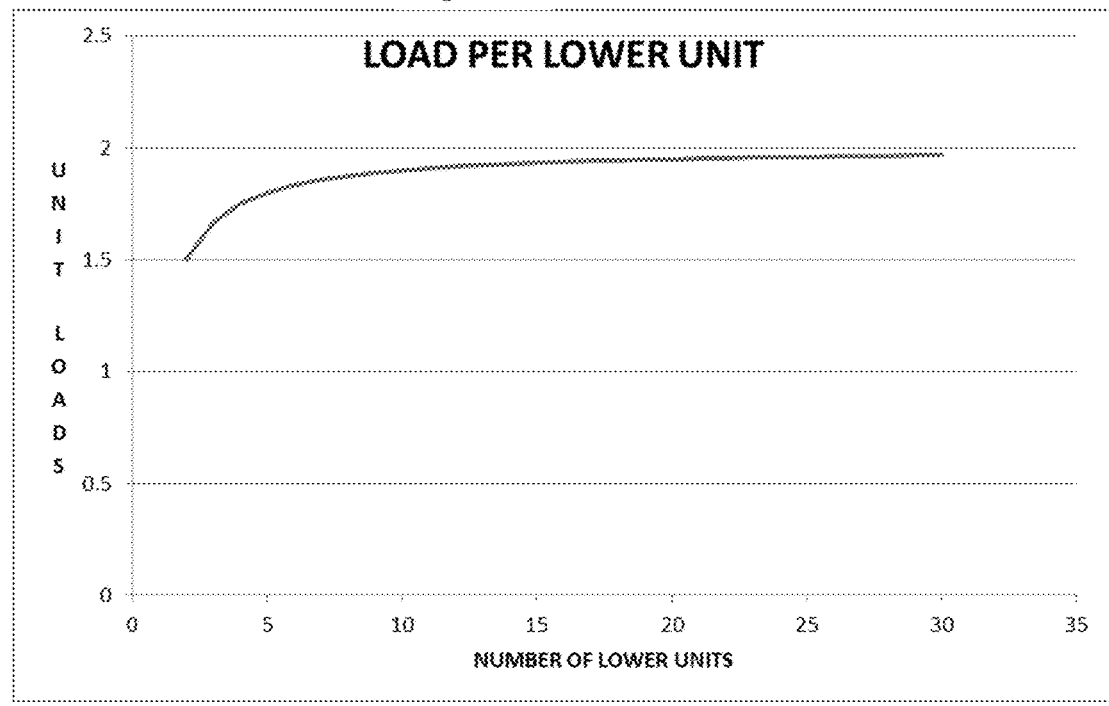
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47:
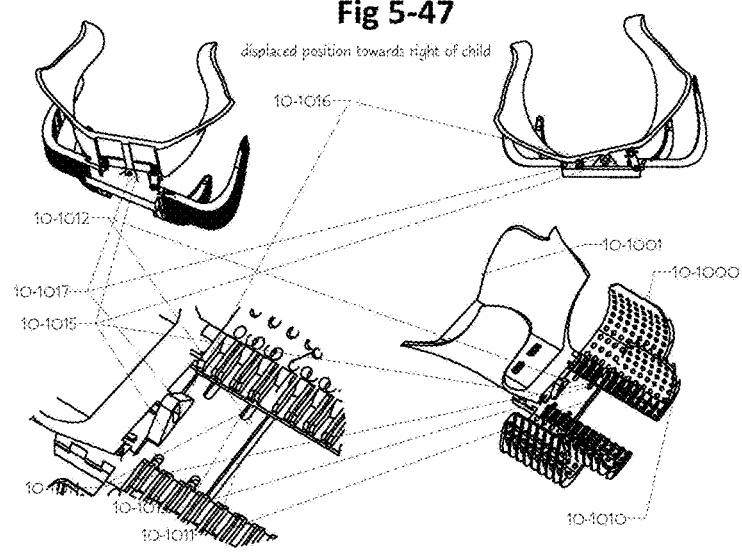
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
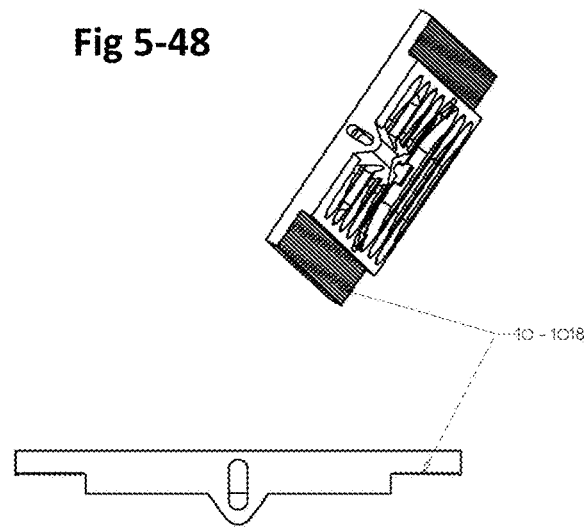
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
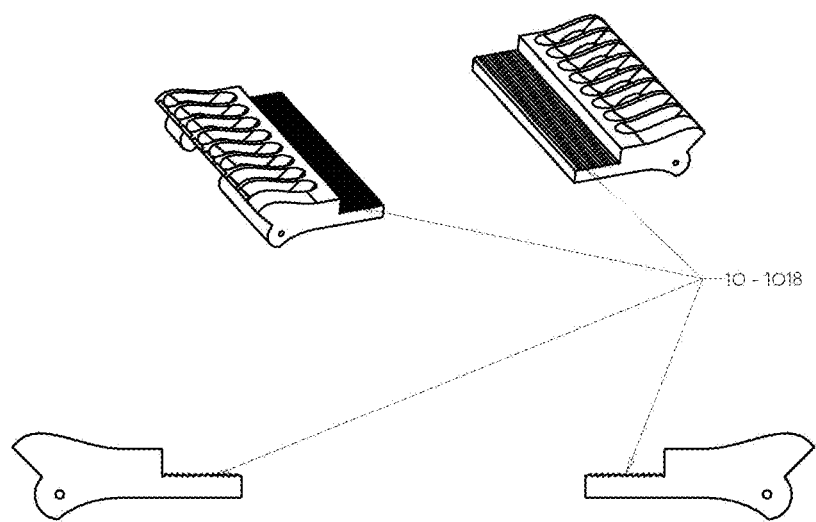
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
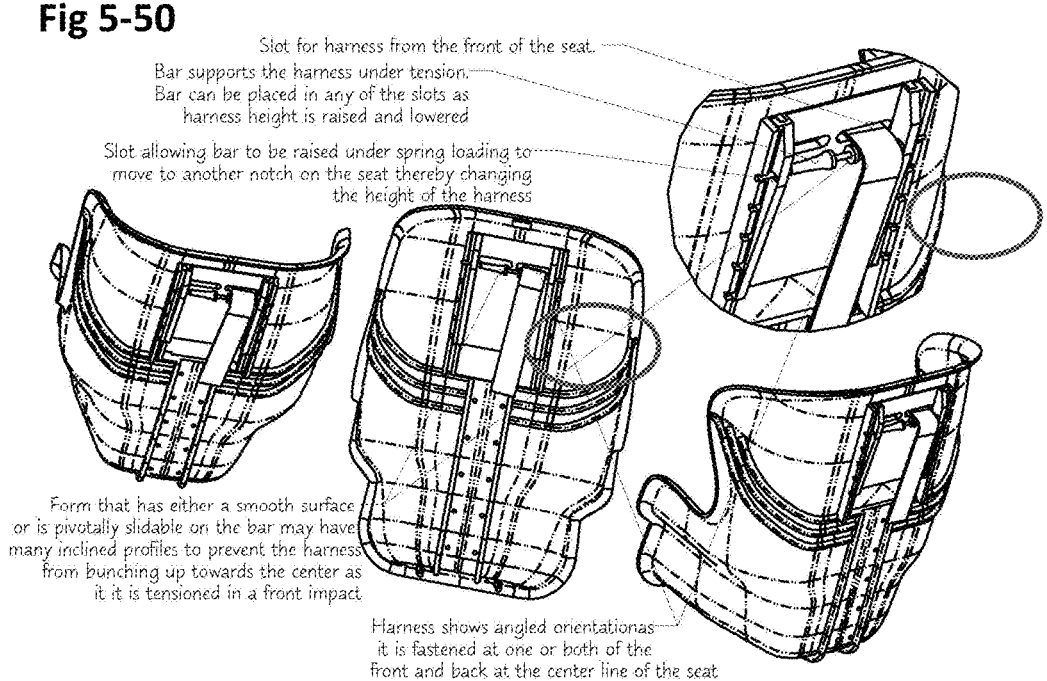
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51:
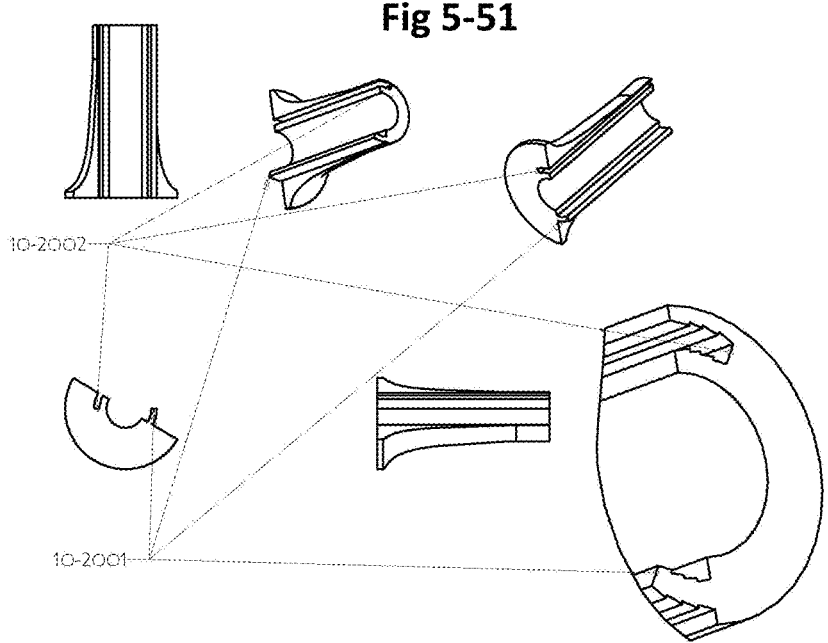
Figures 1, 6:
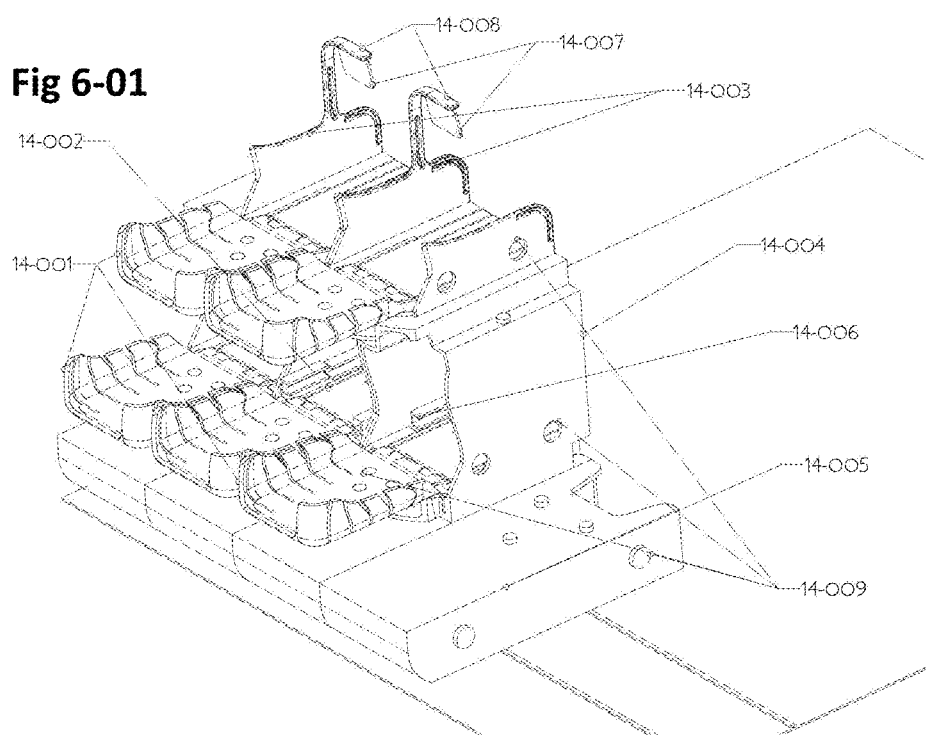
Figures 2, 6:
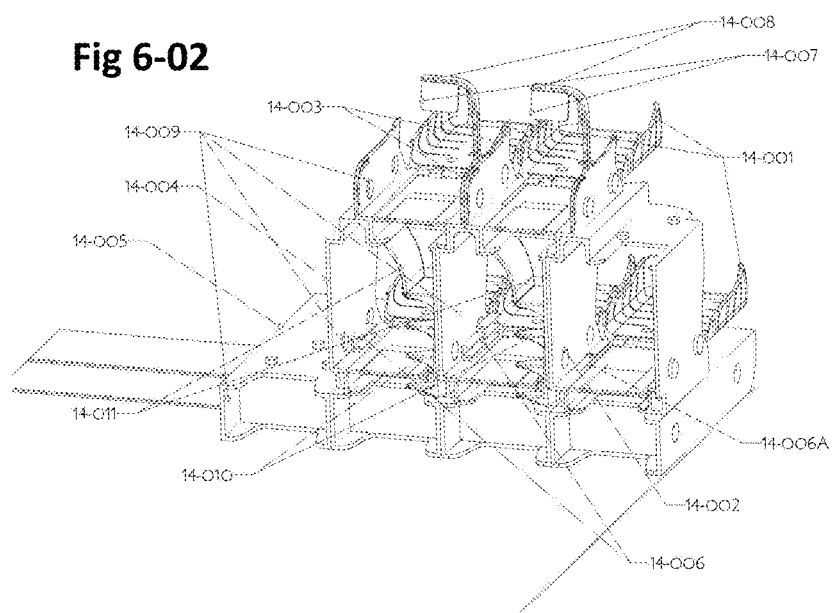
Figures 3, 6:
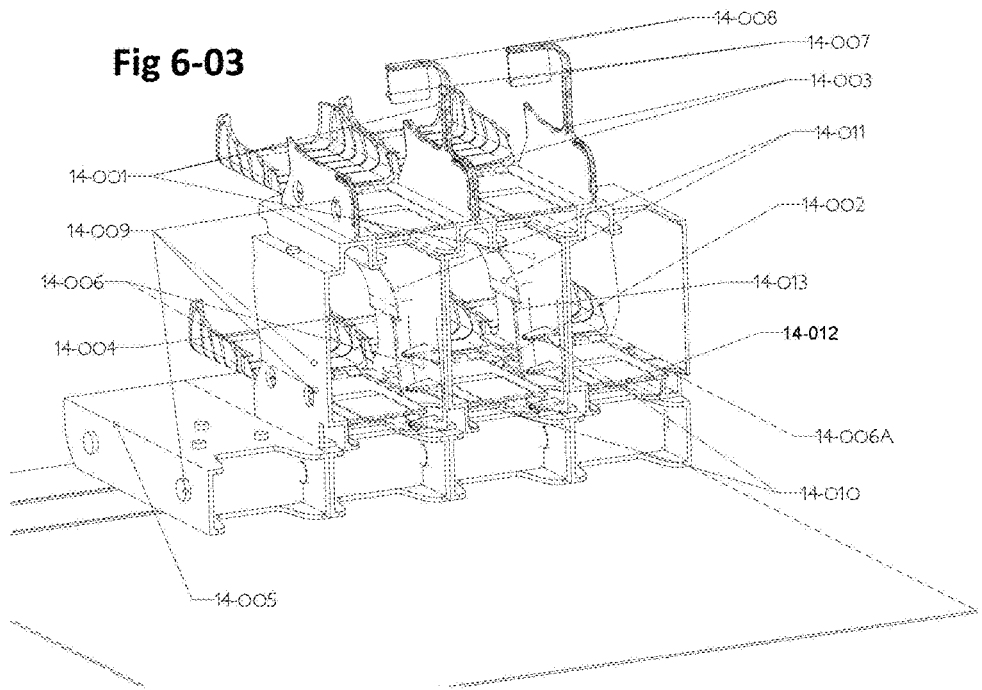
Figures 4, 6:
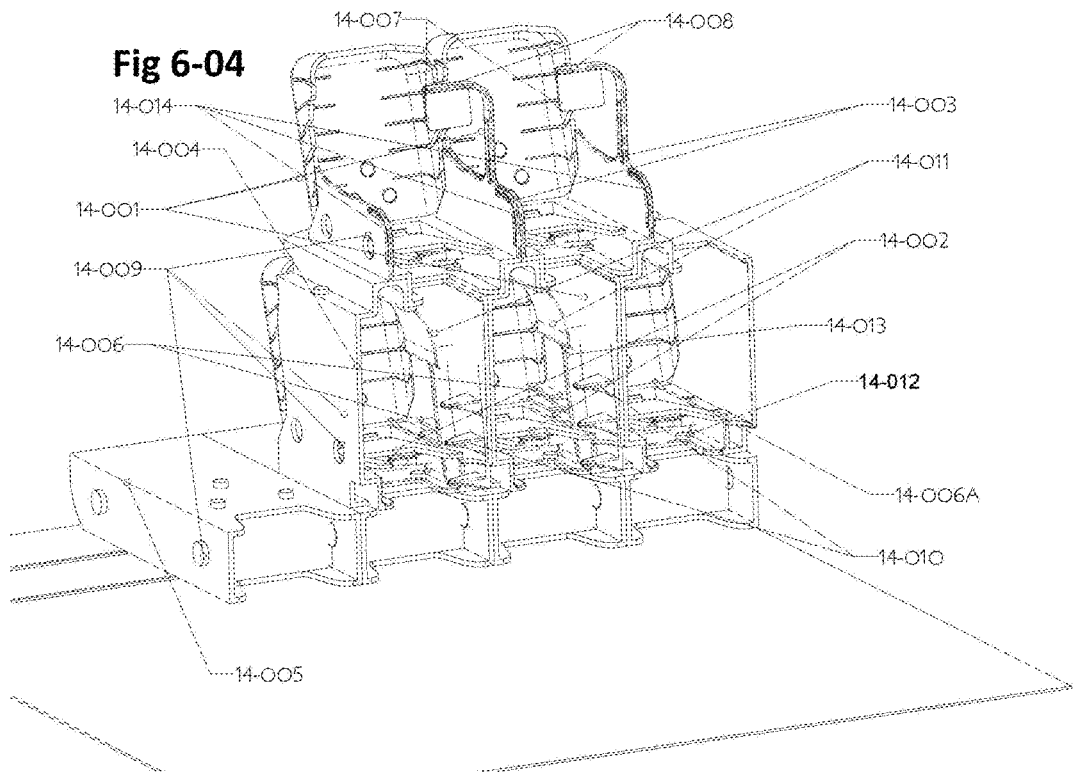
Figures 5, 6:
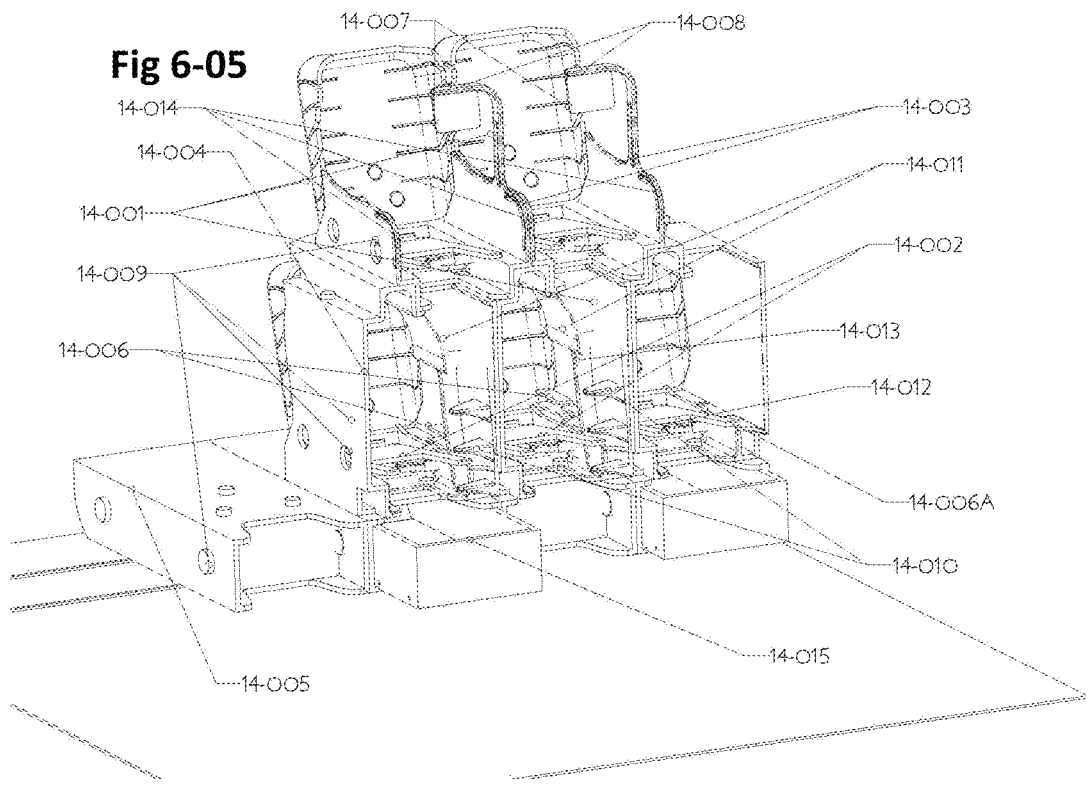
Figure 6:
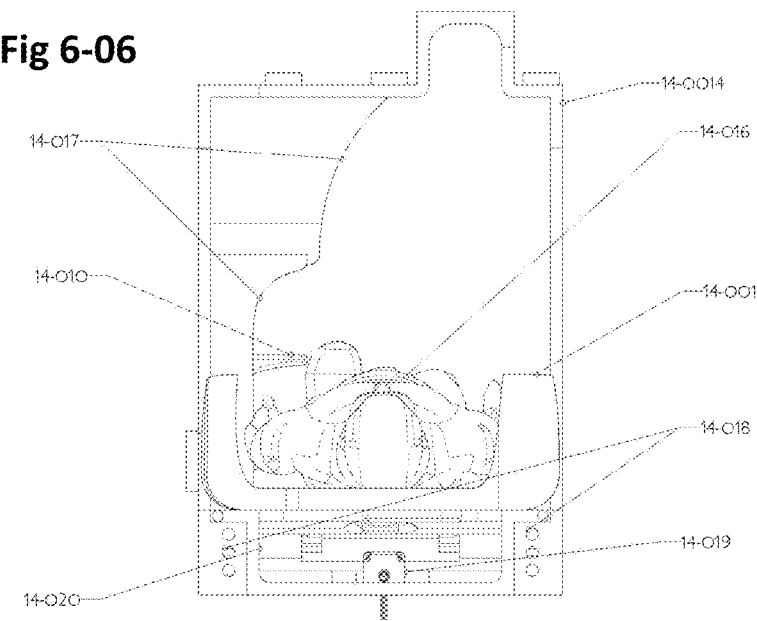
Figures 6, 7:
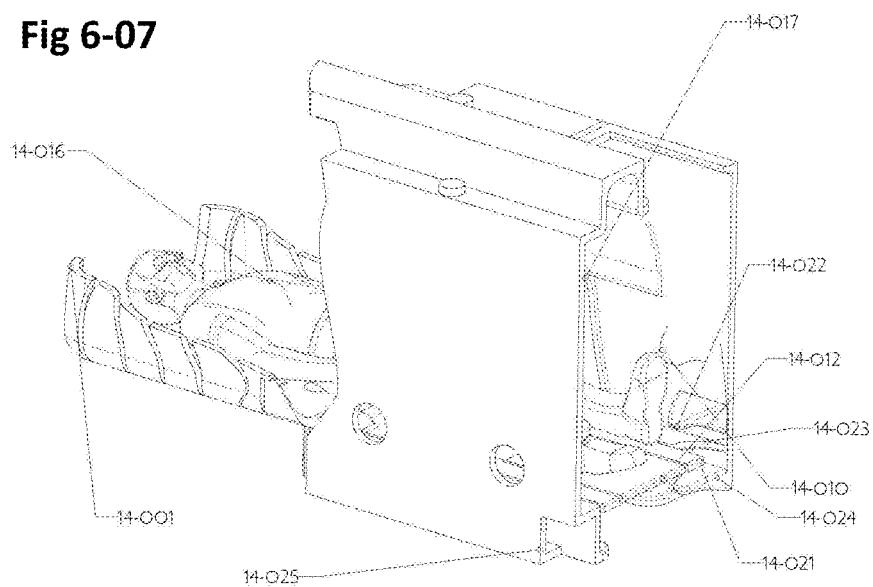
Figures 6, 7, 8:
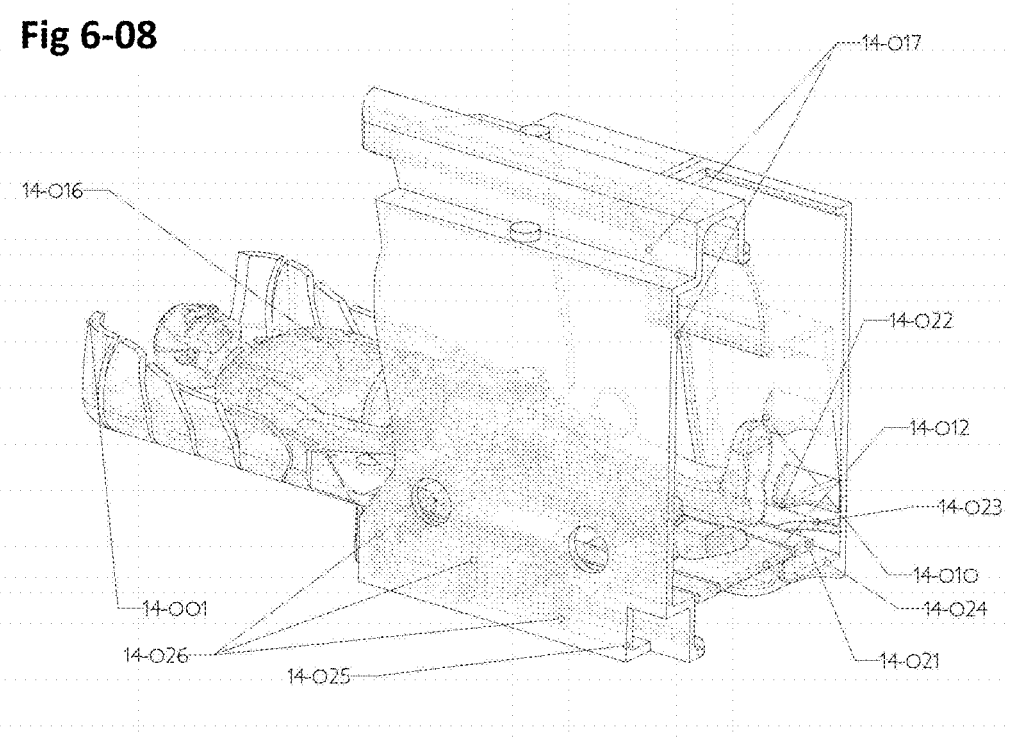
Figures 6, 7, 8, 9:
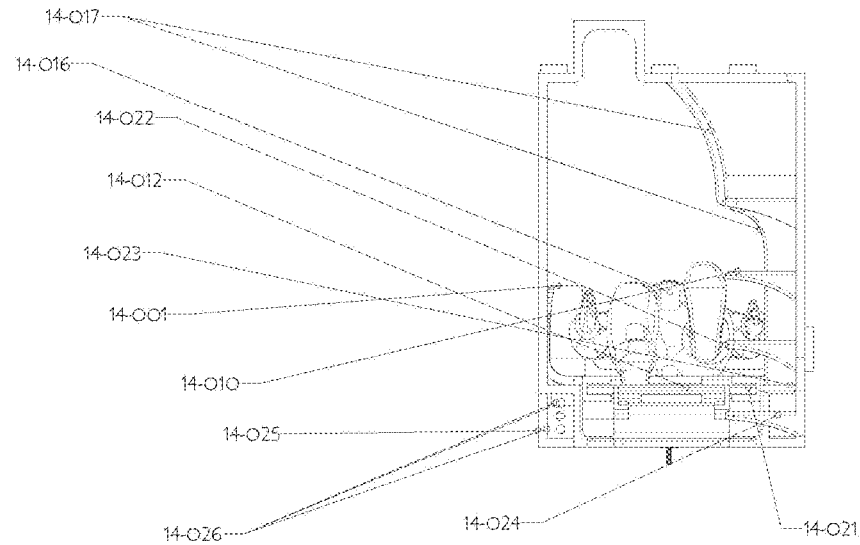
Figures 6, 7, 8, 9, 10:
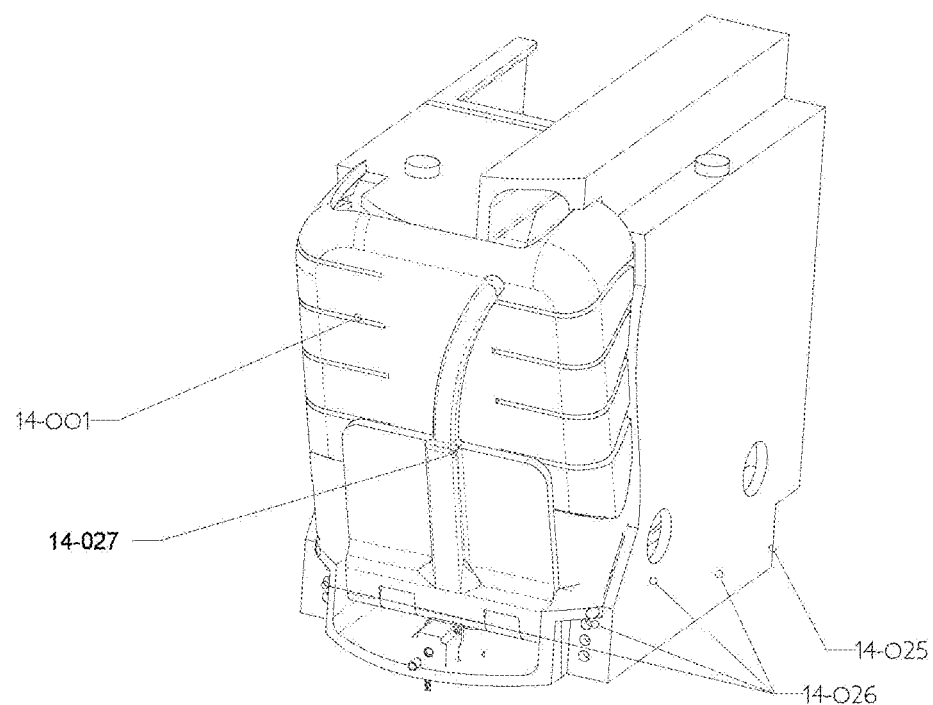
Figures 6, 7, 8, 9, 10, 11:
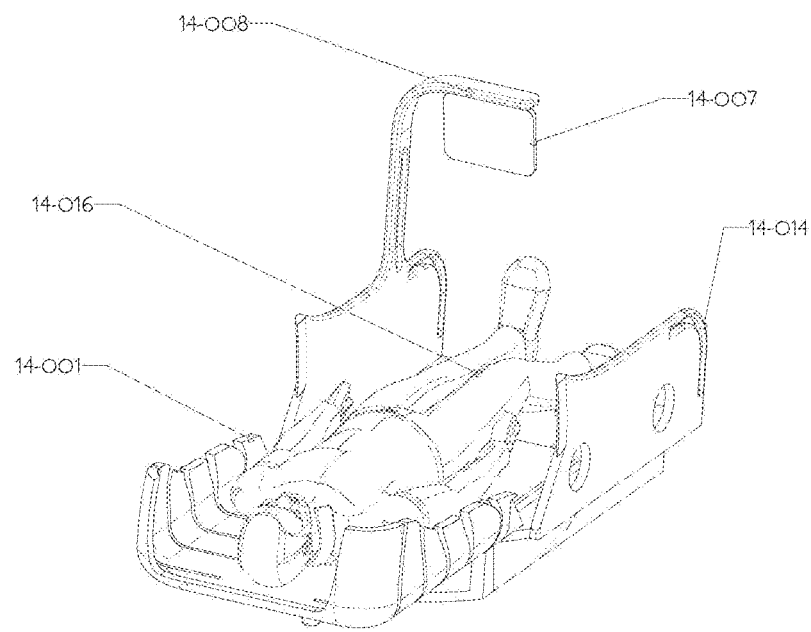
Figures 6, 7, 8, 9, 10, 11, 12:
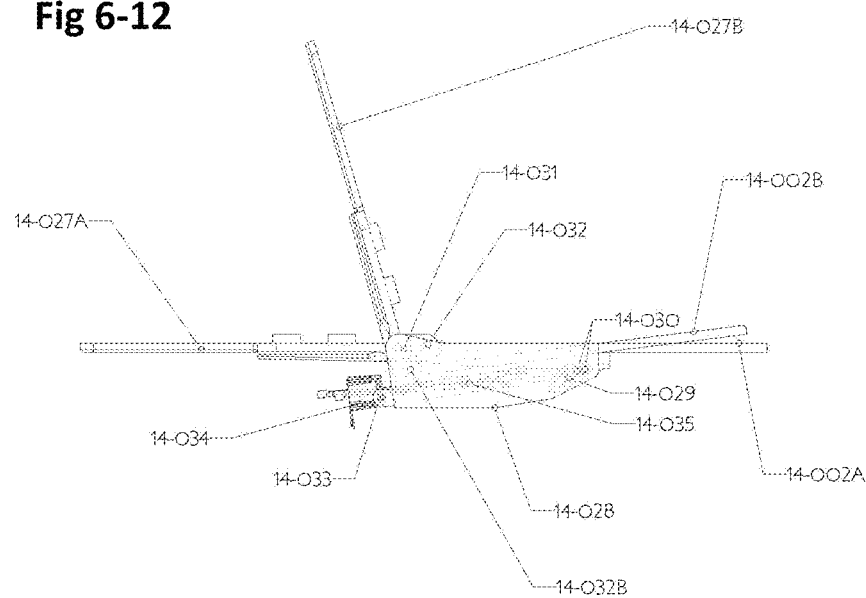
Figures 6, 7, 8, 9, 10, 11, 12, 13:
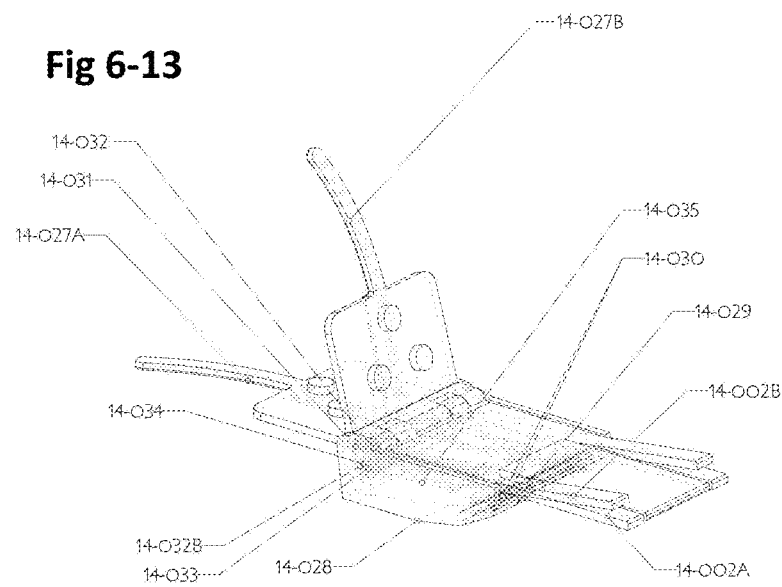
Figures 6, 7, 8, 9, 10, 11, 12, 13, 14:
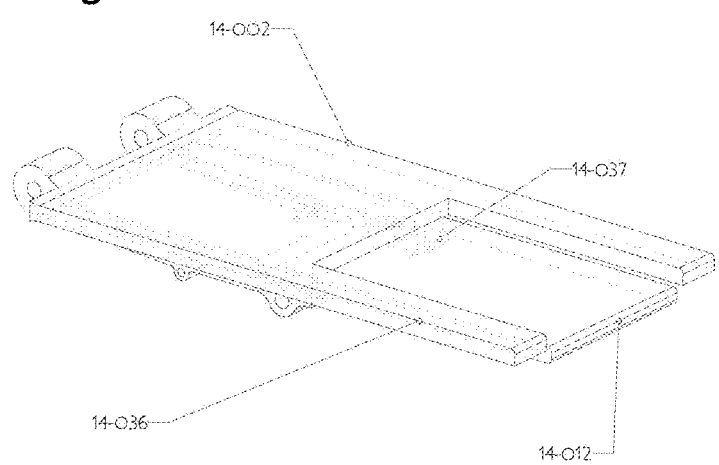
Figures 6, 7, 8, 9, 10, 11, 12, 13, 14, 15:
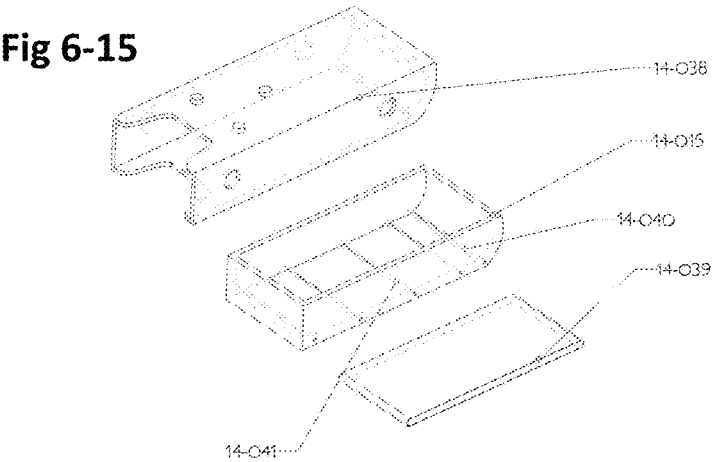
Figures 6, 7, 8, 9, 10, 11, 12, 13, 14, 15, 16:
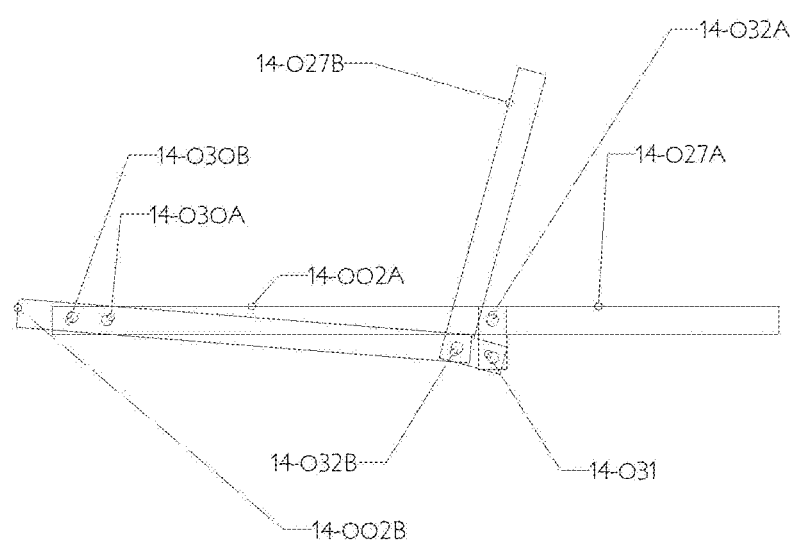
Figures 6, 7, 8, 9, 10, 11, 12, 13, 14, 15, 16, 17:
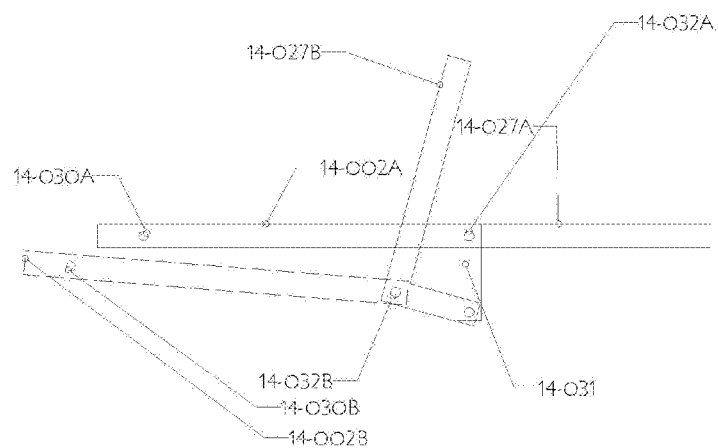
Figures 1, 7:
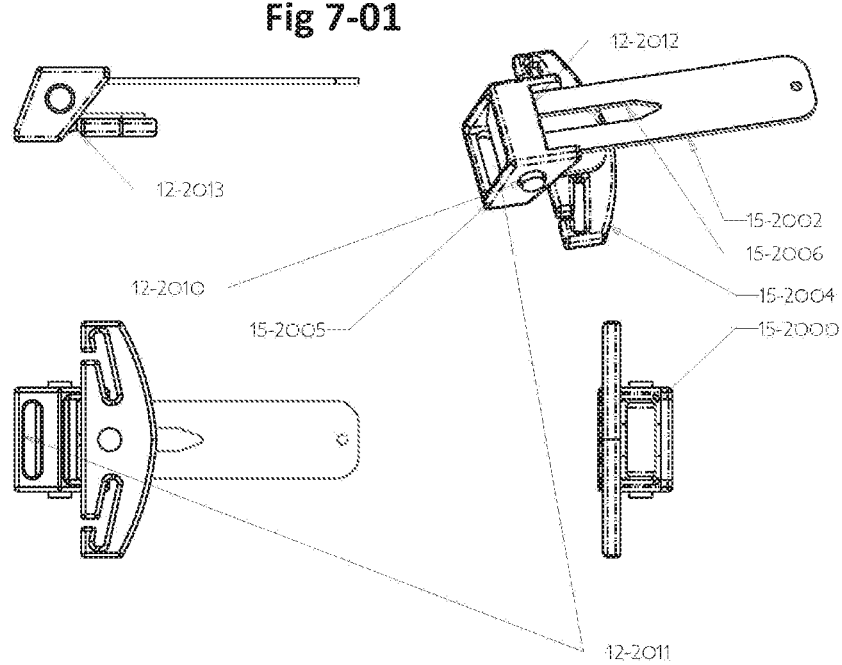
Figures 2, 7:
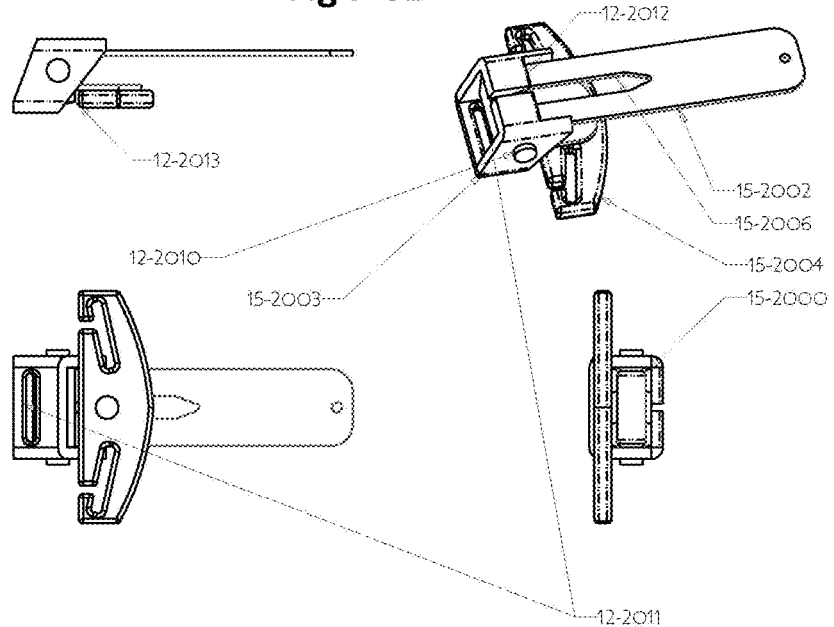
Figures 3, 7:
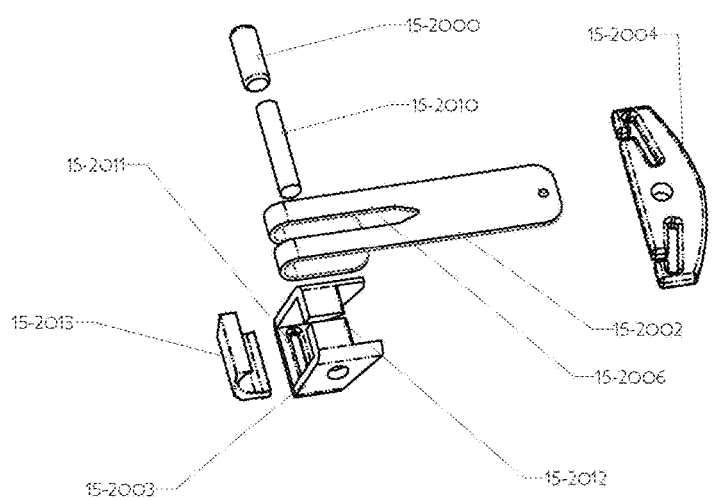
Figures 4, 7:
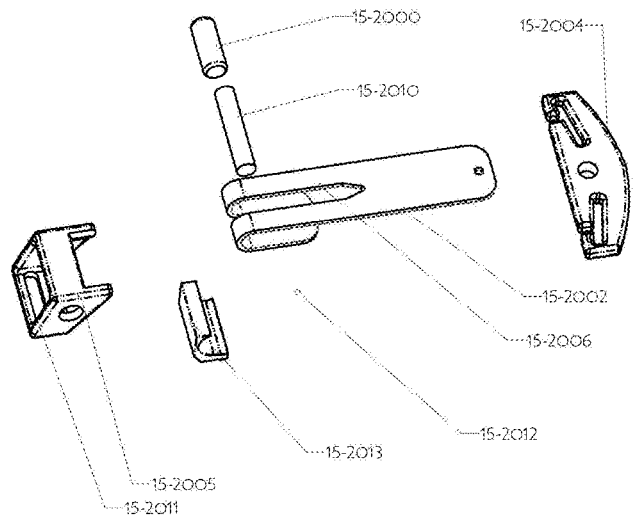
Figures 4A, 7:
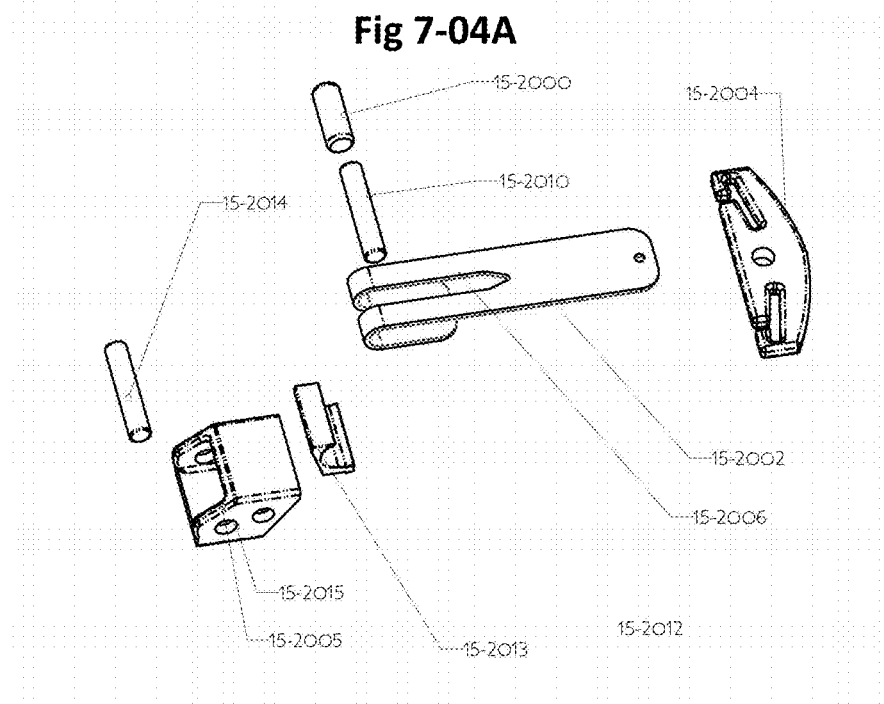
Figures 4B, 7:
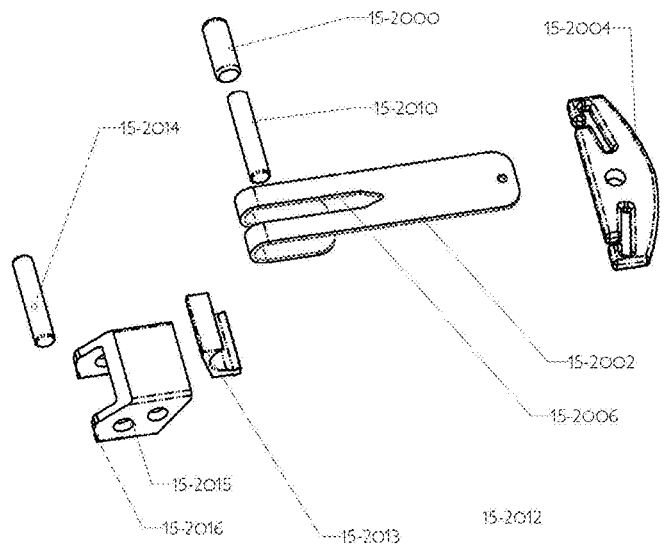
Figures 5, 7:
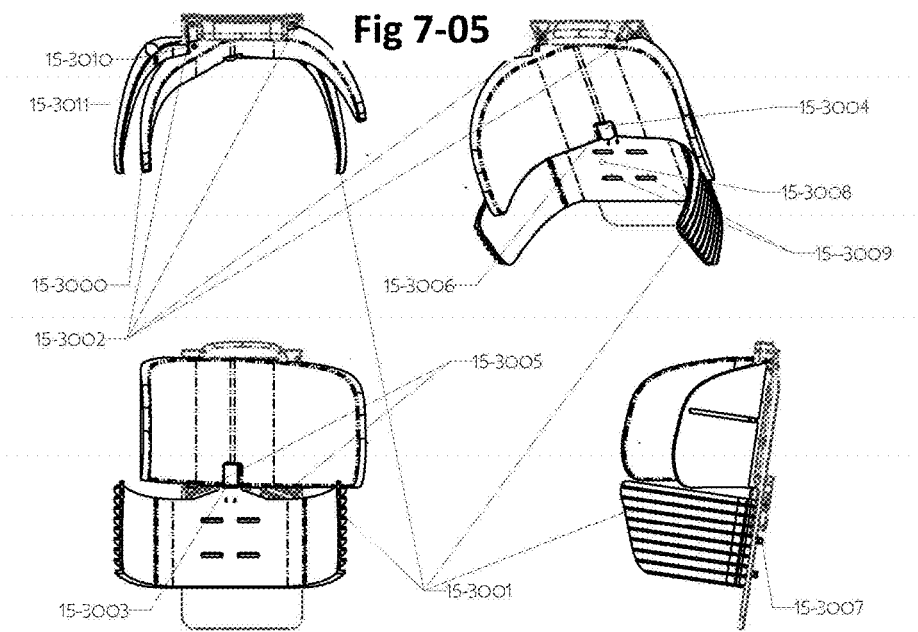
Figures 6, 7:
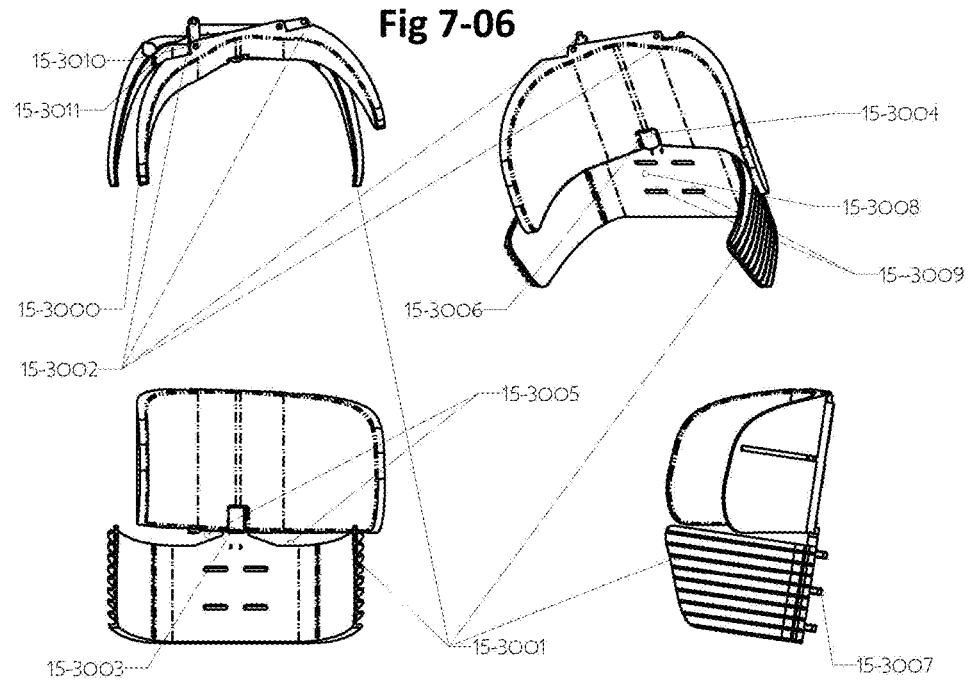
Figure 7:
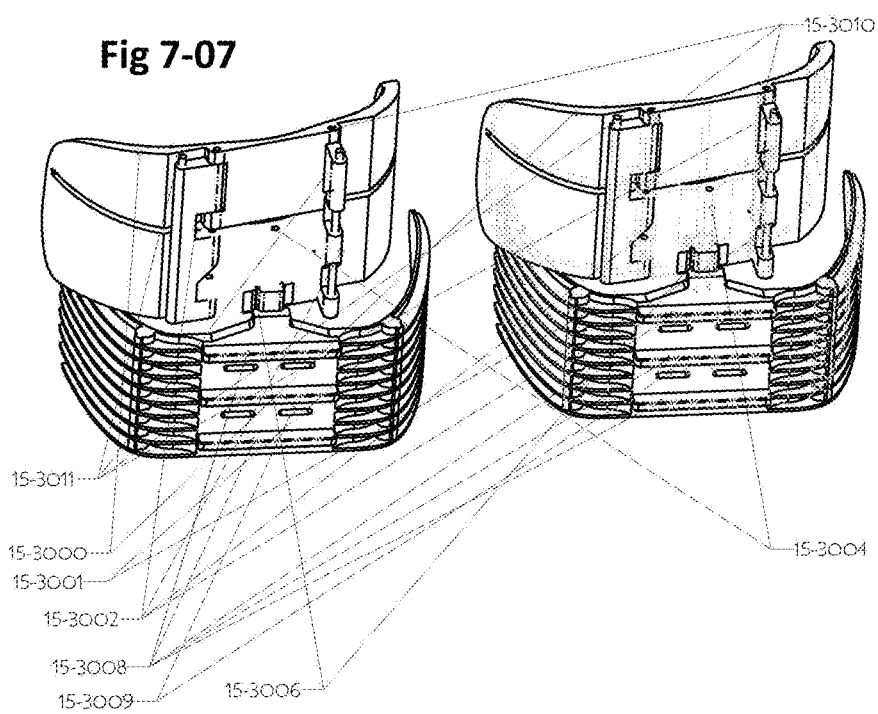
Figure 6:
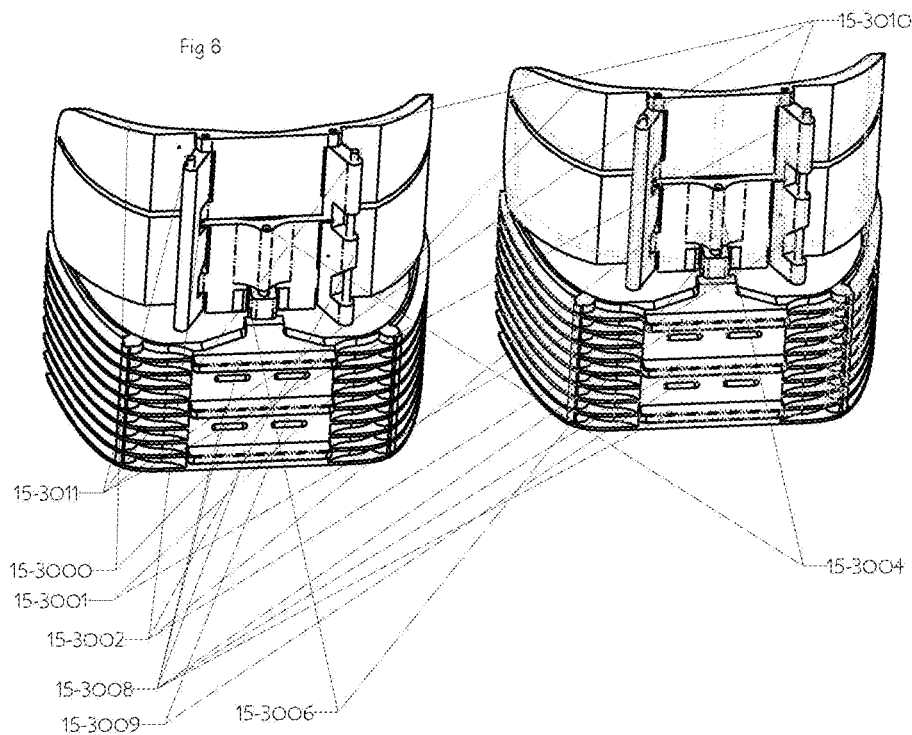
Figures 1, 8:
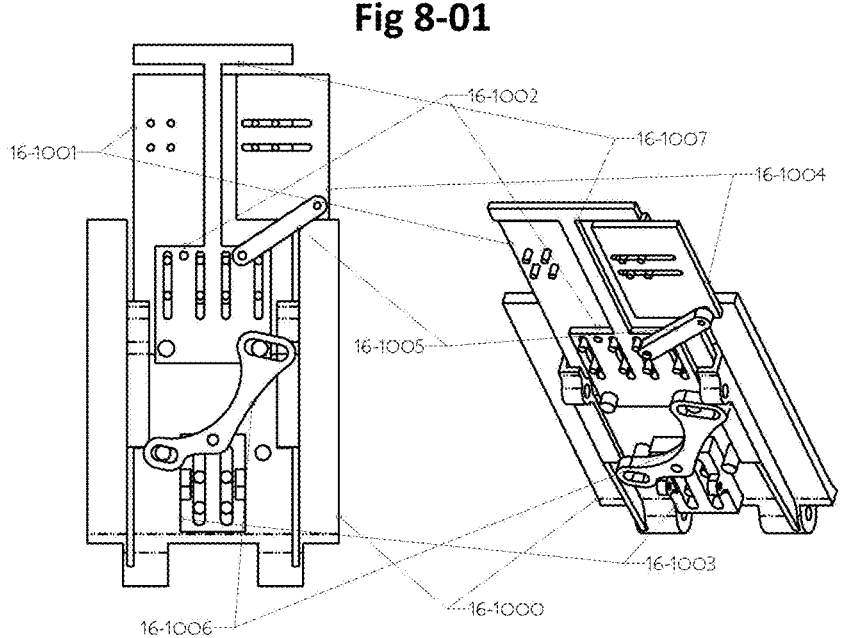
Figures 2, 8:
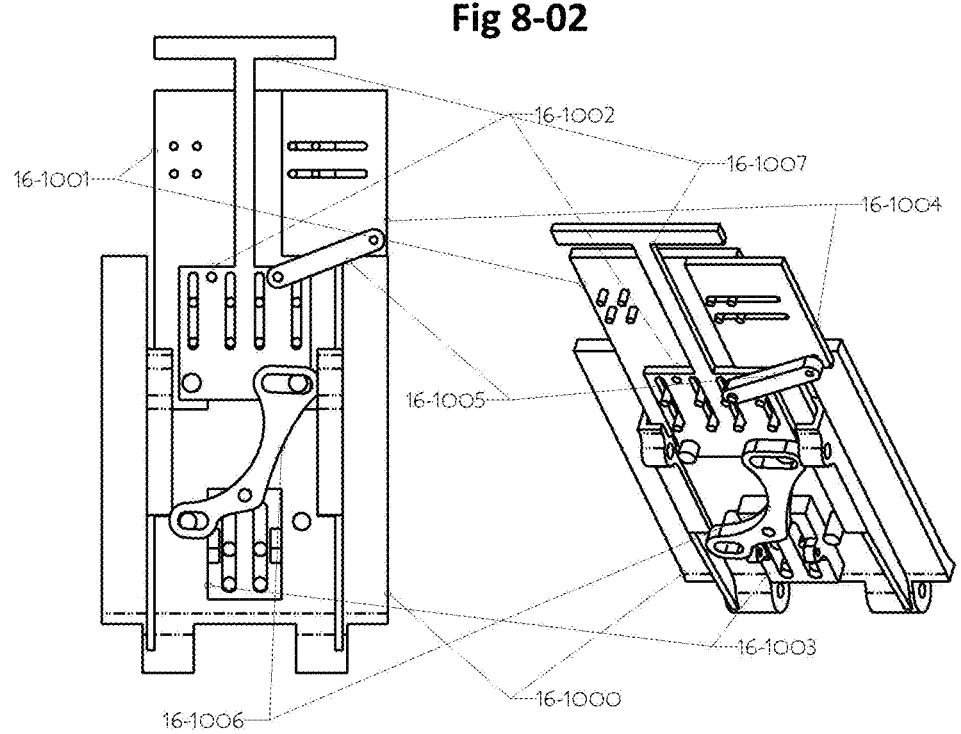
Figures 3, 8:
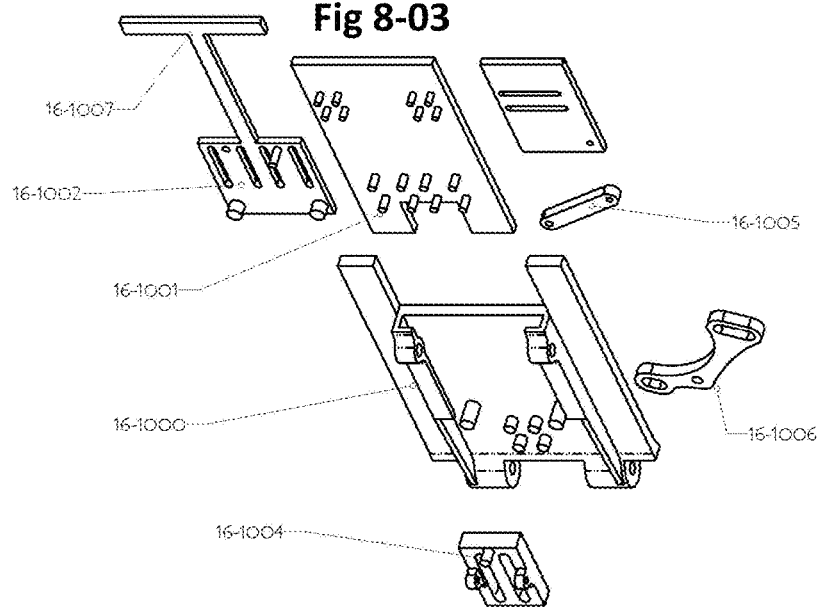
Figures 3A, 8:
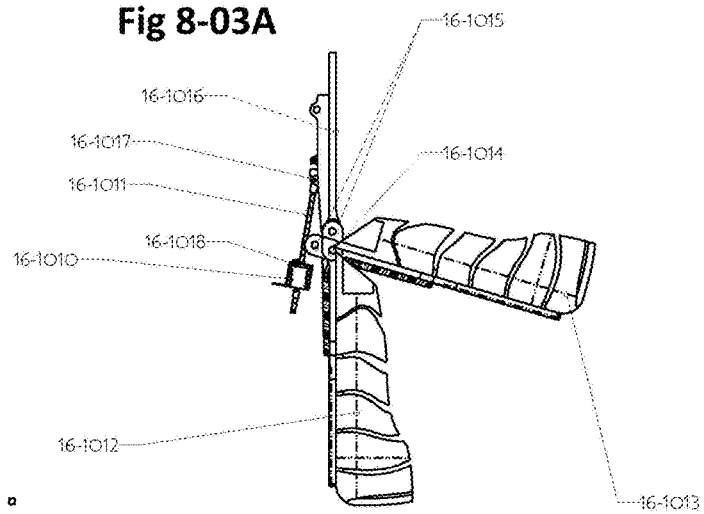
Figures 4, 8:
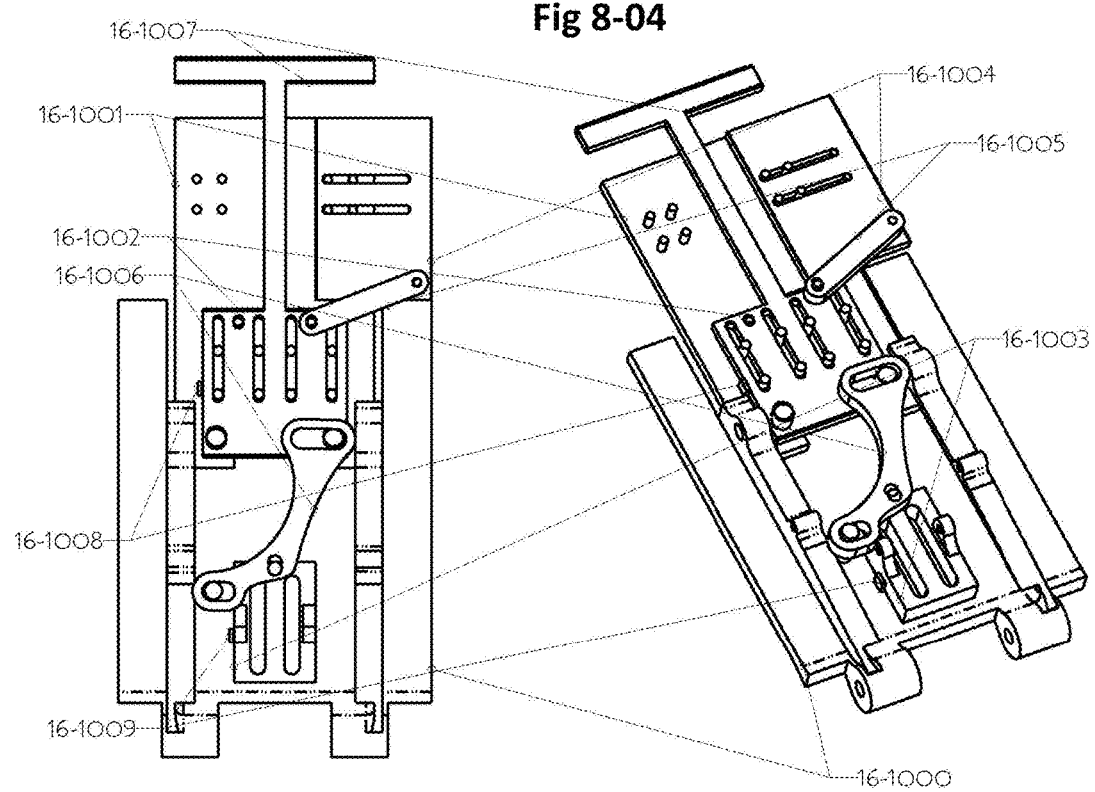
Figures 5, 8:
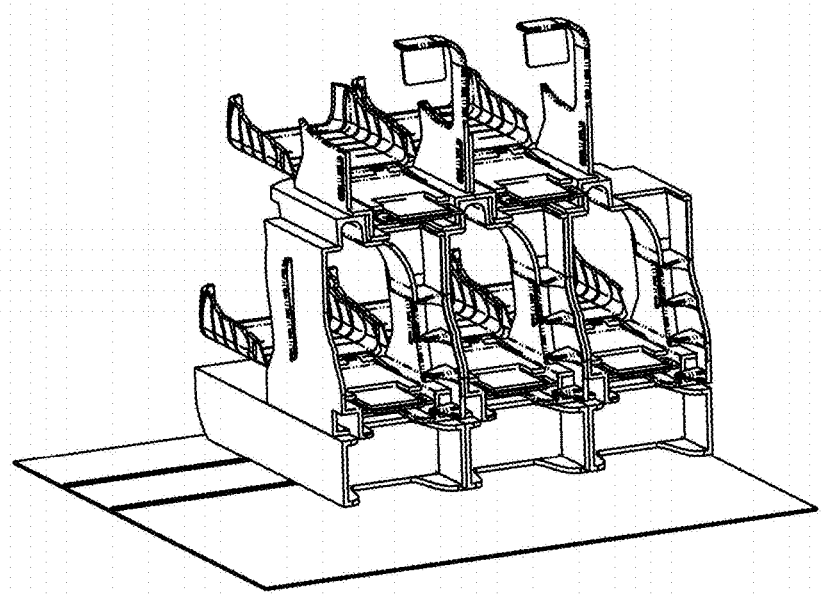
Figures 6, 8:
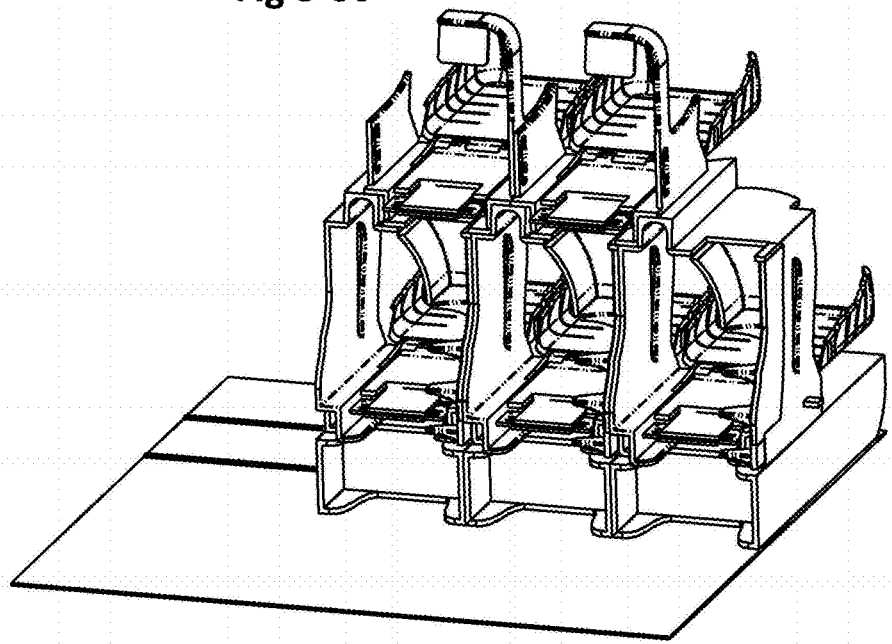
Figures 7, 8:
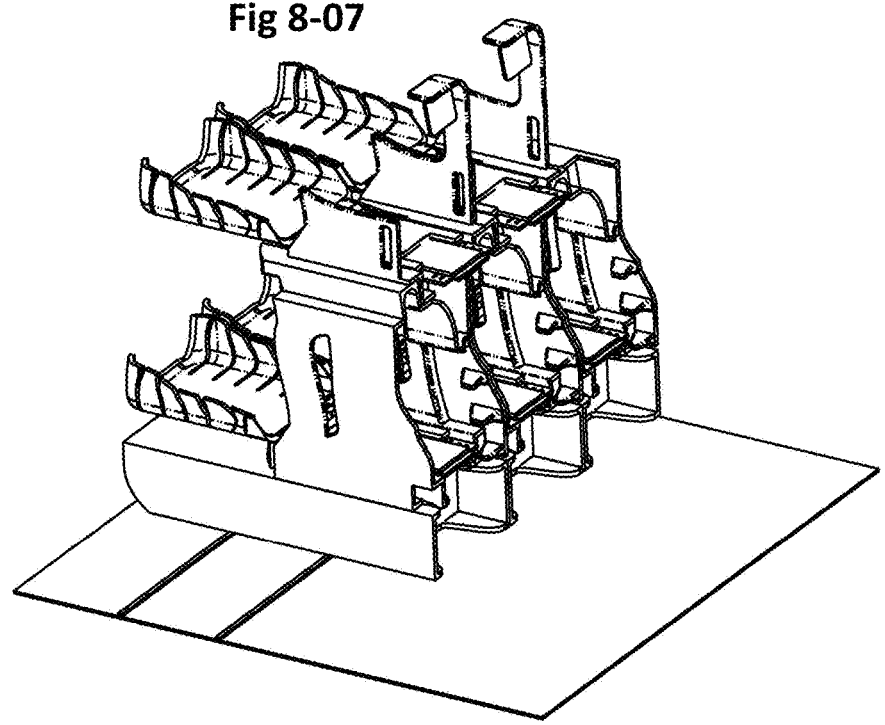
Figure 8:
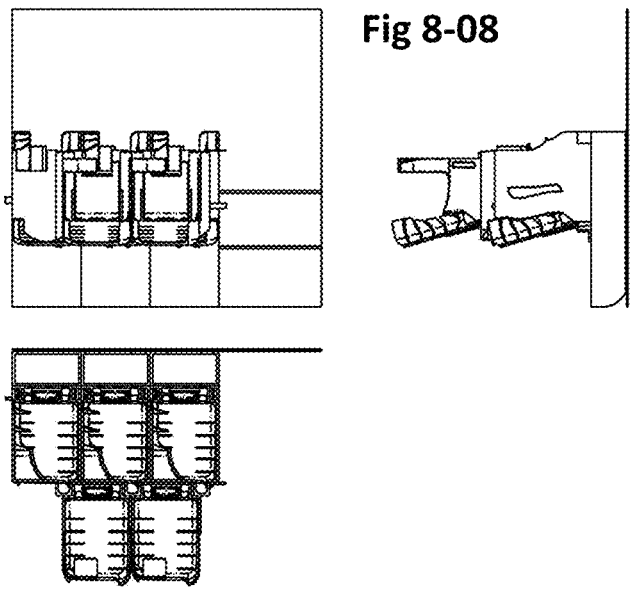

FIGS. 5-36 to 50-43 Show the cases of a two tier array of units. The arrays considered are:
1. 2 Lower/1 Upper (FIG. 36, 37)
2. 3 Lower/2 Upper (FIG. 38, 39)
3. 4 Lower/3 Upper (FIG. 40, 41)
4. 5 Lower/4 Upper (FIG. 42, 43)

The plots in FIGS. 5-08 to 5-28 show the forces for each of the arrays 1-4 at the latches. Notably these graphs include the initial force and the force during the rebound.

FIGS. 5-08 and 09A, B, C, D shows the overlay of the Cases in 1-4. It is readily seen that the maximum forces are monotonic decreasing with the number of units in the array. This supports the arguments above and the method of this invention.

FIGS. 5-10, 5-12, 5-14, 5-16 show respectively the forces along the track for the 4 cases considered. (These are the contributing forces to the FIG. 5-08)

FIGS. 5-11, 5-13, 5-15, 5-17 show respectively the forces orthogonal to the track (vertical in the flat case). It will be seen that there are compressive and tensile loadings from the opposite ends of the array as predicted in the analysis the tensile forces are on the latches nearer the rear of the array regardless of how long the array is. The force variation for the initial impact and the rebound are also seen. The forces are seen to be arranges in pairs. Each pair represents a rear and a front latch (with regard to the occupant axis) the pairs being arranged from the front of the aircraft to the rear of the aircraft along the base units as noted above.

Moreover to assess the increased compressive loading in the angled case, FIGS. 5-19 and 5-20A, B, C, D are presented. It is seen that the compressive loads are monotonic decreasing with the array size.

FIGS. 5-21, 5-23, 5-25, 5-27 show respectively the forces along the track for the 4 cases considered. (These are the contributing forces to the FIG. 5-19.)

FIGS. 5-22, 5-24, 5-26, 5-28 show respectively the forces orthogonal to the track (vertical in the flat case). It will be seen that there are compressive and tensile loadings from the opposite ends of the array as predicted in the analysis the tensile forces are on the latches nearer the rear of the array regardless of how long the array is. The force variation for the initial impact and the rebound are also seen. The forces are seen to be arranges in pairs. Each pair represents a rear and a front latch (with regard to the occupant axis) the pairs being arranged from the front of the aircraft to the rear of the aircraft along the base units as noted above.

Moreover as a result of the smaller displacements the resulting maximum head accelerations are seen to be monotonic decreasing with the length of the array. FIGS. 5-18A, B, and C show the dominance of each of the tested positions (in the 2×1 configuration) with regard to the simulated head accelerations in the other longer arrays. Moreover FIG. 5-34 table shows the HIC values that demonstrate this dominance. This supports the method of this invention for testing head accelerations and HIC.

Finally lumbar loads (in the inclined tests) as seen in FIG. 5-29 to 5-35 support the monotonic decreasing lumbar loads with increase in array size and therefore support the method of this invention. In addition to the component of the lumbar loading that is a direct result of the component of the acceleration "f" "pushing up" the occupant in the Z direction, there is the effect or rotation pulling up the rear side and pushing down the front side (with regard to the aircraft axis) as a result of the Y component which will increase the lumbar loadings on the rear side relative to the front side. This is seen in FIG. 5-29 where the Upper passenger 1 Lumbar loading in the test configuration dominates the lumbar loadings of any and all the other Upper passengers in the longer arrays. Similarly FIG. 5-30 shows the same for the Lower Passenger 1 and FIG. 5-31 shows the same for lower passenger 2. FIG. 5-35 shows the table of lumbar loadings that supports the method of this invention.

Variations of the cases considered where the axis of the passenger is not directly lateral with regard to the aircraft axis but inclined to the lateral are not significantly different as the same principles apply.

The inference from this analysis and simulations is that it is possible to test an array as in 2 Lower/1 Upper and infer the performance of longer arrays that will perform better with regard to lower track loadings and lower head accelerations and lumbar loads.

The method claimed is for a testing methodology for a contiguous array of occupant supports supported by each other and by a seat track below, and wherein the array has a second tier of occupant supports attached thereto, comprising-testing for axial accelerations and accelerations with an axial and vertical component of a subset of the array with a minimal number of units (eg 2 lower units and 1 upper unit) to meet a requirement or regulation for forces displacements, head accelerations and lumbar loads and using the dominance or monotonicity arguments presented here, infer the better performance of the longer array, thereby avoiding the crash testing of the longer array at greater cost.

Latch for Attachment of Modular Occupant Supports:

FIGS. 5-06, FIG. 5-07 show different views of an embodiment of the latch mechanism.

During crash loading conditions the units of this embodiment will undergo severe spikes in acceleration. The latch mechanisms of this invention provide the shock absorption needed for the units both to protect the units and the occupants and to reduce the peak loading o the seat tracks.

The latch arrangement has a set of sliders that are inserted through the apertures on the seat track and can slide to positions between the apertures under a flange. This allows these sliders to accommodate tensile loadings from the attached units or occupant support bases. The horizontal movement is locked with one or more pins 13-012. On the body of the latch 13-011 there is a slide cavity that has a horizontal slider inserted therein. There is in addition in some embodiments a slider support 13-013. A horizontal slider 13-015 is enabled to slide within the cavity and is controlled with a spring damper 13-015. An additional spring damper may be inserted on the other side of the slider as well. This will be useful if the system is under damped and a movement passed the normal position is anticipated after an impact load is introduced. For vertical shock absorption there is the optional slider 13-016 that is controlled for upward and downward motion by spring dampers 13-018 and 13-019 respectively.

The Unit/base/occupant support is attached to the pin aperture 13-019. The latch may be attached to a single module or to two adjoining modules thereby contributing to neutralizing the tensile and compressive forces resulting from the inertial loads of the two modules in a rapid deceleration of the vehicle.

Some embodiments of the AirSleeper design with a tiered architecture are disclosed. This invention increases the packing density of the aircraft cabin while maintaining the creature comforts with space of the occupants and thereby provides greater value per unit volume of the cabin. The mini-cabins shown the drawings may be laterally placed or placed at any angle to the lateral direction of the aircraft or vehicle. Angles close to the lateral position are an advantage for safety.

As shown in FIG. 6-01 to 6-05 the array of Air Sleepers as shown here comprise a set of base units which would typically be used for storage and either contain the support structure for attachment to the seat tracks integrated within them or attached to them. These are referred to as the bins. As show in FIG. 6-05 the base unit bins may have drawers that pull out for storage. Moreover these storage drawers may have one or more loops of belt from the rear to the front to transfer the stored items from the rear of the bins to the front for access. These belts have pulleys at the rear and the front and the belt may be supported along its length in between by a low friction surface or multiple rollers. Details of the bin and the parts therein are shown in FIG. 6-15. Belts may be manually operated by pulling or pushing baggage or motorized as well disclosed in the background art for motorized pulleys and wheels.

If a lower profile for the AirSleeper array is preferred another embodiment will not use the Bottom bins at all and attach the AirSleeper mini-cabins directly to the floor of the aircraft or on the seat tracks.

The storage in these cases may be above the upper sleepers which will then have a structure similar to the lower sleeper mini-cabins to support components above them. The draws may not be useful but doors at the front of the bins will access stored baggage that can still ride on the belts.

Attached to the lower bins are the AirSleeper lower mini-cabins. The lower mini-cabins have a structural purpose as well for supporting the upper mini-cabins and therefore require additional bracing structure. The Figures show that the seat movement machinery lies in the space directly under or behind the seat bottom but the space under arm rests 14-025, are used for bracing ribs and the lower end of the shear plane 14-013 that braces the lower cabins. Between the ribs there are optional pop-up storage spaces. They may also be storage spaces that have hinged or sliding covers. The top surface of these will be a part of the arm rest in the sitting position of the occupant and part of the bed surface in the sleeping position of the occupant and therefore will be suitably covered for comfort.

The seat back supports 14-001 have side wings to support the occupant in the event of rapid deceleration of the vehicle. The back support also has in most embodiments the air supply for ventilation, reading lights, headphone sockets and one or more projectors installed on the edge of the side walls to project approximately along the line of sight of the occupant lying face up, regardless of course of the position of the seat back. The projection surface may be the mini-cabin ceiling, a table top inclined to be vertical for the purpose, or the ceiling of the aircraft cabin for the upper mini-cabins. The air supply vents may be directed from the upper edges of the sides of the seat to provide a constant clean air supply for the occupant. As shown in the FIGS. 14-010, the steps are placed on the edge of the lower Air Sleeper mini-cabins and the upper mini-cabins displaced laterally to accommodate this. This allows excellent egress ingress for the lower occupant. The feet and legs of the upper occupant are separated from the space of the lower occupant with a screen 14-011 and the upper section of the rear wall 14-013. The rear wall 14-013 is also a shear "Plane" (may not be flat) that support the mini cabin structure in the event of rapid deceleration of the aircraft/vehicle. Notably the shear plane needs to be narrow at the lower end so that the space of the lower passenger is not compromised. The plane is typically at the knee position of the lower passenger and a slightly narrower space at that point can be accommodated by the passenger.

The upper mini-cabins have a limited structural role and do not need to support above them in most embodiments. They have a support structure for the monitor/camera/projector and also for conducting oxygen to the oxygen mask container towards the end at the top of this support 14-008. The Camera may be used for video conferencing, the projector may project on the table (not shown but deployable from the side wall of the mini cabin). If oxygen generator is used this may be housed in the support mount 14-008. 14-007 shows a monitor or projector although the projector may be housed directly on the mount 14-008.

As shown in FIG. 6-05 the bin drawer 14-015 may be pulled out onto the aisle for storing or retrieving baggage.

FIG. 6 shows the perspective of the lower mini-cabin occupant. On the left is the stairs for access to the upper mini-cabin. A screen or projection space may be on the rear of the wall behind the stairs. The top recess adds space to the lower mini-cabin and lies under the arm rests of the upper mini-cabins.

FIG. 6-07 shows another aspect of the space efficiency achieved in this invention. The steps at the lower end will interact with the space of the lower occupant and therefore needs to be designed carefully. In some embodiments of the invention, the a section of the mini-cabin 14-023 is cut out for foot space on the first step which may lie below it. The cutout may also extend to the side section of the leg rest (not-shown) Moreover the second step 14-022 is contoured to be towards the end of the mini cabin so that the leg space of tall occupants in the lower mini-cabin is not compromised.

FIG. 6-11 shows the handles for easy egress and ingress to the upper mini-cabins. Additional handles may be installed along the edge of the lower mini-cabins as well.

FIG. 6-12, 6-13 show the mechanism for changing the seat position from lie flat to sit upright. There are many possible actuator mechanisms both linear and rotational. One is shows with an attachment point at the rear of the seat pan. The seatback anchor is supported by a pivot 14-031 to move from the flat bed position to the seated position. In addition at the lower end of the seat back there is a pivotal attachment to the seat bottom 14-032. As may be seen from the figures, the seat bottom moves forward when the seat tilts back to the flat bed position. The seat bottom in this embodiment at its front end has sliders or rollers 14-030 in a slot 14-029 that directs the vertical position of the seat front as it moves back or forwards thereby defining the angle of orientation of the seat bottom.

In another variation of this architecture, the pivot 14-031 is not at a distance from the bottom edge of the seat back along the seat back as shown but rather is on one or more arms that are attached to the bottom edge of the seat back protruding backwards (in the sitting position) or under (in the flat bed position) the seat back like an elbow that could be substantially at right angles to the seat back. The pivot to the support pan on the mini-cabin is at the end of this arm. The pivot 14-032 is at the end of the seat back as in the illustrated embodiment. This arrangement will pull the seat bottom back (rather than forward) as it goes to the flat bed position and the slot heights will be reversed so that the front of the seat bottom rises as it moves back.

The advantage of this arrangement is that the length of the noted arm can be varied (and the slot as well) to change the height of the seat back and bottom in the flat bed position to benefit the lower occupant, and bring the seat bottom forward in the sitting position for the upper occupant This architecture is shown in FIGS. 6-16 and 6-17. The figs show only the ends of the slots where the pins are. The contour can take any shape for preferred orientations during recline.

FIG. 6-14 shows the center section of the leg rest that may be retracted under the seat bottom in a slot under it. An alternative design will have the center section of the leg rest hinge down at the front edge of the seat bottom. There are many actuator mechanism for retraction of leg rests in the back ground art. This invention however proposes some embodiments to have the same actuator used forth e seat back angle support to also actuate the center leg rest by utilizing limit switches that lock the seat bottom at the end of the movement desired and lock the end of the actuator to the center section of the leg rest to push it out or pull it back. Notably this attachment may need to have levers or gears well disclosed in the background art, to increase the movement with reduced force required. When the center leg rest is full retracted and detected by limit switches, the actuator end is unlocked from this mechanism and locked onto the seat back engagement point to move the seat back.

The Seat Bottom Mechanism

Mass and weight are not desirable in aircraft architectures and therefore a fewer number of actuators required for a seat mechanism has utility.

This mechanism is designed to actuate the angle of the seat bottom (and seat back); the movement of a sliding leg rest and the movement of wings and/or extensions to the leg rest if needed. Notably the force/displacement ratios can change drastically between moving a seat with a high mass occupant on it vs moving a leg rest or other small parts. The former may need a high force and a small displacement particularly if near the axis of motion to provide the required torque at that axis, and the leg rest may need to move a large distance but with a small force. These requirements are accommodated in the design.

Actuation of the seat back and bottom angle is achieved by attaching the seat back on the pivotal support 16-1014 and attaching the seat bottom on the seat back with pivotal support 16-1015. The front of the seat bottom can slide in this embodiment along a path that is predefined to provide the desired seat bottom angle at different recline angles of the seat back. This and any other seat back and seat bottom architectures that require the motion of a point on the seat bottom can utilize the present invention.

This invention uses locks or spring loading to channel the available force/movement of the actuator to the desired point. In one embodiment the seat bottom (or back) has locking points at different orientations available from the motion of the seat bottom. Initially the Main Slider is locked to the seat bottom 16-1009. This ensures that when the seat bottom is not locked on its one or more locking points the seat bottom moves as the 16-1009 is locked. At the desired position of the seat bottom the seat bottom lock is actuated and concurrently the lock 16-1009 is released. Thereby locking the seat bottom (and the seat back) in the desired position and transferring the motion to the main slider. The motion can of course be stopped at any time by stopping the actuator.

In a first embodiment, with a single lever, as the actuator motion continues the main slider 16-1004 is actuated and actuates the Pusher rod 2: 16-1006 by moving its pivotal attachment thereto. The Pusher rod 2: 16-1006 is designed to work as a lever, providing motion amplification (with force de amplification) for the leg rest assembly which slides on the seat bottom. One end of the pusher rod 2 has a slot that slides over a pin on the seat bottom. The orientation of the slot and its shape is designed to have a surface of contact that is as close as possible to the radial direction with regard to the pivotal connection to the Main slider 16-1003. The moment arm is short between this point of contact and the pivot point whereas the moment arm is longer with regard to the contact point of a similar slot that engages a pin on the Slider 16-1002 on the sliding leg rest 16-1001. This slot is designed to have an orientation and shape to make the contact surface between this pin and this slot as close to the direction of motion of the slider 16-1002.

However with multiple levers connected end to end or serially we have a multiplication of the motion with a proportional reduction in available force. In a second embodiment, a multiple "scissor" or "accordion" movement is possible with multiple pairs of levers attached pivotally in their middle to each other, the ends of a first pair of levers pivotally connected to the seat bottom but also enabled to slide orthogonally to the slider direction so that when the "scissor" closes the ends can come together. The pivot of the first lever pair is pivotally attached to the slider, and therefore as the slider slides away from the first ends of the first pair of levers the scissor will close. The second ends of the first pair of the levers are attached to the first ends of the second pair of levers pivotally and as the first ends of the first pair of levers move together it forces the second end of the first pair to move together and as the first end of the second pair of levers are pivotally connected these move together also. Multiple pairs of levers connected in this fashion with the second ends of one pair connected to the first end of another pair will give a series of serially connected levers. As the slider moves and moves the pivot of the first pair of levers the entire assembly will extend. Therefore the leg rest connected pivotally to the second ends of the last pair of levers with these connections enabled to slide together orthogonal to the slider direction will push the leg rest forwards. The converse will happen as the main slider moves back.

The original movement is passed to the first ends of the first lever pair and the second ends drive the first ends of the second lever pair and so on for multiples of such lever pairs interconnected resulting in a multiplication of the movement of the first scissor whose input is the force/displacement designed for the movement of the seat bottom to move the move the leg rest which needs a much larger motion and smaller force. The number of lever pairs and the length of the levers will be factors that determine the amplicifation.

At or before the time of motion of the main slider 16-1003, the lock 16-1008 between the leg rest and the leg rest slider needs to be engaged thereby ensuring that the movement of the leg rest slider is directly transferred to the motion of the sliding leg rest base 16-1001. Following a predetermined distance of motion of the leg rest base 16-1001, the leg rest may be locked (lock not shown) to the seat bottom and concurrently the lock 16-1008 between the leg rest base and the leg rest slider is released so that the motion is transferred to the leg rest slider but not the leg rest base. This motion of the slider will directly move the front flange of the leg rest slider and/or move the side slider 16-1004 on either side of the leg rest (one side shown) for additional support of the legs.

The side slider is activated by the pivotal attachment with pusher rod 1: 16-1005 which is pivotally attached to the leg rest slider and to the side slider and has an orientation that allows the translation of the motion to the lateral direction.

The reverse process will occur as the actuator direction is reversed and the lock mechanism activation is reversed. Notably spring loadings of each slider mechanism may be used to change the force characteristics as the displacement proceeds.

A second embodiment that does not use switching locks may work as follows. End stops are arranged for the seat bottom motion with regard to the support structure of the AirSleeper, and the leg rest base with regard to the seat bottom. Strong spring loadings are used first between the seat bottom and the main slider 16-1003 to prevent the main slider from moving relative to the seat bottom 16-1000 before the end stop of the seat bottom is reached. Thereafter the force on the end stop will prevent further motion of the seat bottom and the spring between the seat bottom 16-1000 and the main slider 16-1003 will compress an allow the main slider to move thereby actuating the pusher rod 2: 16-1006 which will move the leg rest slider 16-1002. However a strong spring between the Leg rest slider 16-1002 and the leg rest base 16-16-1001 will prevent the leg rest slider from moving relative to the leg rest base and therefore the leg rest base will move relative to the seat bottom till its end stop is reached. Thereafter the end stop will prevent further motion of the leg rest base and thereafter the leg rest slider will move against the spring loading to actuate the flange 16-1007 and/or the side sliders 16/1004. The motion as the actuator shaft retreats will follow the same sequence in reverse.

There are many arrangements possible for all the pivots and slider arrangements disclosed in the background art that may be used in this invention.

AirSleeper Stair Arrangement

As shown in FIG. 8-05 to 8-08 the stair profile is recessed into the AirSleeper enclosure. The advantage is that there is more aisle space at hip to head level. In addition this invention provides a grade on the stairs that is ergonomically attractive for egress and ingress. Finally the stairs are arranged not to interfere with the lower passenger movement as they are at the extreme end of the lower passenger space and on one side. The motion of the seat bottom and its extensions do not interfere with the steps in this embodiment. The upper AirSleeper module will have a shorter front end as a result and therefore for the sleep or flat bed position it will be desirable in some embodiments to have an extension of the leg rest forward and in the case of narrower leg rests to the side as well. This is disclosed in this invention as well above.

The invention claimed is:

1. In a multi-occupant modular array of tiered occupant support modules attached to a floor of a vehicle wherein each of the occupant supports comprise a mini-cabin and each enable a sitting and a flat bed position for occupants, a latch for attaching the occupant support modules to a seat track on the vehicle floor comprising:
   a body of said latch;
   an attachment mechanism in contact with said seat track adapted to transfer to said seat track vertical and horizontal forces from said body of said latch;
   a shock absorber assembly [13-013, 13-014, 13-015, 13-016, 13-017, 13-018],
wherein said shock absorber assembly is configured to resist vertical and horizontal forces and configured to allow bidirectional excursions in at least one of the vertical and horizontal directions, and comprises a vertical and a horizontal load limiter enabled to limit a vertical and a horizontal load on the body of the latch and the attachment mechanism in contact with the seat track relative to an attachment point on the one of:
   one of said occupant support modules;
   a support base for one of said occupant support module;
   two adjoining occupant support modules of the array of occupant support modules;
   two adjoining support bases for occupant support modules of the array of occupant support modules.

2. In a multi-occupant modular array of tiered occupant support modules attached to the floor of a vehicle as in claim 1, a storage bin one of:
   below the occupant support modules;
   above the occupant support modules,
comprising a drawer with a conveyor belt therein, to transfer stored items from the back to the front of the drawer, wherein the movement of the conveyor belt is one of:
   manual; and
   motorized.

3. In a multi-occupant modular array of tiered occupant support modules attached to the floor of a vehicle as in claim 1, with a lower tier and an upper tier and occupants support modules therein, wherein said mini-cabin in each of the occupant support modules on the lower tier comprises:
   side walls defining the lateral limits of said occupant support on the lower tier with inner surface facing the occupant;
   a seat bottom that is enabled to move vertically in a central space of said occupant support on the lower tier;
   a floor defining its lower limits located adjacent to the lowest point of movement of said seat bottom;
   an upper wall of the upper limits of said occupant support;
   a space laterally on either side of said central space, and within said side walls, and above said floor, with an upper surface adapted to serve as an arm rest in a sitting position of the occupant support [FIG. 6-04, FIG. 6-05] and a lying surface in lying position of the occupant support [FIG. 6-03, FIG. 6-06, FIG. 6-07, FIG. 6-08, FIG. 6-09] and a lower surface at said floor, comprising a bracing structure for each of the lower tier occupant supports that includes ribs [14-018] wherein said bracing structure including said ribs is structurally attached to a shear plane [14-017] behind a leg space of and adjacent to steps to access the upper tier occupant support module and attached to the inner surface of one of said side walls and wherein the shear plane lies entirely within said mini-cabin and above the seat bottom.

4. The multi-occupant modular array of tiered occupant support modules of claim 3 comprising "N" lower occupant support modules and "(N−1)" upper occupant support modules, wherein the upper occupant support modules are attached to the lower occupant support modules, and wherein each of stairs for access for each of the upper occupant support modules are placed along the edge of one of the lower occupant support modules and are attached to the inner surface of and constrained to lie within a lateral side wall of the one of the lower occupant support modules, thereby maximizing the contiguous egress ingress space for the occupant in the lower occupant support module and wherein a leg space for the upper occupants are separated from the space of the lower occupant by a barrier along the side of the legs of the upper occupant rigidly attached to said shear plane.

5. In a multi-occupant modular array of tiered occupant support modules with N lower level occupant support modules for installation in the vehicle, said multi-occupant modular array, attached to the floor of a vehicle with latches as in claim 1, a method for calibration of performance of said latch on a sled energized with a predetermined acceleration pulse, by inferring the upper bound for at least one of:
- the forces on the floor of the vehicle exerted by the attachment points in a direction of the motion of the vehicle;
- the forces on the floor of the vehicle exerted by the attachment points in a direction orthogonal to the floor of the vehicle;
- the injury measures for the head;
- injury measures resulting from spinal compression, by testing an array comprising less than N such lower occupant support modules, thereby reducing the cost of performance testing such architectures comprising the steps of:
- identifying a lower tier occupant support;
- identifying an upper tier occupant support;
- setting levels of force displacement characteristics for said latches, each for attachment of one or more occupant support modules to the aircraft cabin floor;
- defining an attachment between lower and upper tier occupant support modules;
- identifying the number N of lower and attached upper occupant support modules desired in the installed array for assembly in the vehicle;
- selecting a number M of lower and attached upper tier occupant support modules such that the M lower tier occupant support modules have a cumulative base that fits in said testing sled, and wherein M is less than N;
- executing the sled test methodology on the array comprising M lower occupant support modules, to measure at least one of:
  - occupant injury;
  - floor loadings along the floor;
  - floor loadings orthogonal to the floor;
- inferring from said measurements on the array comprising M lower occupant support modules, the upper bound for one or more of said measurements for the array comprising N lower occupant modules;

thereby calibrating an upper bound for said measurements for the multi-occupant modular array of tiered occupant supports with N lower level occupant supports for installation in the vehicle.

6. A method as in claim 5, wherein the multi-occupant modular array with "N" lower modules has "(N−1)" upper modules.

7. A method as in claim 5, wherein M is 2.

8. A method as in claim 5, wherein M is 3.

9. A method as in claim 5, wherein M is 4.

10. A method as in claim 5, wherein the tested M of lower and attached upper tier occupant support modules are placed in a horizontal plan on said sled to measure performance in response to the acceleration pulse of the sled in a horizontal direction.

11. A method as in claim 5, wherein the tested M of lower and attached upper tier occupant support modules are placed at predetermined angle to the horizontal on said sled, to measure performance in response to the acceleration pulse of the sled in a horizontal direction.

12. In a multi-occupant modular array of tiered occupant supports attached to the floor of a vehicle, as in claim 1, wherein the horizontal load limiter comprising one of:
- a spring damper with one end attached to said latch body and the other end attached to the attachment point which is slidably attached to the body;
- a first and a second spring damper each with a first end and a second end, wherein the first ends of both spring dampers are attached to said latch body and the second ends of both spring dampers are attached to the attachment point, and wherein the first and the second spring dampers attached on opposite sides of the attachment point thereby enabling one of said spring dampers to be compressed when the other of the spring dampers is one of: in a normal state; and tensioned.

13. In a multi-occupant modular array of tiered occupant supports attached to the floor of a vehicle, as in claim 1, wherein the vertical load limiter comprising one of:
- a spring damper with one end attached to said latch body and the other end attached to the attachment point which is slidably attached to the body;
- a first and a second spring damper each with a first end and a second end, wherein the first ends of both spring dampers are attached to said latch body and the second ends of both spring dampers are attached to the attachment point, and wherein the first and the second spring dampers attached on opposite sides of the attachment point thereby enabling one of said spring dampers to be compressed when the other of the spring dampers is one of: in a normal state; and tensioned.

14. In a multi-occupant modular array of tiered occupant support modules attached to a floor of a vehicle, as in claim 1, an occupant support module further comprising a single actuator driven mechanism to actuate:
- a seat between any two of a sitting position, a flat bed position and a recline position;
- and a leg rest one of: retract under the seat bottom and fold downwards, comprising a motion amplification assembly enabled to change the force-displacement characteristics of the actuator to adapt one of: to the motion of the leg rest; and the motion of at least one of the seat back and bottom.

15. In a multi-occupant modular array of tiered occupant support modules attached to a floor of a vehicle, as in claim 14, further comprising locks to engage the seat bottom in a plurality of predetermined positions, and wherein the motion end of the actuator is attached to a slider on the seat bottom and wherein the slider is locked to the seat bottom at times when actuation of the seat bottom is required and the slider is released from the seat bottom, and the seat bottom locked in place, when the motion needs to be transferred to the leg rest, and wherein the slider is attached to the motion amplification assembly.

16. In a multi-occupant modular array of tiered occupant support modules attached to a floor of a vehicle, as in claim 15, wherein the motion amplification assembly comprises one of: a single lever with its force input attached both pivotally and slidably substantially orthogonal to the slider direction of motion, to the seat bottom and its lever pivot pivotally attached to the slider and the force output end connected both slidably substantially orthogonal to the slider direction and pivotally to the leg rest; and a plurality of serially attached levers with a first lever and a last lever, and a force input on the first end of the first lever, which is both slidably orthogonal to the slider direction of motion and pivotally connected to the seat bottom, and a force output end at a second end of the last lever connected both slidably substantially orthogonal to the direction of motion of the leg rest and pivotally to the leg rest and comprising a pivot of the first lever attached pivotally to the slider, enabled to increase the motion distance of the leg rest with a reduction of available force.

17. In a multi-occupant modular array of tiered occupant support modules attached to a floor of a vehicle, as in claim 16, wherein the serially attached plurality of N pairs of levers comprise a plurality of N pairs of arms, wherein each of the pairs of arms are connected at their center and wherein each of the arms have a input end and an output end, and wherein the input ends of the first pair of arms are connected to the seat bottom both pivotally and enabled to move orthogonally to the motion of the slider, and wherein the pivot of the first pair of arms is pivotally attached to the slider, and wherein the input ends of the second pair of arms of the second lever pair are connected to the output ends of the first lever pair, and iteratively wherein the output arms of the (N−1)th lever pair are attached to the input arms of the Nth lever pair, and wherein the output arms of the Nth lever pair are connected to the leg rest pivotally and with said connection enabled to move orthogonally to the direction of motion of the leg rest to allow the extension of a scissor movement of the pivoted arms.

18. In a multi-occupant modular array of tiered occupant support modules attached to a floor of a vehicle, as in claim 16, wherein the leg rest is one of pivotally attached to the seat bottom; and slidably attached to the seat bottom.

19. In a multi-occupant modular array of tiered occupant support modules attached to a floor of a vehicle, as in claim 14, further comprising side wings, one of slidably; and pivotally attached to the leg rest, and wherein the attachment of the motion actuation mechanism to the leg rest on a slider on the leg rest, and wherein the slider on the leg rest may be locked to the leg rest to actuate the leg rest, or may be released to actuate the slider relative to the leg rest, and wherein the slider is attached with an actuation arm to a side wing that is slidably or pivotally attached to the leg rest, thereby extending the side wing.

20. In a multi-occupant modular array of tiered occupant support modules attached to a floor of a vehicle, as in claim 14, wherein the seat bottom is enabled to move one of forward and backwards as the seat back is reclined from the sit up position to the flat bed position.

* * * * *